United States Patent
Kulam Najmudeen et al.

(10) Patent No.: US 12,493,092 B2
(45) Date of Patent: Dec. 9, 2025

(54) TIME EFFICIENT MULTI-PULSED FIELD GRADIENT (mPFG) MRI WITHOUT CONCOMITANT GRADIENT FIELD ARTIFACTS

(71) Applicants: The United States of America, as represented by the Secretary, Department of Health and Human Services, Bethesda, MD (US); The Henry M. Jackson Foundation for the Advancement of Military Medicine, Inc., Bethesda, MD (US)

(72) Inventors: Magdoom Mohamed Kulam Najmudeen, Bethesda, MD (US); Peter J. Basser, Bethesda, MD (US); Michal E. Komlosh, Bethesda, MD (US)

(73) Assignees: The United States of America, as represented by the Secretary, Department of Health and Human Services, Bethesda, MD (US); The Henry M. Jackson Foundation for the Advancement of Military Medicine, Inc., Bethesda, MD (US)

( * ) Notice: Subject to any disclaimer, the term of this patent is extended or adjusted under 35 U.S.C. 154(b) by 210 days.

(21) Appl. No.: 18/017,150

(22) PCT Filed: Jul. 8, 2021

(86) PCT No.: PCT/US2021/040929
§ 371 (c)(1),
(2) Date: Jan. 20, 2023

(87) PCT Pub. No.: WO2022/020102
PCT Pub. Date: Jan. 27, 2022

(65) Prior Publication Data
US 2023/0266418 A1    Aug. 24, 2023

Related U.S. Application Data

(60) Provisional application No. 63/055,150, filed on Jul. 22, 2020.

(51) Int. Cl.
   *G01R 33/563* (2006.01)
   *G01R 33/022* (2006.01)
   *G01R 33/24* (2006.01)

(52) U.S. Cl.
   CPC ..... *G01R 33/56341* (2013.01); *G01R 33/022* (2013.01); *G01R 33/246* (2013.01)

(58) Field of Classification Search
   None
   See application file for complete search history.

(56) References Cited

U.S. PATENT DOCUMENTS 9,891,302 B2    2/2018    Topgaard et al.

FOREIGN PATENT DOCUMENTS

WO    2018/031942 A1    2/2018
WO    WO-2018187764 A1 *    10/2018    ............. A61B 5/004

OTHER PUBLICATIONS

Magdoom et al., "A New Framework for MR Diffusion Tensor Distribution," posted on May 2, 2020, bioRxiv. (Year: 2020).*

(Continued)

*Primary Examiner* — Patricia J Park
(74) *Attorney, Agent, or Firm* — Leydig, Voit & Mayer, Ltd.

(57) ABSTRACT

Diffusion sensitizing gradient pulse pairs are prescribed in a manner to mitigate effects of concomitant gradient artifacts. Measured MR signals generated by applying a plurality of diffusion sensitizing gradient matrices are obtained and processed to determine a second order mean diffusion tensor and a fourth order covariance tensor. Quantities derived from these tensors are measured and mapped within an (Continued)

imaging volume which describe features of diffusion anisotropy and heterogeneity within each imaging voxel.

24 Claims, 29 Drawing Sheets

(56) References Cited

OTHER PUBLICATIONS

Avram et al., "Measuring non-parametric distributions of intravoxel mean diffusivities using a clinical MRI scanner," *Neuro Image*, 185:255-262 (Jan. 15, 2019) Author Manuscript.

Basser et al., "Estimation of the Effective Self-Diffusion Tensor from the NMR Spin Echo," *J. Magn. Res.* B103:247-254 (1994).

Basser, "Inferring microstructural features and the physiological state of tissues from diffusion-weighted images," *NMR in Biomedicine*, 8(7):333-344 (1995).

Basser, "New Histological and Physiological Stains Derived from Diffusion-Tensor MR Images," *Annals NY Academy of Sciences*, 820(1):123-138 (1997).

Basser at al., "Spectral decomposition of a $4^{th}$-order covariance tensor: Applications to diffusion tensor MRI," *Signal Processing*, 87(2): 220-236 (Feb. 1, 2007).

European Patent Office, International Search Report and Written Opinion of the International Searching Authority, Application No. PCT/US2021/040929, mailed Oct. 15, 2021, 18 pages.

Jespersen et al., "Orientationally invariant metrics of apparent compartment eccentricity from double pulsed field gradient diffusion experiments," *NMR in Biomedicine*, 26(12): 1647-1662 (Aug. 23, 2013).

Kulam Najmudeen et al. "A New Framework for MR Diffusion Tensor Distributions," *Scientific Reports*, 11:2766, 15 pages https://doi.org/10.1101/2020.05.01.071118 (Feb. 2021).

Lundell et al., "Multidimensional diffusion MRI with spectrally modulated gradients reveals unprecedented microstructural detail," *Scientific Reports*, 9(1): 9026, 12 pages, (Jun. 2019).

Mitra and Halperin, "Effects of finite gradient-pulse widths in pulsed-field-gradient diffusion measurements," *Journal of Magnetic Resonance*, Series A 113.1, pp. 94-101 (1995).

Szczepankiewicz et al., "Gradient waveform design for tensor-valued encoding in diffusion MRI," *Journal of Neuroscience Methods*, 348: 20 pages (Nov. 2020).

Tax et al., "The dot compartment revealed? Diffusion MRI with ultra-strong gradients and spherical tensor encoding in the living human brain," *Neuro Image* 210:116534, 14 pages (Jan. 2020).

Fukuzaki et al., "The ability of line scan diffusion imaging method comparison with echo planner diffusion imaging," *International Society for Magnetic Resonance in Medicine*, abstract, p. 1833 (1999).

Pierpaoli et al., "Polyvinylpyrrolidone (PVP) water solutions as isotropic phantoms for diffusion MRI studies," *Proc Intl Mag Reson Med*, 17:1414 (2009).

\* cited by examiner

FIG. 16
Size distribution
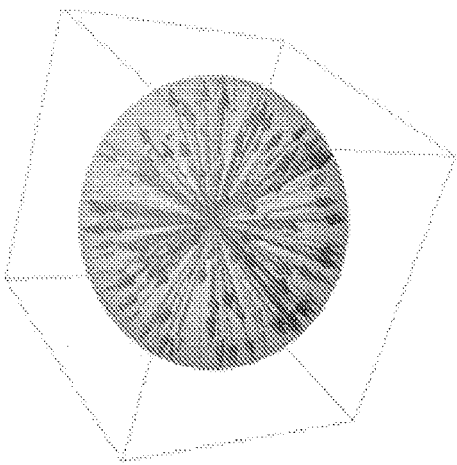
Orientation dispersion
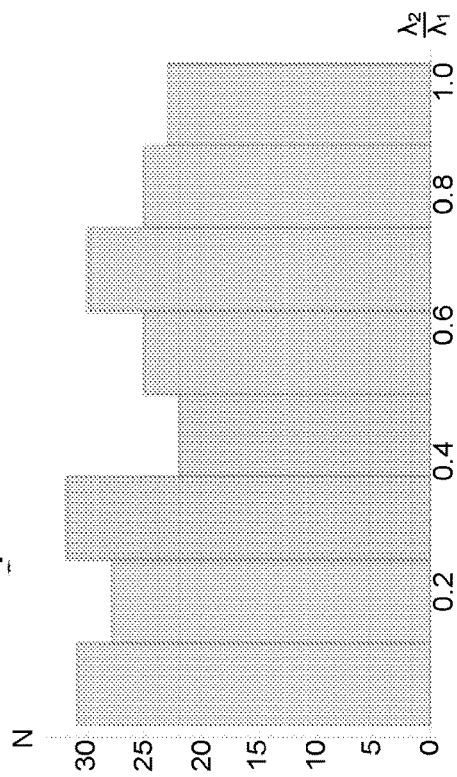
Sampled b-matrices
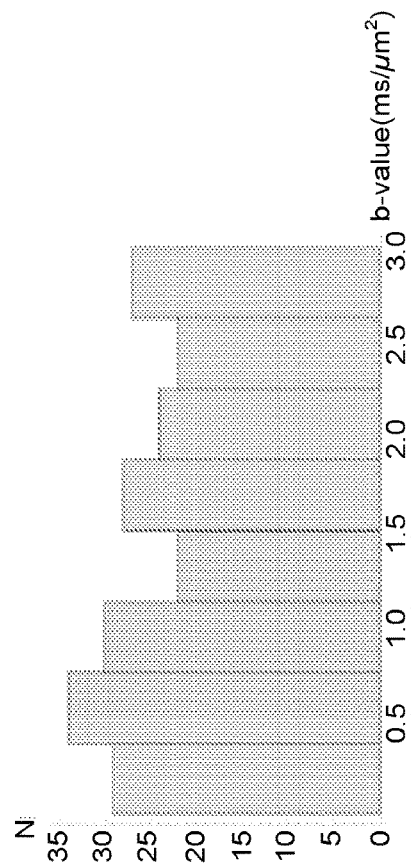
Shape distribution
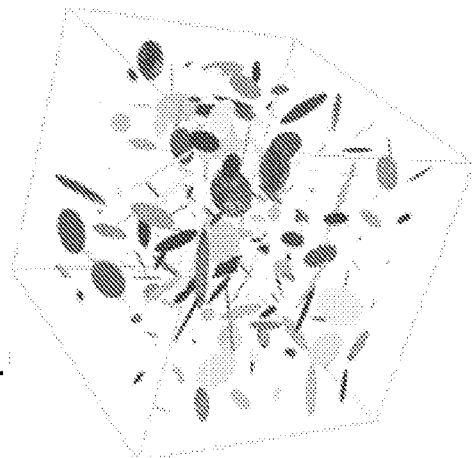

FIG. 17
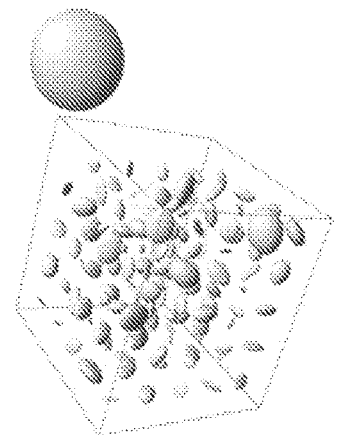
Size heterogeneity
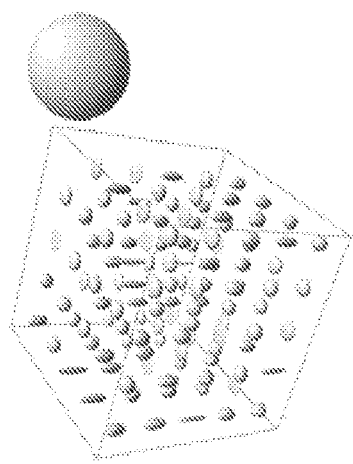
Shape heterogeneity
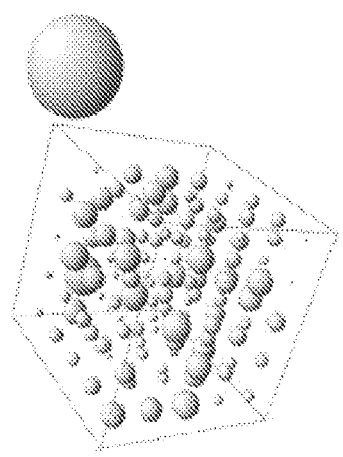
Full heterogeneity FIG. 18
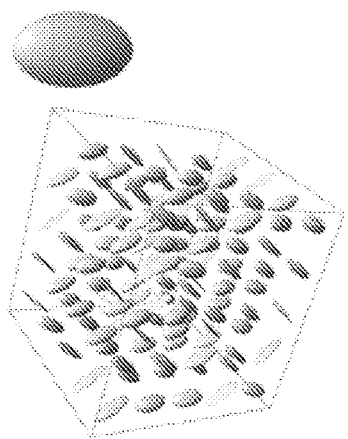
Orientation heterogeneity
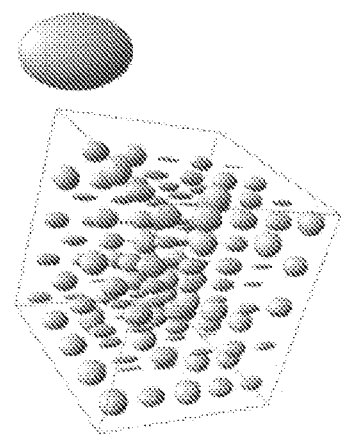
Transverse size heterogeneity
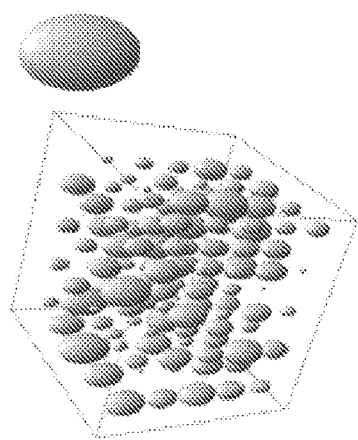
Size heterogeneity

FIG. 25

| DTD type | SNR | Estimation error in mean tensor (%) | Estimation error in covariance tensor (%) | Error in $V_{size}$ (%) | Error in $V_{shape}$ (%) | Error in $V_{orient}$ (%) |
|---|---|---|---|---|---|---|
| Size heterogeneity | 5 | 4.0 | 30.0 | 14.9 | - | - |
|  | 10 | 4.0 | 30.0 | 14.9 | - | - |
|  | 20 | 1.0 | 5.0 | 2.1 | - | - |
|  | ∞ | 2.0 | 10.0 | 0.4 | - | - |
| Shape heterogeneity | 5 | 2.0 | 60.0 | - | 40.0 | - |
|  | 10 | 1.0 | 50.0 | - | 40.0 | - |
|  | 20 | 1.0 | 30.0 | - | 17.5 | - |
|  | ∞ | 0.6 | 30.0 | - | 15.0 | - |
| Orientation heterogeneity | 5 | 1.0 | 30.0 | - | - | 24.1 |
|  | 10 | 0.8 | 20.0 | - | - | 20.7 |
|  | 20 | 0.8 | 20.0 | - | - | 20.7 |
|  | ∞ | 0.8 | 20.0 | - | - | 20.7 |

FIG. 27

| Number of parameters | Symmetry (Mean tensor) | Symmetry (Covariance tensor) | Structure of the mean tensor | Structure of the covariance tensor in Voigt form |
|---|---|---|---|---|
| 1 | None | None | $\begin{pmatrix} 0 & 0 & 0 \\ 0 & 0 & 0 \\ 0 & 0 & 0 \end{pmatrix}$ | $\begin{pmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix}$ |
| 1 | Isotropic | None | $p_1 \begin{pmatrix} 1 & 0 & 0 \\ 0 & 1 & 0 \\ 0 & 0 & 1 \end{pmatrix}$ | $\begin{pmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix}$ |
| 5 | Transverse isotropic | None | $\alpha \hat{r} \hat{r}^T + \beta I$ | $\begin{pmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix}$ |
| 7 | General Anisotropic | None | $\begin{pmatrix} D_{xx} & D_{xy} & D_{xz} \\ D_{xy} & D_{yy} & D_{yz} \\ D_{xz} & D_{yz} & D_{zz} \end{pmatrix}$ | $\begin{pmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix}$ |
| $k_{mean} + 2$ | Chosen symmetry | Isotropic | Corresponding structure | $\begin{pmatrix} p_1 & p_2 & p_2 & 0 & 0 & 0 \\ p_2 & p_1 & p_2 & 0 & 0 & 0 \\ p_2 & p_2 & p_1 & 0 & 0 & 0 \\ 0 & 0 & 0 & 2(p_1-p_2) & 0 & 0 \\ 0 & 0 & 0 & 0 & 2(p_1-p_2) & 0 \\ 0 & 0 & 0 & 0 & 0 & 2(p_1-p_2) \end{pmatrix}$ |

FIG. 28

| | | | | |
|---|---|---|---|---|
| $k_{mean} + 3$ | Chosen symmetry | Cubic | Corresponding structure | $\begin{pmatrix} p_1 & p_2 & p_2 & 0 & 0 & 0 \\ p_2 & p_1 & p_2 & 0 & 0 & 0 \\ p_2 & p_2 & p_1 & 0 & 0 & 0 \\ 0 & 0 & 0 & p_3 & 0 & 0 \\ 0 & 0 & 0 & 0 & p_3 & 0 \\ 0 & 0 & 0 & 0 & 0 & p_3 \end{pmatrix}$ |
| $k_{mean} + 5$ | Chosen symmetry | Hexagonal | Corresponding structure | $\begin{pmatrix} p_1 & p_2 & p_3 & 0 & 0 & 0 \\ p_2 & p_1 & p_3 & 0 & 0 & 0 \\ p_3 & p_3 & p_4 & 0 & 0 & 0 \\ 0 & 0 & 0 & p_5 & 0 & 0 \\ 0 & 0 & 0 & 0 & p_5 & 0 \\ 0 & 0 & 0 & 0 & 0 & 2(p_1 - p_2) \end{pmatrix}$ |
| $k_{mean} + 6$ | Chosen symmetry | Trigonal I | Corresponding structure | $\begin{pmatrix} p_1 & p_2 & p_3 & p_4 & 0 & 0 \\ p_2 & p_1 & p_3 & -p_4 & 0 & 0 \\ p_3 & p_3 & p_5 & 0 & 0 & 0 \\ p_4 & -p_4 & 0 & p_6 & 0 & 0 \\ 0 & 0 & 0 & 0 & p_6 & 2p_4 \\ 0 & 0 & 0 & 0 & 2p_4 & 2(p_1 - p_2) \end{pmatrix}$ |
| $k_{mean} + 6$ | Chosen symmetry | Tetragonal I | Corresponding structure | $\begin{pmatrix} p_1 & p_2 & p_3 & 0 & 0 & 0 \\ p_2 & p_1 & p_3 & 0 & 0 & 0 \\ p_3 & p_3 & p_4 & 0 & 0 & 0 \\ 0 & 0 & 0 & p_5 & 0 & 0 \\ 0 & 0 & 0 & 0 & p_5 & 0 \\ 0 & 0 & 0 & 0 & 0 & p_6 \end{pmatrix}$ |
| $k_{mean} + 7$ | Chosen symmetry | Trigonal II | Corresponding structure | $\begin{pmatrix} p_1 & p_2 & p_3 & p_4 & -p_5 & 0 \\ p_2 & p_1 & p_3 & -p_4 & p_5 & 0 \\ p_3 & p_3 & p_6 & 0 & 0 & 0 \\ p_4 & -p_4 & 0 & p_7 & 0 & 2p_5 \\ -p_5 & p_5 & 0 & 0 & p_7 & 2p_4 \\ 0 & 0 & 0 & 2p_5 & 2p_4 & 2(p_1 - p_2) \end{pmatrix}$ |
| $k_{mean} + 7$ | Chosen symmetry | Tetragonal II | Corresponding structure | $\begin{pmatrix} p_1 & p_2 & p_3 & 0 & 0 & p_4 \\ p_2 & p_1 & p_3 & 0 & 0 & -p_4 \\ p_3 & p_3 & p_5 & 0 & 0 & 0 \\ 0 & 0 & 0 & p_6 & 0 & 0 \\ 0 & 0 & 0 & 0 & p_6 & 0 \\ p_4 & -p_4 & 0 & 0 & 0 & p_7 \end{pmatrix}$ |

FIG. 29

| | | | | |
|---|---|---|---|---|
| $k_{mean} + 9$ | Chosen symmetry | Orthorhombic | Corresponding structure | $\begin{pmatrix} p_1 & p_2 & p_3 & 0 & 0 & 0 \\ p_2 & p_4 & p_5 & 0 & 0 & 0 \\ p_3 & p_5 & p_6 & 0 & 0 & 0 \\ 0 & 0 & 0 & p_7 & 0 & 0 \\ 0 & 0 & 0 & 0 & p_8 & 0 \\ 0 & 0 & 0 & 0 & 0 & p_9 \end{pmatrix}$ |
| $k_{mean} + 13$ | Chosen symmetry | Monoclinic I | Corresponding structure | $\begin{pmatrix} p_1 & p_2 & p_3 & 0 & p_{10} & 0 \\ p_2 & p_4 & p_5 & 0 & p_{11} & 0 \\ p_3 & p_5 & p_6 & 0 & p_{12} & 0 \\ 0 & 0 & 0 & p_7 & 0 & p_{13} \\ p_{10} & p_{11} & p_{12} & 0 & p_8 & 0 \\ 0 & 0 & 0 & p_{13} & 0 & p_9 \end{pmatrix}$ |
| $k_{mean} + 13$ | Chosen symmetry | Monoclinic II | Corresponding structure | $\begin{pmatrix} p_1 & p_2 & p_3 & 0 & 0 & p_{10} \\ p_2 & p_4 & p_5 & 0 & 0 & p_{11} \\ p_3 & p_5 & p_6 & 0 & 0 & p_{13} \\ 0 & 0 & 0 & p_7 & p_{12} & 0 \\ 0 & 0 & 0 & p_{12} & p_8 & 0 \\ p_{10} & p_{11} & p_{13} & 0 & 0 & p_9 \end{pmatrix}$ |
| $k_{mean} + 21$ | Chosen symmetry | Triclinic | Corresponding structure | $\begin{pmatrix} p_1 & p_2 & p_3 & p_4 & p_5 & p_6 \\ p_2 & p_7 & p_8 & p_9 & p_{10} & p_{11} \\ p_3 & p_8 & p_{12} & p_{13} & p_{14} & p_{15} \\ p_4 & p_9 & p_{13} & p_{16} & p_{17} & p_{18} \\ p_5 & p_{10} & p_{14} & p_{17} & p_{19} & p_{20} \\ p_6 & p_{11} & p_{15} & p_{18} & p_{20} & p_{21} \end{pmatrix}$ | ns
TIME EFFICIENT MULTI-PULSED FIELD GRADIENT (mPFG) MRI WITHOUT CONCOMITANT GRADIENT FIELD ARTIFACTS

CROSS REFERENCE TO RELATED APPLICATIONS

This application is a U.S. National Phase of International Application No. PCT/US2021/040929, filed on Jul. 8, 2021, which claims priority to U.S. Provisional Application 63/055,150, filed Jul. 22, 2020, each of which is incorporated herein by reference in their entireties.

STATEMENT OF GOVERNMENT SUPPORT

This invention was made with Government support under project number Z01 #: 1 ZIA HD008971 01 by the National Institutes of Health, Eunice Kennedy Shriver National Institute of Child Health and Human Development (NICHD). The United States Government has certain rights in the invention.

FIELD OF THE DISCLOSURE

The disclosure pertains to diffusion tensor magnetic resonance imaging.

BACKGROUND

Measuring and mapping nervous tissue microstructure noninvasively has been a long sought-after goal in neuroscience. Clinically, several neuropathologies such as cancer and stroke are associated with changes in tissue microstructure. Diffusion tensor imaging (DTI), which models diffusion anisotropy, is an ideal imaging modality to elucidate these changes. However, DTI provides a mean diffusion tensor averaged over the entire MRI voxel which has some limitations when applied to heterogeneous neural tissue. Although some of these could be overcome by increased spatial resolution, this comes at the cost of reduced signal-to-noise ratio (SNR) and increased scan time. The SNR limitation makes it impractical to resolve individual neuronal soma and axons whose size range between 0.1-60 µm. Multiple pulsed field gradient (mPFG) methods can resolve microscopic features several orders of magnitude smaller than the typical MRI voxel size, such as the sizes of plant cells and pore diameters in phantoms, using lower gradient strengths compared to single PFG methods. mPFG methods have also been shown to differentiate between macro- and micro-scale anisotropies as demonstrated in yeast suspensions and polydomain lyotropic liquid crystal systems. These classical works have stimulated renewed interest in the diffusion MRI community to elucidate neural tissue microstructure beyond that provided by DTI. However, these approaches generally rely on an assumed microstructure or morphology of the material such as consisting of spherical pores or an ensemble of randomly oriented ellipsoids, which limits their applicability to complex neural tissue which is known to have highly heterogeneous and anisotropic domains.

Neural tissue has been modeled as being composed of microscopic Gaussian diffusion compartments described by the joint probability distribution of the components of the diffusion tensor also known as the diffusion tensor distribution (DTD). Invoking a Gaussian distribution of net displacements of water molecules in a microvoxel is a reasonable assumption for brain tissue given the time-independent diffusion observed on time scales (i.e., of tens of milliseconds) typically probed in spin-echo diffusion weighted MR experiments. Moreover, the DTD could vary in different parts of the tissue revealing different microstructural motifs. The goal of DTD MRI is to estimate the DTD from the measured MR signal in each voxel and map various salient features of the DTD within the imaging volume.

Obtaining the full 6D-DTD (i.e., relating the variability of all six independent components of the diffusion tensor) is challenging due to the well-known ill-posed nature of Laplace inversion. Several studies have used different parametric DTDs based upon assumptions made about the underlying microstructure. A normal tensor variate distribution constrained in the manifold of positive definite diffusion tensors (CNTVD) has been proposed for the DTD, which removes the limitations on the range of b-values over which the DTD model is applicable that appear in some models. The CNTVD is the maximum entropy distribution among all probability densities supported by a constraint with given first and second moments. This makes CNTVD the least biased choice for the DTD in the absence of any a priori information on the underlying tissue microstructure. The use of the CNTVD to characterize diffusion in brain tissue is further bolstered by the observation of a Gaussian distribution for orientationally averaged diffusivity.

Given the functional form of the DTD, the development of an efficient experimental design and pulse sequence for measuring it has been a subject of ongoing research. Using tensor algebra, it has been shown that rank-1 and rank-2 b-matrices generated in single and double-PFG experiments respectively are sufficient to accurately measure the first two moments of the DTD: the mean and covariance tensors. Rank-3 b-matrices are not necessary. Traditional mPFG experiments use a block design where the gradient pairs are applied successively with timing gaps in between, which increases the echo time. The multiple radiofrequency (RF) pulses used to cause the phase inversion in the block design also creates coherence artifacts. Double-PFG (dPFG) and quadruple-PFG (qPFG) experiments have been performed in a single spin echo by applying different gradient pairs on either side of a 180° RF pulse. Despite reducing the echo time and coherence artifacts, both of these methods suffer from concomitant gradient field artifacts arising from the gradient asymmetry around the 180° RF pulse, which causes diffusion-independent signal loss, thereby confounding the diffusion imaging analyses. Methods based on q-trajectory have been used to perform mPFG experiments without the blocking constraint and extra RF pulses. The q-trajectory approach, despite reducing the echo time, is not time efficient. The oscillating gradient waveforms used result in less diffusion weighting than trapezoidal pulses, making it difficult to achieve large b-values as well as suffering from concomitant gradient field artifacts. The diffusion gradient timing parameters, particularly the diffusion time and diffusion pulse duration, are also not well defined in general q-trajectories which limits the physical interpretation of the MRI data.

The methods and apparatus disclosed herein addresses limitations of these prior approaches.

SUMMARY OF THE DISCLOSURE

Disclosed herein are methods and apparatus that can be used to measure and map the DTD in neural tissue or other specimens. Efficient and translatable methods of performing mPFG MRI experiments in a single spin echo sequence that are capable of generating b-matrices of ranks one, two, or three, without concomitant gradient field artifacts are disclosed. The disclosed approaches and signal inversion framework can capture features of heterogeneity and anisotropy in the spinal cord or other specimens. The disclosed stains may have utility in assessing disease (e.g., cancer), normal and abnormal developmental processes, degeneration and trauma in the brain and other soft tissues, or in other applications.

The disclosed MR diffusion imaging methods and apparatus can estimate the entire 6D DTD. A single diffusion weighted spin echo MR sequence can be used for generating b-matrices of arbitrary shape, size and orientation and can use trapezoidal diffusion gradient pulses without concomitant gradient field artifacts. These trapezoidal gradients efficiently utilize the gradient hardware and are easy to implement. Such pulse sequences have well-defined diffusion gradient pulse widths, diffusion and mixing times that are amenable to analysis and interpretation using the q-space formalism. The disclosed approaches can capture features of anisotropy and heterogeneity in neural tissue (spinal cord), demarcating distinct regions within gray matter areas, or in other biological and non-biological samples.

Representative magnetic resonance (MR) methods comprise determining a plurality of random diffusion weightings based on random selections of magnitudes and first and second direction and applying to a sample a plurality of sets of diffusion-sensitizing gradient pulse pairs separated by a diffusion time, wherein each of the diffusion-sensitizing gradient pulse pairs is associated with a respective random diffusion weighting. A 180-degree RF pulse is applied during the diffusion time between a first pulse pair and a second pulse pair of each of the sets of pulse pairs and MR signals responsive to the each of the plurality of sets of diffusion sensitizing pulse pairs are measured. Based on the measured MR signals, a mean diffusion tensor associated with at least a portion of the sample is determined. In some examples, a fourth-order covariance tensor associated with the mean second-order diffusion tensor is determined based on the measured MR signals. In some embodiments, the randomly selected magnitudes are b-magnitudes associated with diffusion weighting b-matrices and are selected from a uniform distribution. In additional examples, the first and second directions are randomly selected over a range that includes all directions.

In further examples, the diffusion sensitizing gradient pulse pairs are trapezoidal and the random diffusion weightings are associated with respective diffusion weighting matrices having coefficients bid given by $$b_{ij} = \frac{\gamma^2 \delta^2}{3} \left[ \begin{array}{c} -(G_2^{(i)}(3G_1^{(j)} + G_2^{(j)}) + G_1^{(i)}(G_1^{(j)} + 3G_2^{(j)}))\delta + \\ 3(G_1^{(i)} + G_2^{(i)})(G_1^{(j)} + G_2^{(j)})\Delta \end{array} \right],$$

wherein $b_{ij}$ is the b-value from diffusion gradient interactions between the $i^{th}$ and $j^{th}$ axis, $G_1^{(i)}$, $G_2^{(i)}$, $G_1^{(j)}$, $G_2^{(j)}$ are $i^{th}$ and $j^{th}$ components of the first and second diffusion gradient pairs of the sets of diffusion-sensitizing gradient pulse pairs, $\Delta$ is the diffusion time, $\delta$ is an effective pulse duration, $\gamma$ is a nuclear gyromagnetic ratio, and i, j are integers from 1 to 3. In some examples, the components of the first and second gradient pairs are found from $b_{ij} = b_{ij}'$, wherein $$b_{ij}' = \frac{b}{2} \left( \hat{n}_1^{(i)} \hat{n}_1^{(j)} + \hat{n}_2^{(i)} \hat{n}_2^{(j)} \right)$$

and $\hat{n}_1^{(i)}$ and $\hat{n}_2^{(i)}$ are components of unit vectors $\hat{n}_1$, $\hat{n}_2$ corresponding to the first and second random directions. In still further examples, a 90° RF pulse is applied and then the first pulse pair of each of the sets of pulse pairs is applied. In representative examples, the diffusion weightings and the first and second directions are randomly selected from respective uniform distributions. The b-values $b_{ij}$ can be computed numerically for a given diffusion gradient waveform.

In typical examples, each of the sets of diffusion-sensitizing gradient pulse pairs includes a first pulse pair and a second pulse pair, each separated by the diffusion time and each of the first pulse pairs and the second pulse pairs includes a respective initial pulse and a final pulse. In some examples, the initial pulse of the first pulse pair and the initial pulse of the second pulse pair have a common initial pulse waveform and the final pulse of the first pulse pair and the final pulse of the second pulse pair have a common final pulse waveform, wherein the common initial pulse waveform and the common final pulse waveform are different. According to some examples, at least one of a fractional anisotropy, a size heterogeneity, a shape heterogeneity, and an orientation heterogeneity is determined based on the measured MR signals.

In other examples, MR apparatus comprise a gradient control system operable to apply a plurality of sets of diffusion-sensitizing gradient pulse pairs separated by a diffusion time as well as the imaging gradients to a sample to at least one gradient coil, wherein each of the diffusion-sensitizing gradient pulse pairs is associated with a respective random diffusion weighting. A receiver is situated to receive MR signals responsive to the plurality of sets of diffusion-sensitizing gradient pulse pair and a processor is coupled to the receiver and operable to determine at least one of a mean second-order diffusion tensor and a fourth-order covariance tensor associated with the second order mean diffusion tensor based on the received MR signals. In some examples, the processor is coupled to a processor-readable storage medium that stores processor-executable instructions for specifying the plurality of sets of diffusion-sensitizing gradient pulse pairs. In representative examples, the processor-executable instructions for specifying the plurality of sets of diffusion-sensitizing gradient pulse pairs include processor-executable instructions for selecting first and second directions and diffusion weighting magnitudes and in typical examples, the first and second directions and the diffusion weighting magnitudes are randomly selected. Random selection can be generated using, for example, a random number generator, or retrieved from a previously generated set of random values associated with directions and magnitudes.

In some examples, the processor is coupled to a processor-readable storage medium that stores specifications of the plurality of sets of diffusion-sensitizing gradient pulse pairs. Typically, the specifications of the plurality of sets of diffusion-sensitizing gradient pulse pairs include gradient field components and combinations associated with a plurality of diffusion weighting magnitudes and the specifications are based on respective diffusion weighting matrices.

Representative methods include applying a diffusion-sensitizing pulse to a specimen and applying a 180° RF pulse after the diffusion-sensitizing pulse during a diffusion time. After the diffusion time has elapsed, the diffusion-sensitizing pulse is applied to the specimen again which rewinds the phase accumulated due to concomitant fields generated from the first diffusion sensitizing pulse and an MR signal responsive to application of the diffusion sensitizing pulses is acquired, thereby reducing concomitant gradient field effects. Based on the measured MR signal, a mean second order diffusion tensor associated with at least a portion of the sample is determined.

Methods of reducing concomitant field effects in diffusion in magnetic resonance measurement comprise, within a single echo time, applying first multi-directional diffusion sensitizing gradient pulses to a specimen and then applying a 180° pulse during a diffusion time. Second multi-directional diffusion sensitizing gradient pulses are applied to the specimen after the 180° pulse, wherein the first multi-directional diffusion sensitizing gradient pulses and the second multi-directional diffusion sensitizing gradient pulses are symmetric with respect to the 180° pulse. In some examples, the first multi-directional diffusion sensitizing gradient pulses and the second multi-directional diffusion sensitizing gradient pulses each comprise two pulses. In one example, the pulses are trapezoidal and can have a common waveform. In specific examples the 180° pulse is applied at a middle of the diffusion time. In some embodiments, the first multi-directional diffusion sensitizing gradient pulses and the second multi-directional diffusion sensitizing gradient pulses have a common waveform. In a particular example, the first multi-directional diffusion sensitizing gradient pulses and the second multi-directional diffusion sensitizing gradient pulses each comprise two or more pulses and at least one of the two or more pulses has a common pulse waveform.

The foregoing and other features and advantages of the technology will become more apparent from the following detailed description of several embodiments which proceeds with reference to the accompanying figures. The aspects and embodiments of the present application can be better understood by reference to the following drawings. The drawings are merely exemplary to illustrate certain features that may be used singularly or in combination with other features and the present application should not be limited to the embodiments shown.

BRIEF DESCRIPTION OF THE FIGURES

FIG. 2A shows ellipses representing 216 rank-1 and rank-2 b-matrices acquired for estimation. FIG. 2B is a histogram of the trace of the sampled b-matrices showing a relatively uniform sampling of b-magnitude.

FIG. 16 illustrates a representative experimental design for DTD estimation results of an isotropic PVP phantom and live human brain.

FIG. 17 illustrates macroscopically isotropic and microscopically heterogeneous DTDs generated from CNTVD describing gray matter.

FIG. 18 illustrates macroscopically anisotropic and microscopically heterogeneous DTDs generated from CNTVD describing representative DTD results of simulated human brain acquired using the white matter using the same parameters as those of FIG. 13.

FIG. 25 is a table illustrating performance of the estimation pipeline and heterogeneity stains evaluated using different signal-to-noise ratio (SNR) for three different DTDs.

FIGS. 27-29 contain a table illustrating a hierarchy of models used to estimate the mean and covariance tensors of the DTD.

DETAILED DESCRIPTION OF SEVERAL EMBODIMENTS

General Terminology, Definitions and Abbreviations

Figure 1A:
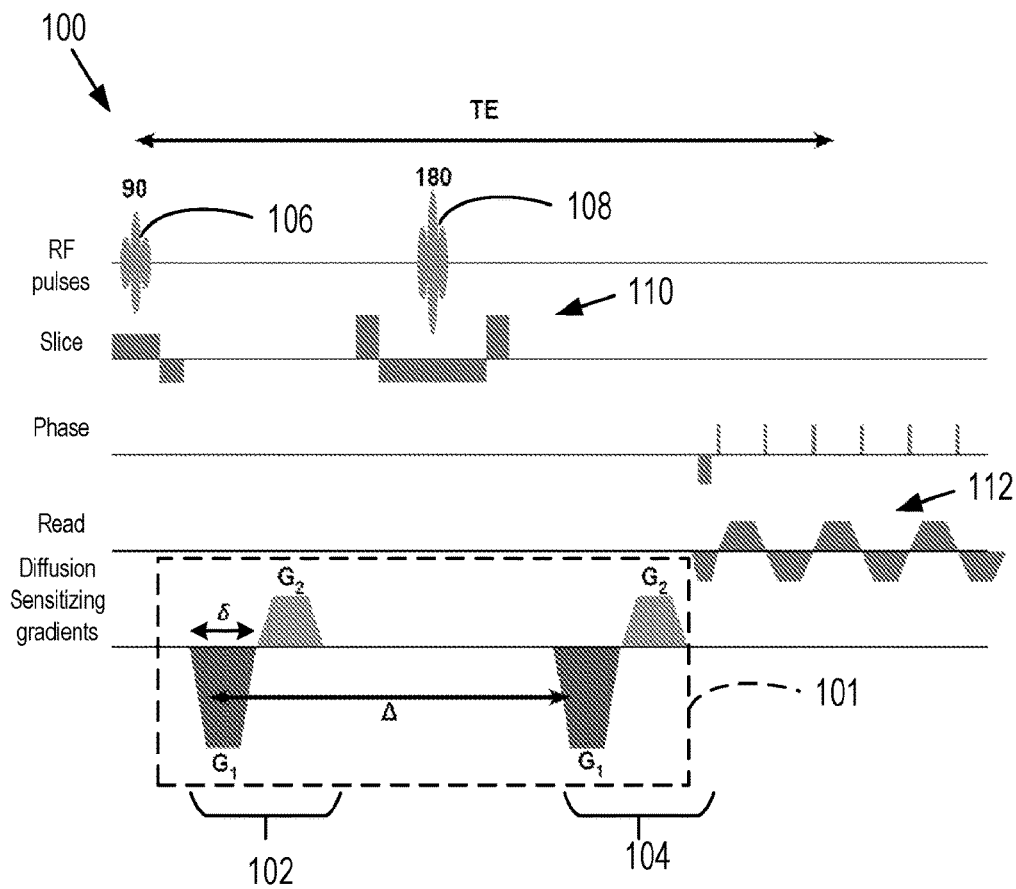
FIG. 1A illustrates a single spin echo dPFG echo-planar imaging (EPI) pulse sequence used to measure the DTD. The pulse sequence includes diffusion encoding gradient pulse pairs defined by gradient pulses $G_1$ and $G_2$, each gradient pulse having a duration $\delta$. The pulse pairs are separated by a diffusion time $\Delta$. The slice-selective RF pulses used to generate the spin echo shown as well the imaging gradients.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

The following abbreviations are used:
MR magnetic resonance
MRI magnetic resonance imaging
DTI diffusion tensor imaging
DTD diffusion tensor distribution
mPFG multiple pulsed field gradient
dPFG double pulsed field gradient
qPFG quadruple pulsed field gradient
CNTVD constrained normal tensor variate distribution (constrained in the manifold of positive definite diffusion tensors)
TR repetition time
TE echo time In the examples, tensor quantities are represented as vectors or matrices as is convenient and are indicated with boldface type. In some examples, images of specimens (in vivo or in vitro) can be obtained. As used herein, "image" refers to a visible display presented on a computer terminal or other display device as a as well as stored representations of data that is suitable for producing visual images, such as data files using jpeg, tiff, or other formats. In most examples, the disclosed methods and apparatus produce images, but single data points can be obtained.

All references cited herein are incorporated by reference in their entireties. Additional disclosure is provided in Appendices A and B.

Theoretical Framework

The MR signal from an ensemble of diffusion tensors D distributed according to a probability distribution p(D) is given by:

$$S(b) = S_0 \int p(D) \exp(-b^T D) dD + \varepsilon \quad (1)$$

wherein $S_0$ is the signal without diffusion weighing, the diffusion tensor D can be expressed as $D = (D_{xx}, D_{yy}, D_{zz}, D_{xy}, D_{xz}, D_{yz})^T$ written as a vector of independent components of a second-order symmetric diffusion tensor, b is a 3 by 3 symmetric diffusion weighting matrix $b = (b_{xx}, b_{yy}, b_{zz}, 2b_{xy}, 2b_{xz}, 2b_{yz})^T$, written as a vector with independent components, and $\varepsilon$ is an offset parameter to model noise and/or a highly restricted isotropic water compartment thought to exist in neural tissues, or other effects. Components of the symmetric diffusion weighting matrix b are functions of the applied diffusion sensitizing gradient pulses and are defined in further detail below. Assuming a constrained normal tensor variate distribution (CNTVD) for p(D), the signal equation can be approximated using Monte Carlo (MC)

integration with samples, $D_i$, drawn from the CNTVD with a given mean and covariance tensor as shown below:

$$S(b) \approx S_0 \left( \frac{\sum_{i=1}^{n} \exp(-b^\top D_i) 1(D_i \in \mathcal{M}^+)}{\sum_{i=1}^{n} 1(D_i \in \mathcal{M}^+)} \right) + \varepsilon \quad (2)$$

wherein $\mathcal{M}^+$ is the space of positive definite second-order tensors, $1(D_i \in \mathcal{M}^+)$ is the indicator function that is one when $D_i$ is positive definite and zero otherwise, and n is the number of MC samples, in some examples set to 200,000.

Example Pulse Sequence Design

A dPFG pulse sequence 100 shown in FIG. 1A can be used to generate suitable diffusion tensor weighted signals based on b-matrices of ranks 1 and 2. In this example, a set 101 of diffusion weighting pulses includes a first diffusion gradient pair 102 and a second diffusion gradient pair 104. In the example of FIG. 1, the first diffusion gradient pair 102 and the second diffusion gradient pair 104 include trapezoidal gradient pulses of magnitudes $G_1$, $G_2$ and duration $\delta$ that are applied along first and second directions that can be the same or different. In typical examples, pulse rise time is sufficiently fast that it can be neglected in b-matrix determinations. For convenience, examples using pulse pairs are described in detail, but pulse triples, quadruples, of other multi-pulse sequences associated with other b-matrices can be used. Typically, each pulse can be associated with a gradient direction and different pulses associated with different gradient directions. In FIG. 1, $G_1$, $G_2$ are shown as having different polarities but only to simplify the drawing. The diffusion gradients are separated by a diffusion time, $\Delta$. Other pulse shapes can be used such as sinusoidal, rectangular, triangular, others. The set 101 of diffusion gradient pulses is incorporated within a single spin-echo to reduce an echo time TE compared with standard blocked dPFG sequences. The two diffusion gradient pairs 102, 104 are applied after a 90° RF pulse 106 and are split symmetrically on either side of a 180° RF pulse 108 with the diffusion time $\Delta$ to eliminate or reduce concomitant gradient field effects. The 180° RF pulse need not be applied at or near a pulse delay $\Delta/2$ but only between the first diffusion gradient pair 102 and the second diffusion gradient pair 104. Imaging can be performed using slice selective RF pulses 110 and an echo planar imaging (EPI) readout 112 to reduce scan time.

Figures 2A, 2B:
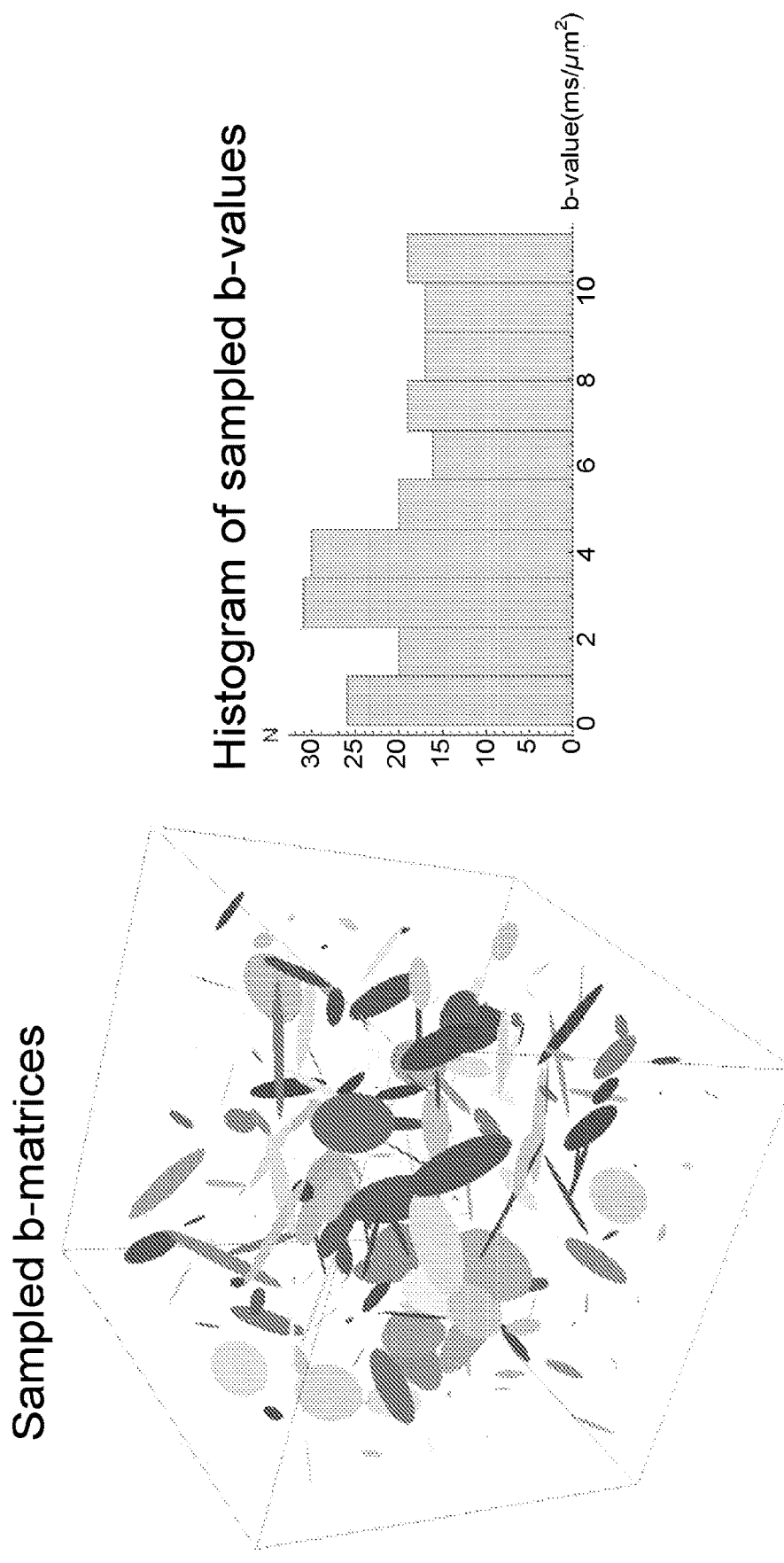
FIGS. 2A-2B illustrate an experimental design used to obtain a spinal cord DTD.

The diffusion weighting matrix (the b-matrix) for the set 101 of diffusion gradient pulse pairs, excluding imaging gradients and trapezoidal ramp times is:

$$b_{ij} = \frac{\gamma^2 \delta^2}{3} \begin{bmatrix} -(G_2^{(i)}(3G_1^{(j)} + G_2^{(j)}) + G_1^{(i)}(G_1^{(j)} + 3G_2^{(j)}))\delta + \\ 3(G_1^{(i)} + G_2^{(i)})(G_1^{(j)} + G_2^{(j)})\Delta \end{bmatrix} \quad (3)$$

wherein $b_{ij}$ is the b-value from diffusion gradient interactions between the $i^{th}$ and $j^{th}$ axis, $G_1^{(i)}$, $G_2^{(i)}$ are the $i^{th}$-component of the first and second diffusion gradient pairs respectively in the pulse sequence, i, j are integers from 1, 2, or 3, and $\gamma$ is a nuclear gyromagnetic ratio. The desired b-matrix of rank-2, b', with b-value equal to b is synthesized from two non-parallel unit vectors, $\hat{n}_1$, $\hat{n}_2$, analogous to the two gradient vectors in the traditional dPFG experiment as shown below:

$$b'_{ij} = \frac{b}{2} \left( \hat{n}_1^{(i)} \hat{n}_1^{(j)} + \hat{n}_2^{(i)} \hat{n}_2^{(j)} \right), \quad (4)$$

wherein b is a diffusion weighting magnitude associated with the diffusing weighting b-matrix. The unit vectors can be randomly oriented uniformly over a sphere with b-value magnitude uniformly distributed over a desired range (via compressed sensing) to obtain the b-matrices for DTD estimation. The physical diffusion gradient strengths in this pulse sequence required to generate the desired b-matrices for a fixed $\delta$ and $\Delta$ are obtained by solving the equation $b_{ij} = b_{ij}'$ using a non-linear least squares fitting routine in MATLAB (Mathworks, Natick, MA) or otherwise solved. In an example discussed below, b-matrices for a spinal cord acquisition included imaging gradients and ramp times that were calculated numerically and displayed as b-matrix ellipsoids in FIG. 2A with b-value ranges shown in FIG. 2B. Each of the ellipses in FIG. 2A is associated with b-values and selection of directions of the unit vectors of Equation 4.

Representative Pulse Sequences

The set 101 of diffusion weighting pulses shown in FIG. 1A is conveniently applied with MR instruments but is only one specific example. In an example illustrated in FIG. 1B, a pulse sequence 150 includes a 90° pulse (a $\pi/2$ pulse) 152 followed by a set 151 of diffusion weighting pulse pairs that includes a first pulse pair 154 and a second pulse pair 162 separated by a diffusion time $\Delta$. A 180° pulse (a $\pi$ pulse) 160 is applied during the diffusion time $\Delta$ between the first pulse pair 154 and the second pulse pair 162. The first pulse pair 154 and the second pulse pair 162 are typically the same or substantially the same. For example, an initial pulse 155 of the first pulse pair 154 is typically the same as an initial pulse 163 of the second pulse pair 152 and a final pulse 156 of the first pulse pair 154 is the same or substantially the same as a final pulse 164 of the second pulse pair 162. The initial and final pulses can have various pulse shapes, durations, rise times, fall times, or other modulations. An initial pulse of a pulse pair need not have the same pulse characteristics as a final pulse of the pulse pair. While it is convenient that the first pulse pair and the second pulse pair as the same or substantially the same, the pulse pairs can be different but balanced or matched to provide diffusion sensitization and to compensate concomitant gradient fields. A final pulse in a pulse pair can be applied with a delay after application of an initial pulse, although such delays are typically preferred to be much less than the diffusion time $\Delta$. Such variations in pulse shapes can result in more complex b-matrices that that of Equation 3 and can be determined as described in Basser et al., "Estimation of the Effective Self-Diffusion Tensor from the NMR Spin Echo," J. Magn. Res. B103:247-254 (1992) (hereinafter "Basser 1"), which is incorporated herein by reference. First and second pulse pairs are generally selected so that, absent diffusion, changes in spins produced by the first pulse pair are reversed or undone by the second pulse pair. In the example in FIG. 1B, pulse orders can be interchanged. For example, pulses 155, 156 are applied in the order shown followed by either pulses 163, 164 or pulses 164, 163. Similarly, pulses 155, 156 can be applied in the order shown or in order as pulses 156, 155. Differing pulse orders are generally associated with different b-matrices.

Representative Specimen Measurements

In one example, an adult rhesus macaque monkey (*Macaca mulatta*) was perfused for the ex vivo MRI studies with procedures as adhered to the Guide for the Care and Use of Laboratory Animals (National Research Council), and under a protocol approved by the Institutional Animal Care and Use Committee of the National Institute of Mental Health (NIMH) and National Institute of Health (NIH). Tissue used in this study was obtained at necropsy. Prior to that, the animal was deeply anesthetized with sodium pentobarbital and perfused transcardially with 0.5 liter of saline, followed by 4 liters of 4% paraformaldehyde, both in 0.1 M phosphate buffer (pH 7.4). After the perfusion the brain was removed with intact cervical, thoracic and lumbar segments of the spinal cord and post-fixed for 8 hours in the same buffered paraformaldehyde solution and then transferred into 0.1M phosphate buffered saline (PBS) with sodium azide. A portion of the cervical spinal cord was dissected for MR imaging.

MRI data were acquired on a 7T vertical Bruker widebore Avance III MRI scanner (Bruker Biospin, Billerica, MA) equipped with a Micro2.5 microimaging probe and three GREAT60 gradient amplifiers. The DTD pulse sequence, gradient hardware were calibrated and b-matrix calculations were vetted using a 3.9 cSt cyclic polydimethylsiloxane (PDMS) phantom in a 5-mm NMR tube at ambient bore temperature using the following parameters: $\Delta/\delta=20/5$ ms, TR/TE=3000/50 ms and 8 averages with 100 μm in-plane spatial resolution and 2-mm slice thickness using 8-shot EPI. A total of 216 different b-matrices were sampled with b-values ranging from 0.25-22 ms/μm². A conventional DTI acquisition was also performed to compare the estimated second-order mean diffusion tensor with that obtained from DTD. Single PFG measurements were performed with field of view, spatial resolution, TR/TE, diffusion gradient pulse width and diffusion time identical to that of the DTD acquisition except for the number of averages which was one. A total of 21 gradient directions were acquired at b=1 ms/μm² with an additional b=0 ms/μm² scan.

The spinal cord was wrapped in gauze and immersed in perfluoro polyether (Fomblin, Solvay Specialty Polymers, Italy) for susceptibility matching and to achieve better image contrast. It was then sandwiched between susceptibility matched plugs (New Era, Vineland, N.J.) in a 15 mm NMR tube for mechanical stability and improved $B_0$ homogeneity prior to imaging. The maximum b-value for the spinal cord acquisition was reduced to 12 ms/μm², to avoid sensitizing the signal to more than one compartment (i.e., greater than one pair of mean and covariance tensors) with the rest of the DTD acquisition identical to that of PDMS. The DTI acquisition for spinal cord is similar to that of PDMS except for echo time and number of averages which was 40 ms and 4 respectively.

The second-order mean diffusion tensor and fourth-order covariance tensor were both estimated from the MR signal using methods described in Magdoom Kulam Najmudeen et al. "A New Framework for MR Diffusion Tensor Distributions," https://doi.org/10.1101/2020.05.01.071118 (2020) (hereinafter "New Framework"), which is incorporated herein by reference. Briefly, the different symmetries of the mean and covariance tensors are used to build a family of nested hierarchical models from which a most parsimonious model describing the data can be chosen using the Bayesian information criterion (BIC). For a given nested model, the MR signal is fit to Equation 2 using simplex-type numerical optimization algorithm or other procedures to estimate the unknown parameters.

The estimated CNTVD parameters are used to delineate several microstructural features within the voxel, which are also described in greater detail in the New Framework. Briefly, the micro-second-order diffusion tensors in the voxel are simulated by drawing samples from the CNTVD with the estimated mean and covariance tensors. The eigensystem for the mean diffusion tensor is obtained as in Basser 1, while that for the covariance tensor is described using a decomposition entailing outer products of second-order eigentensors as shown in Basser and Pajevic, "Spectral decomposition of a 4th-order covariance tensor: Applications to diffusion tensor MRI," Signal Processing 87(2):220-236 (2007) (hereinafter "Basser and Pajevic"). Microscopic fractional anisotropy (μFA) is computed using the following definitions:

$$\mu FA = \langle FA(D) \rangle \quad (5)$$

wherein FA=FA($\langle$ D$\rangle$) is the non-commuting fractional anisotropy operator as described in Basser, "Inferring microstructural features and the physiological state of tissues from diffusion-weighted images," NMR in Biomedicine, 8(7): 333-344 (1995) and Basser, "New Histological and Physiological Stains Derived from Diffusion-Tensor MR Images," Annals NY Academy of Sciences, 820(1):123-138 (1997). The angle brackets denote averaging over an ensemble of micro-diffusion tensors generated from a given CNTVD. The size heterogeneity in the voxel is characterized by the coefficient of variation of the trace of micro-diffusion tensors, $V_{size}$, given by:

$$V_{size} = \sqrt{\frac{1}{9}\sum_{i=1}^{3}\sum_{j=1}^{3}\Omega_{ij}} \quad (6)$$

wherein $\Omega$ is the fourth-order covariance tensor repackaged as a 6×6 matrix as shown in Basser and Pajevic. The shape heterogeneity in a voxel is expressed as the coefficient of variation of the ratios of sorted eigenvalues of the micro-diffusion tensors, $CV_{shape}$, as given by:

$$V_{shape} = \sqrt{\text{Var}\left(\frac{\lambda_2}{\lambda_1}\right) + \text{Var}\left(\frac{\lambda_3}{\lambda_2}\right)} \quad (7)$$

wherein $\lambda_1 > \lambda_2 > \lambda_3$ are the individual eigenvalues of the micro-diffusion tensor, Var is the sample variance, and angle brackets again denote the average over the ensemble of micro-diffusion tensors. Orientation heterogeneity in a voxel is related to the gain in entropy of the orientation distribution function (ODF) due to ensemble averaging of the diffusion tensor, $\Delta S_{ODF}$, as given by:

$$\Delta S_{ODF} = S_{ODF}(\langle D \rangle) - \langle S_{ODF}(D) \rangle \quad (8)$$

$$S_{ODF}(D) = -\int_0^{2\pi}\int_0^{\pi} ODF(D(\theta,\phi))\log(ODF(D(\theta,\phi)))\sin\theta d\theta d\phi \quad (9)$$

wherein $S_{ODF}(D)$ is the ODF entropy for the diffusion tensor and ODF is the non-commuting ODF operator.

The orientation heterogeneity in a voxel can be expressed as the extent of orientation dispersion of eigenvectors within a DTD motif as a parameter $V_{orient}$:

$$V_{orient} = \min_{i=1,2,3} \sqrt{\frac{\beta_2^i + \beta_3^i}{2\beta_1^i}}, \quad (10)$$

wherein $\beta_1^i > \beta_2^i > \beta_3^i$ are the eigenvalues of the mean second order dyadic tensor formed by averaging the outer products of the $i^{th}$ eigenvector of the micro-diffusion tensor with itself. $V_{orient}$ takes a value of zero for coherently oriented diffusion tensors and one for randomly oriented diffusion tensors irrespective of their size and shape. The efficacy of the proposed stains in capturing the desired heterogeneity can be evaluated by discretely and continuously mixing populations of diffusion tensors of varying size, shape and orientation.

Representative Results

Figure 3:
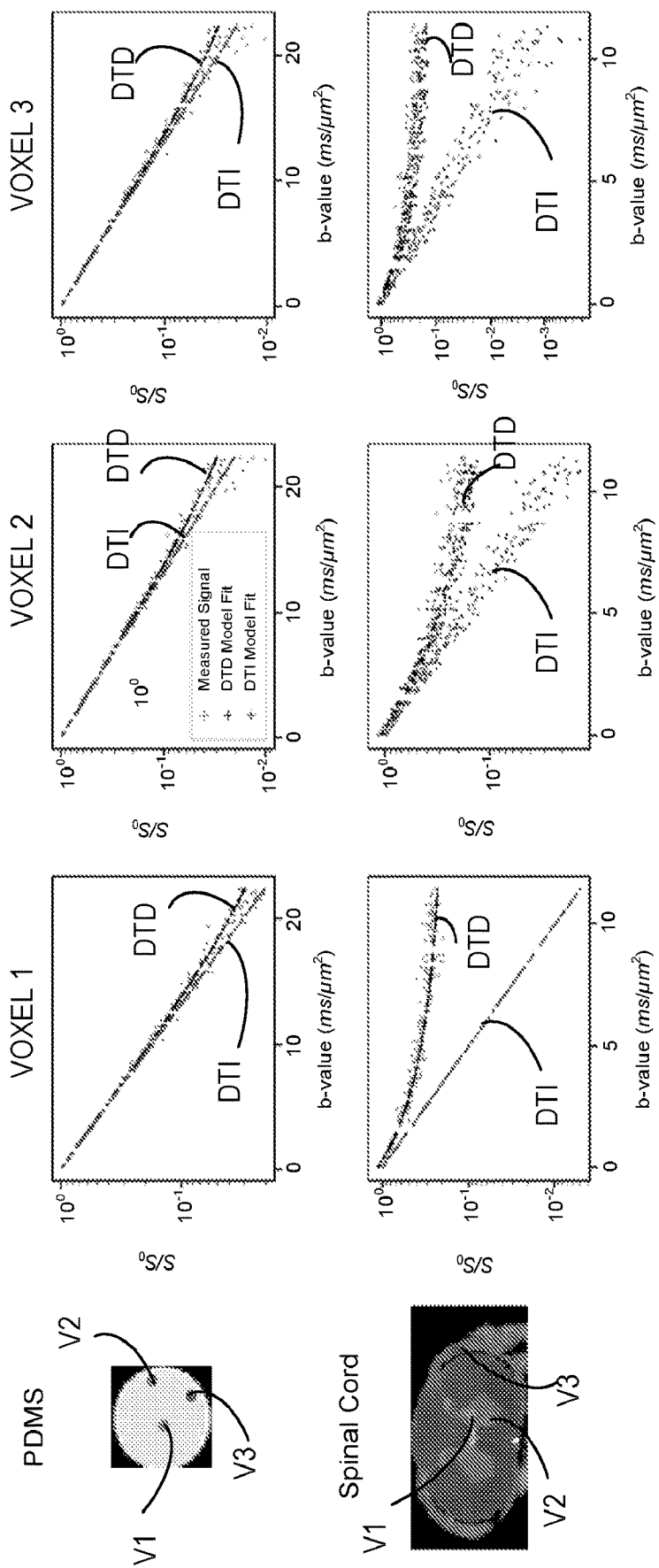
FIG. 3 illustrates a DTD model fit for selected voxels in polydimethylsiloxane (PDMS) and spinal cord images. The three chosen voxels in each case are shown in their respective $S_0$ images on the left column. These voxels were chosen randomly for PDMS, and in the lateral horn (V1), ventral horn (V2) and dorsal nerve root (V3) in the spinal cord sample. The measured MR signal attenuation in these voxels is plotted as points with a fitted signal. Fit from the DTI model is shown for reference.

The suitability of CNTVD to describe the diffusion attenuated signal in PDMS and spinal cord, and the accuracy of the signal inversion framework is shown in FIG. 3. The measured and fitted signal attenuation is plotted against the b-value for a set of three voxels in both the samples. These voxels were randomly chosen for the PDMS, and in the gray matter and dorsal nerve root for the spinal cord. Spinal cord white matter was excluded as its estimated covariance tensor was zero resulting in the DTI model.

The PDMS voxels are expected to have an isotropic second order mean diffusion tensor and zero fourth order covariance tensor. The fitted signal matches closely the mono-exponentially decaying measured signal. The deviation of the fitted signal from the DTI model at large b-values results from the offset parameter which models noise in this case. The signal attenuation profile in the spinal cord is more complex than that in PDMS. The plateauing of the measured signal at large b-values for all chosen voxels is evident in FIG. 3 justifying the use of an offset parameter. The fitted signal is also in good agreement with the measured signal in these voxels showing the versatility of the disclosed approaches.

Figure 4:
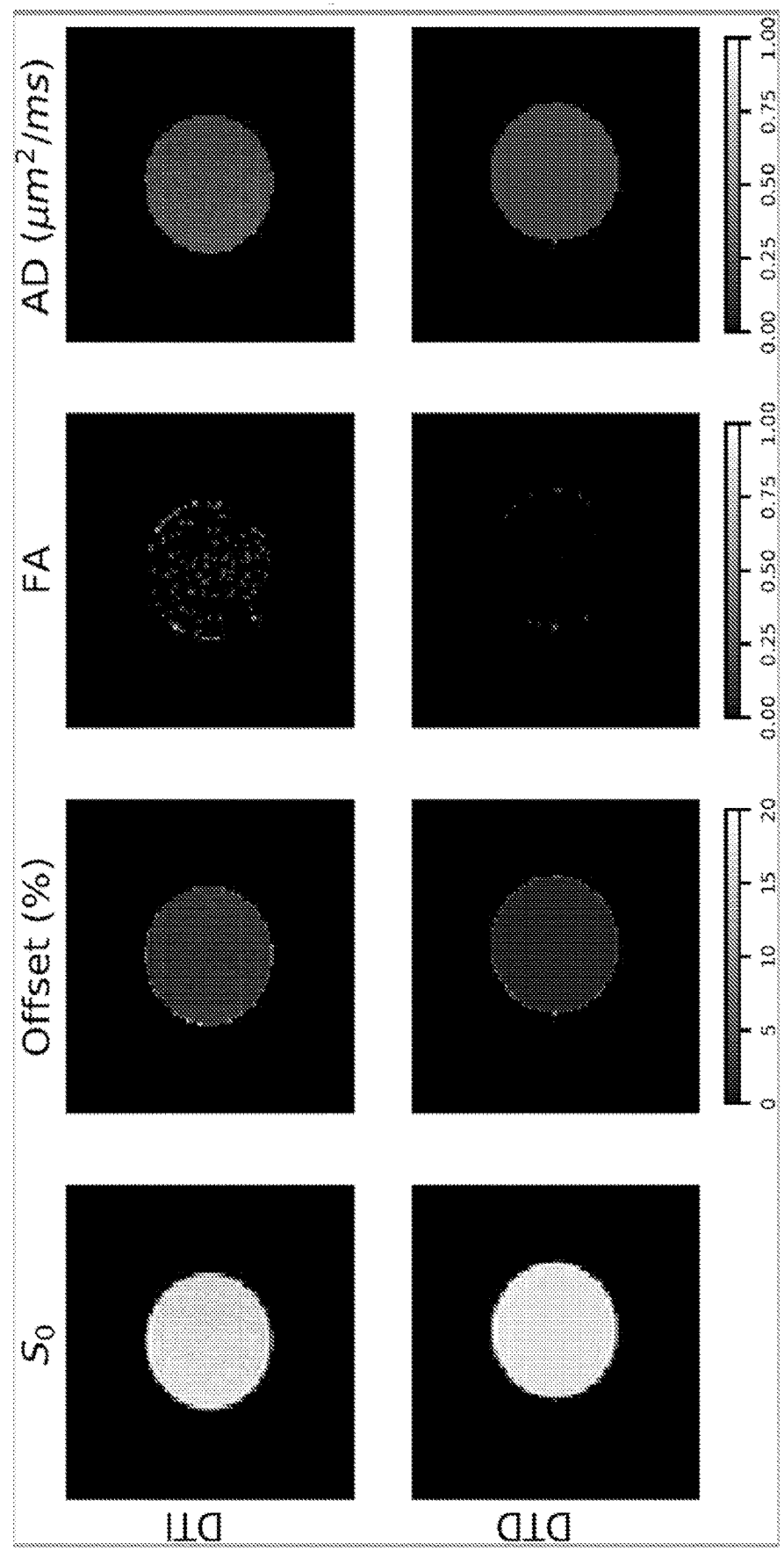
FIG. 4 shows a comparison of the mean tensor for a PDMS phantom estimated using conventional DTI (top row) and DTD (bottom row). The offset parameter is expressed as percent of the $S_0$ image which represents diffusion independent MR signal. FA and AD refers to the fractional anisotropy and average diffusivity respectively.

The metrics describing the mean diffusion tensor along with maps of $S_0$ and offset parameter obtained from DTD and conventional DTI protocols for PDMS phantom are shown in FIG. 4. Quantitative comparisons are made by averaging the parameter over a region of interest (ROI) in the center of the sample. The parameters obtained using DTI were noisier compared to that obtained from DTD. Gibbs ringing was evident in $S_0$ map obtained using both methods. The average diffusivity (AD) or mean diffusivity (MD) measured using DTD and DTI were approximately equal to 0.175 and 0.184 $\mu m^2/ms$ respectively. The FAs estimated by both methods were approximately equal to zero. The offset parameter expressed as percent of $S_0$ for DTD and DTI are approximately 1 and 2%, respectively.

Figure 5:
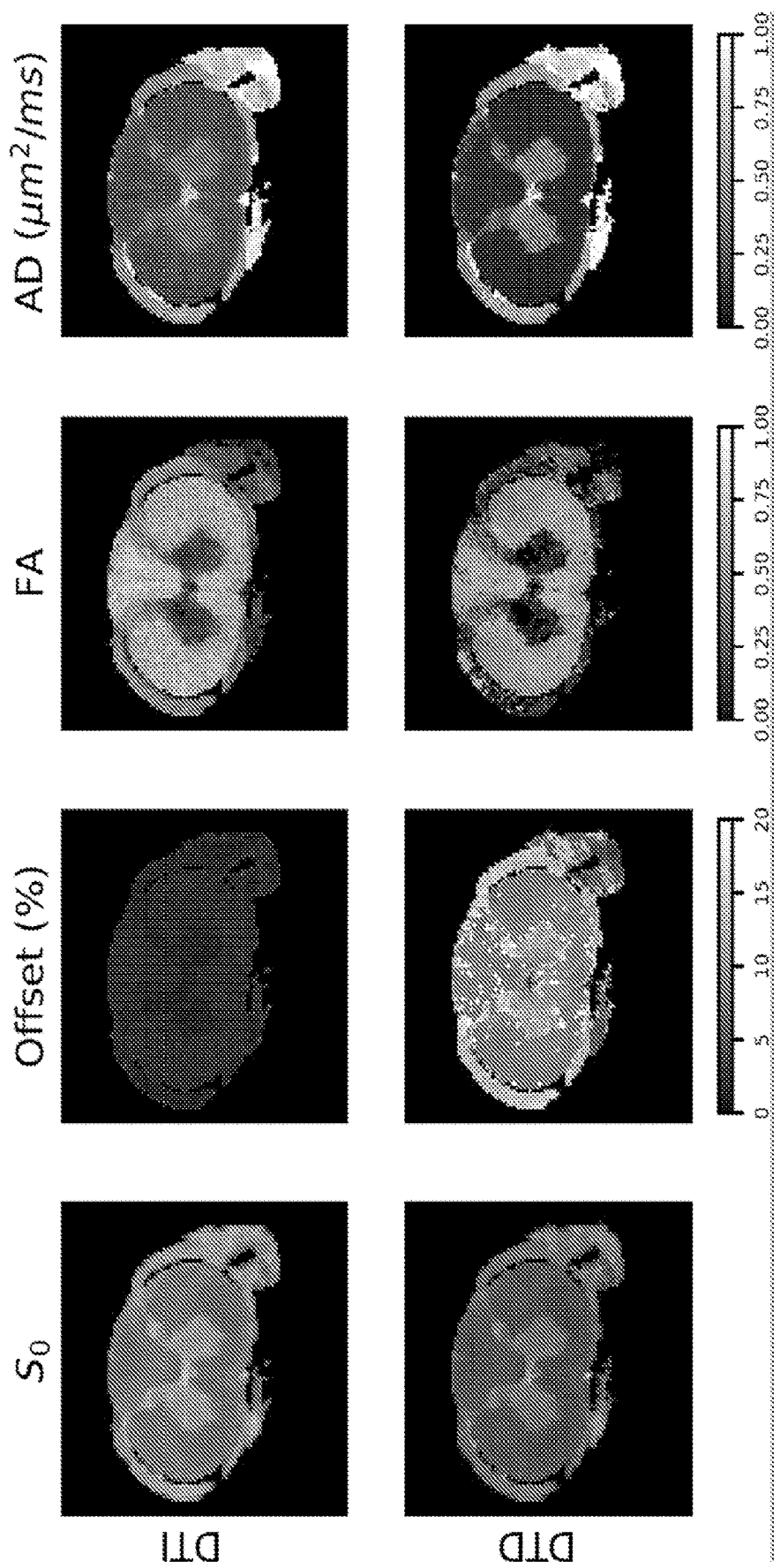
FIG. 5 shows a comparison of the mean tensor for spinal cord estimated using conventional DTI (top row) and DTD (bottom row). The offset parameter is expressed as percent of the $S_0$ image which represents diffusion independent MR signal. FA and AD refer to the fractional anisotropy and average diffusivity respectively.

The mean diffusion tensor metrics for spinal cord along with maps of $S_0$ and offset parameter obtained using DTD and conventional DTI protocols are shown in FIG. 5. Quantitative comparisons are made by averaging the parameter over appropriate ROIs representing spinal cord white and gray matter, and dorsal nerve root. The $S_0$ estimates from both protocols were qualitatively similar. The offset parameter estimate from both protocols were different in intensity and contrast. The DTD estimate was overall significantly higher compared to that obtained from DTI. The DTI estimated offset in spinal cord white matter (2.5%) was higher compared to gray matter (1.5%) while the DTD estimate was relatively uniform throughout the spinal cord (12%). The DTD estimated FA had similar contrast but was smaller in magnitude (20-80%) compared to that obtained from DTI. FA was smallest in the lateral horn followed by the ventral and dorsal horns of spinal cord, and uniform within the white matter. The AD in spinal cord gray matter and dorsal nerve root estimated using DTD and DTI protocols were approximately equal to 0.4 $\mu m^2/ms$. However, the DTD estimate was 50% lower in spinal cord white matter compared to that obtained from DTI.

Figure 6:
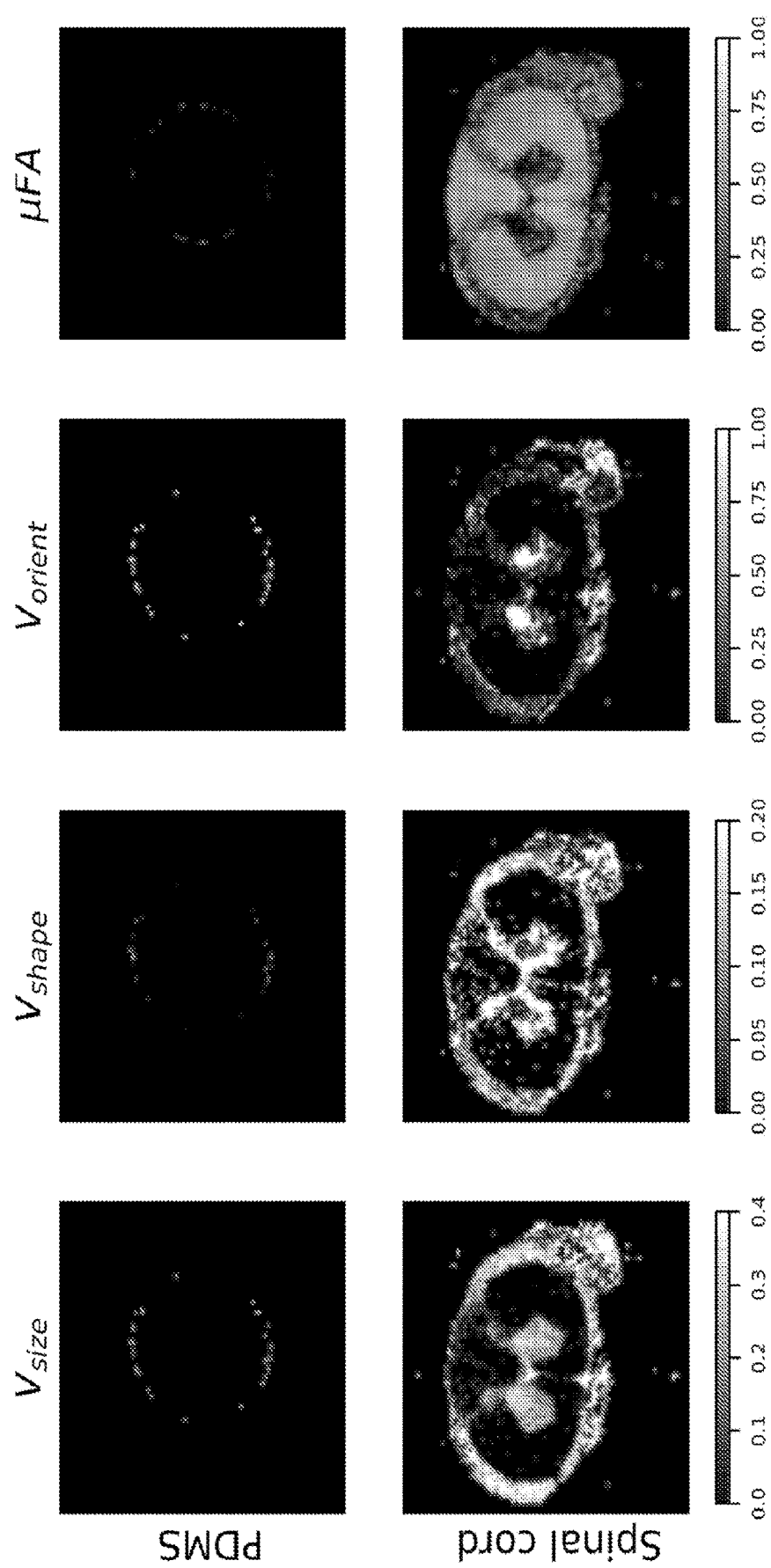
FIG. 6 shows DTD stains showing heterogeneity and anisotropy in PDMS (top row) and spinal cord (bottom row). The stains, $V_{size}$, $V_{shape}$, and $V_{orient}$ represent size, shape and orientation heterogeneity respectively. The stain µFA, represents microscopic fractional anisotropy.

Maps of FA and size, shape and orientation heterogeneity stains obtained for PDMS and spinal cord are shown in FIG. 6. The estimated heterogeneity metrics and FA in PDMS were very small, close to zero. In the spinal cord, all the stains exhibited bilateral symmetry with clearly demarcated regions within the gray matter and uniformity within the white matter. The size heterogeneity measure in the lateral horn was approximately 12 and 60% larger than that in the ventral and dorsal horns, respectively. The shape and orientation heterogeneity measures showed an opposite trend (lateral horn<ventral horn<dorsal horn). The FA map was elevated by as much as 50% in the dorsal and ventral horns of the spinal cord, and in the dorsal nerve root.

Figure 7:
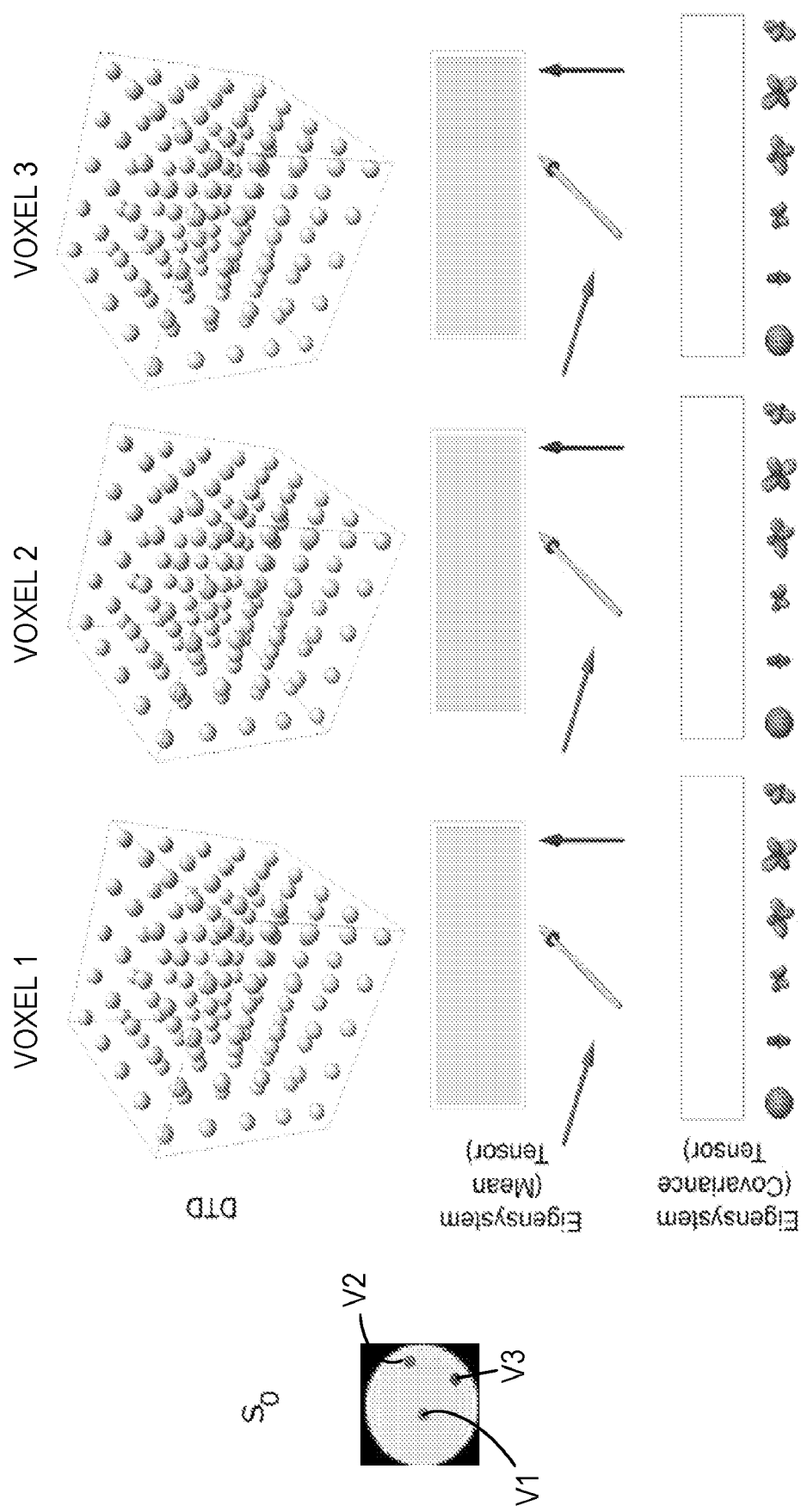
FIG. 7 illustrates DTD and associated eigensystem for the mean and covariance tensor for select voxels in PDMS. The three chosen voxels V1-V3 are highlighted in the $S_0$ image on the left column. The eigensystem for the mean tensor is shown using eigenvectors and associated eigenvalues (white—0 and black—maximum). The eigensystem for the 4th order covariance tensor is shown using eigentensors and associated eigenvalues.

The estimated DTD in three randomly chosen voxels in the PDMS sample were examined more closely in FIG. 7. The simulated micro-diffusion tensors were displayed as ellipsoids, and their mean and covariance tensors are characterized by their respective eigensystems and glyphs. The simulated micro-diffusion tensors in all the three chosen voxels were uniform and isotropic. The eigenvalues of the mean tensor were equal and non-zero with the eigenvectors pointing in x, y and z directions. The eigenvalues of the covariance tensor were zero for all the chosen voxels.

Figure 8:
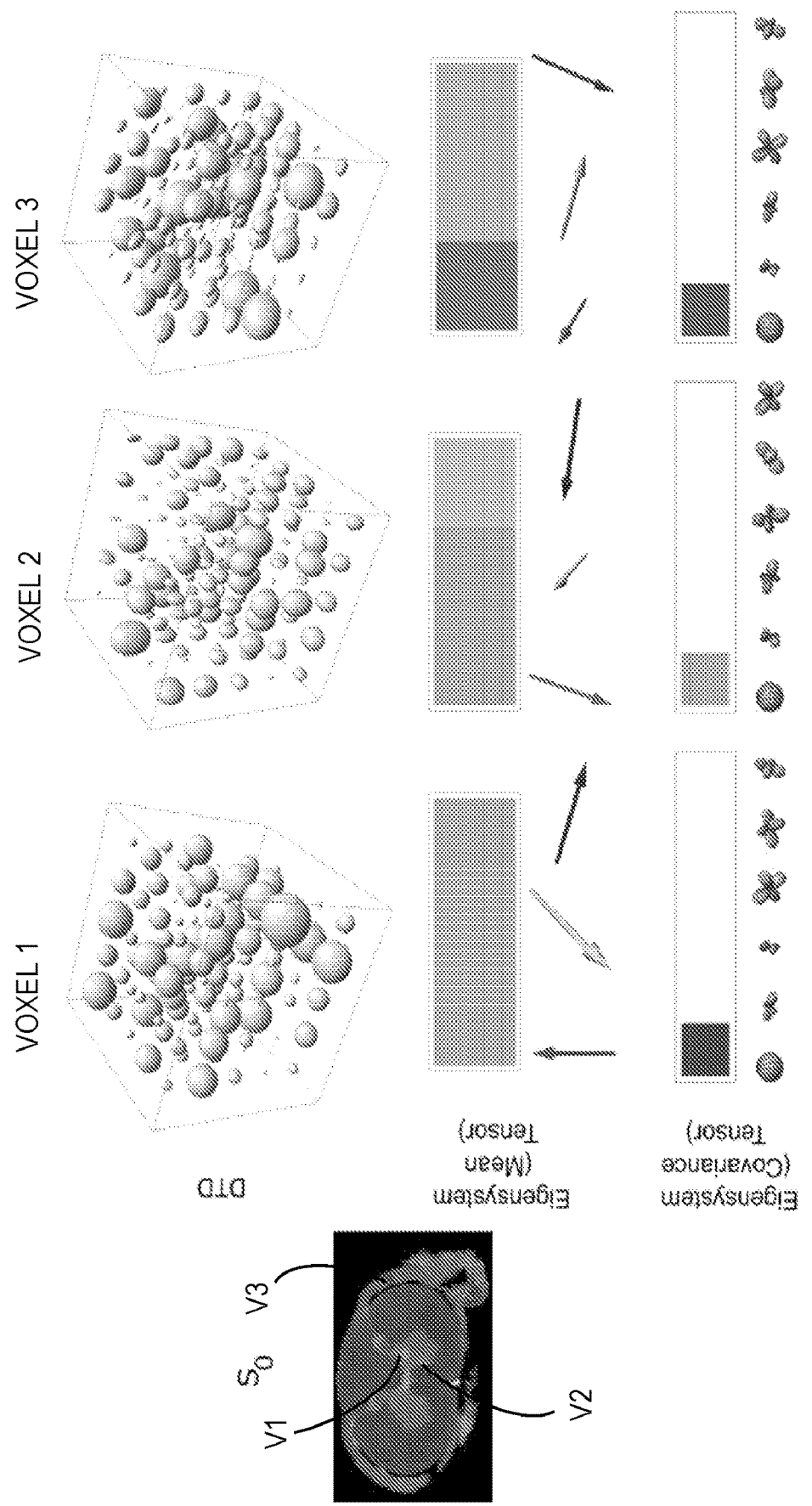
FIG. 8 illustrates DTD and associated eigensystem for the mean and covariance tensor for selected voxels (V1-V3) in spinal cord. The three chosen voxels corresponding to different parts of the spinal cord gray matter (lateral horn—V1 and ventral horn—V2) and dorsal nerve root (V3) are highlighted in the $S_0$ image on the left column. The eigensystem for the mean tensor is shown using eigenvectors and associated eigenvalues (white—0 and black—maximum). The eigensystem for the covariance tensor is shown using eigentensors and associated eigenvalues.

A similar analysis performed on the spinal cord on two voxels in gray matter and one in the dorsal nerve root is shown in FIG. 8. The simulated micro-diffusion tensors in the lateral horn of the spinal cord are isotropic and non-uniform similar to a spherical emulsion. The ventral horn has a mix of oblate and spherical tensors of varying sizes while the dorsal nerve root had prolate tensors of varying sizes. The eigenvalues of the mean tensor exhibited isotropic symmetry ($\lambda_1 = \lambda_2 = \lambda_3$) for the lateral horn, oblate symmetry ($\lambda_1 = \lambda_2 > \lambda_3$) for the ventral horn, and prolate symmetry in the dorsal nerve root ($\lambda_1 > \lambda_2 = \lambda_3$). The lateral horn and dorsal nerve root have one non-zero eigenvalue for the covariance tensor corresponding to the isotropic eigentensor. The ventral horn however had three non-zero eigenvalues with the principal value corresponding to the isotropic eigentensor. The comparison of the mean diffusion tensor obtained using DTD and DTI shows the accuracy of DTD estimation. Good agreement between fitted and measured signals shows the validity of the model in both samples. This is expected since at the length scale probed by DTD which still includes a multitude of cells and processes, a Gaussian distribution of diffusion tensors is a reasonable approximation for p(D). Gaussian diffusion within these micro-compartments, another assumption of the DTD methodology, is also reasonable given the likely absence of fully restricted compartments in the neural tissue due to the permeability of the cell membranes to water. The DTI estimate of the mean diffusion tensor was overall noisier compared to that obtained from DTD likely due to there being fewer diffusion weighted images (DWIs) and signal averages used to estimate it.

In the PDMS, the isotropic model was correctly selected for the mean tensor with mean diffusivity less than 5% from the DTI estimate and zero FA. The estimated covariance tensor was zero as expected from the uniform DTD in the sample. The offset parameter which models noise in this case was less than 5% of the signal consistent with the DTI model fully explaining the MR signal attenuation. These results obtained using large b-values show the accuracy of the b-matrix calculation and gradient pulses, and that the disclosed pulse sequence permit measurements free of artifacts.

In the spinal cord, the so-called dot-compartment thought to be present in neural tissue described by the offset parameter in our model, was invisible with the conventional DTI protocol due to the small b-values used. The DTD framework however in addition to capturing the heterogeneity also captured this slowly diffusing compartment in the tissue. Using spherical encoding, Tax et al., "The dot compartment revealed? Diffusion MRI with ultra-strong gradients and spherical tensor encoding in the living human brain," NeuroImage 210:116534 (2020) showed that the dot-compartment accounted for approximately 10% of the signal in the human brain. The reductions in FA with the DTD analysis is expected since the DTD model correctly accounts for anisotropy and heterogeneity compared to the DTI model. The reduction in AD observed in spinal cord white matter compared to that measured using conventional DTI protocol is likely due to the large b-value used which may have sensitized both intra- and extra-axonal water, given that DTI model was chosen for this region (i.e., zero covariance).

Generalized mPFG Measurement Method

Disclosed are novel mPFG experiments which readily generates arbitrary b-matrices of rank one, two or three in a single spin-echo using standard trapezoidal diffusion gradient waveforms. The pulse sequence could be adapted for mPFG MR experiments beyond dPFG by successively adding gradients on either side of the successive 180° RF pulses. The use of trapezoidal diffusion gradients leads to efficient utilization of gradient hardware per unit time (i.e., shorter echo time for a given b-value) as compared to existing q-trajectory approaches. Using the symmetry of the gradients in the spin echo sequence concomitant gradient field signal loss artifacts can be reduced or eliminated. These artifacts worsen with increasing gradient strength and sample size, and hence are particularly detrimental to DWI applications.

The use of trapezoidal gradients also enables analysis of signal decay data using well established q-space formalisms as shown below. The echo attenuation, E, resulting from an ensemble of pores is given by, $$E(q_1,q_2)=\iiiint \rho(r)\exp(-iq_1\cdot r)P(r'|r,\delta)\exp(-iq_2\cdot r')P(r''|r',\Delta)\exp(iq_1\cdot r'')P(r'''|r'',\delta)\exp(iq_2\cdot r''')drdr'dr''dr''' \quad (10)$$

where q is a time integral under the diffusion gradient pulse, r is a spin position, $\rho(r)$ is an initial spin density at r and $P(r_2|r_1,dt)$ is the propagator which is the conditional probability for the spins to move from $r_1$ to $r_2$ in a time interval, dt. In the limit the spins have traversed through the entire pore during diffusion time, $\Delta$, and mixing time ($\tau_m=\delta$), the propagator for both the intervals becomes equal to the spin density. The resulting expression for echo attenuation is identical to that obtained from the traditional dPFG as shown below:

$$E(q_1,q_2)=\langle |\tilde{\rho}(q_1)|^2|\tilde{\rho}(q_2)|^2\rangle \quad (11)$$

where $\tilde{\rho}$ is the Fourier transform of the spin density, also known as the pore spectral density. In the limit of short mixing time but long diffusion time, the propagator during the mixing interval reduces to delta function resulting in the following expression for echo attenuation:

$$E(q_1,q_2)=\langle |\tilde{\rho}(q_1+q_2)|^2\rangle \quad (12)$$

which is different from that obtained from traditional dPFG. However expanding the pore spectral density using a Taylor series, it can be shown that the new method retains salient features of traditional dPFG experiments such as dependence of the MR signal in porous media with relative orientation of the two gradient pairs, and halving of zero-crossing in diffusion-diffraction experiments in the short mixing time limit. It can be observed that in this short mixing time limit, the DTD model is recovered when Gaussian propagator is assumed during the diffusion time interval. The above analysis could be extended to other mPFG experiments such as velocity exchange spectroscopy (VEXSY), diffusion-diffusion correlation spectroscopy (DDCOSY), MRI applications, etc., with the prospect for translation to the clinic. It also shows that the diffusion gradient parameters which determine the sensitivity of the measurement to micro-structural features are well defined in our measurement unlike the complex q-trajectory approaches.

DTD in Neural Tissue

The Gaussian micro-diffusion compartments observed in neural tissue could arise from the heterogeneous geometry of neuronal soma, axons and extra-cellular spaces. In the central nervous system, the neuronal soma diameters range from 10-50 µm, and axon diameters range from 0.16-9 µm with the mean diameter less than 1 µm. The axons in the peripheral nervous system are however larger ranging from 10-20 µm with mean around 15 µm as observed in the sacral nerve root. The extracellular space in the neural tissue was found to range from 38-64 nm.

The ability of DTD imaging to capture tissue heterogeneity at various length scales depends on the diffusion gradient parameters and sample diffusivity. The gradient strength determines the pitch of the magnetization phase helix (i.e.

$$\frac{2\pi}{|q_1+q_2|}$$

in the short mixing time limit as per Equation 12 wound on the sample, which determines the amount of signal dephasing. The gradient pulse width and average diffusivity of the sample determine the smallest population of spins that could be uniquely tagged/distinguished in a PFG experiment (Mitra and Halperin, "Effects of finite gradient-pulse widths in pulsed-field-gradient diffusion measurements," *Journal of Magnetic Resonance, Series A* 113.1 (1995): 94-101). The tissue compartments smaller than the diffusion displacement of spins during the encoding period (i.e., $\delta$) cannot be differentiated by a phenomenon called pore saturation. Thus, the length scale at which the tissue heterogeneity is probed in a DTD experiment is roughly equal to $\sqrt{2D\delta}$. In order to effectively observe a compartment, it is also important to choose an appropriate gradient strength such that the pitch of the magnetization helix wound by the gradient is on the order of $\sqrt{2D\delta}$. Thus, sensitizing small compartments requires large gradient strengths and rapid slew rates. The largest compartment sensitized by the measurement is determined by the extent of diffusion displacement during the diffusion time which is limited by the $T_2$-relaxation time of the sample.

Given the minimum diffusion gradient pulse width in our measurement and smallest measured average diffusivity, the diameter of the smallest resolvable compartment in the spinal cord is approximately 4 μm. Given the largest b-value of the measurement, the smallest pitch of the magnetization helix wound by the gradient is approximately 6 μm. Thus, the effective micro-voxel size probed using this modeling framework and experimental design and sample diffusivity is roughly 4 μm. At this length scale, it is clear that the heterogeneity in spinal cord white matter and extra-cellular space cannot be detected by this measurement, which is in-line with the observed results that the data is adequately described by the DTI model. Setting the resolving power of the DTD experiment to the average axon diameter (i.e. 1 μm) and using the measured mean diffusivity, the diffusion gradient strength and pulse duration required to probe axonal heterogeneity at this length scale are approximately 23 T/m and 0.5 ms, respectively, which is beyond the range of our gradient system.

The DTD measurement however did detect heterogeneity in spinal cord gray matter and nerve roots, consistent with the above prediction. In the nerve root, an anisotropic emulsion motif was observed which is interpreted to arise from bundles of axons of varying diameters. In the lateral horn of the spinal cord, the observed isotropic emulsion motif likely arises from a distribution of neuronal cell bodies of varying sizes found in this region. In the dorsal and ventral horn of the spinal cord, the size and shape heterogeneity in the DTD likely arises from the mixture of cell bodies (spheres) and axons (prolate/oblate) entering/leaving the horn of the spinal cord. This exhibits the versatility of our approach to capture mixtures of heterogeneities present within a voxel.

Microstructural Stains

Disclosed herein is a family of new microstructural stains that independently characterize size, shape, and orientation heterogeneity and are mapped within an imaging volume. The stains show well defined bilateral parcellation of the gray matter. The higher size heterogeneity stain in the lateral horn compared to the dorsal horn is consistent with histological observations of cell sizes in cat spinal cord. The smallest and largest variation in cell sizes are known to occur in lamina I and lamina VII of the spinal cord gray matter which covers a portion of dorsal and lateral horns of the spinal cord. The presence of coherent white matter (prolate/oblate) in addition to cell bodies (spheres) in the dorsal and ventral horn is reflected in higher shape and orientation heterogeneity stains. The increase in μFA in these regions is attributed to the shape heterogeneity present in these regions.

The proposed stains could inform normal and abnormal neurophysiology or neuropathology studies. The size heterogeneity stain may aid with cortical parcellation where different layers of the cerebral cortex are known to have different cell sizes. A reduction in the shape heterogeneity stain in gray matter may indicate demyelination of the axons entering the region. While this approach is applied to an isotropic phantom and neural tissue in this disclosure, this approach is readily applicable to imaging a broad range of tissues and tissue types, and various materials suitable for MR analysis.

Figure 9:
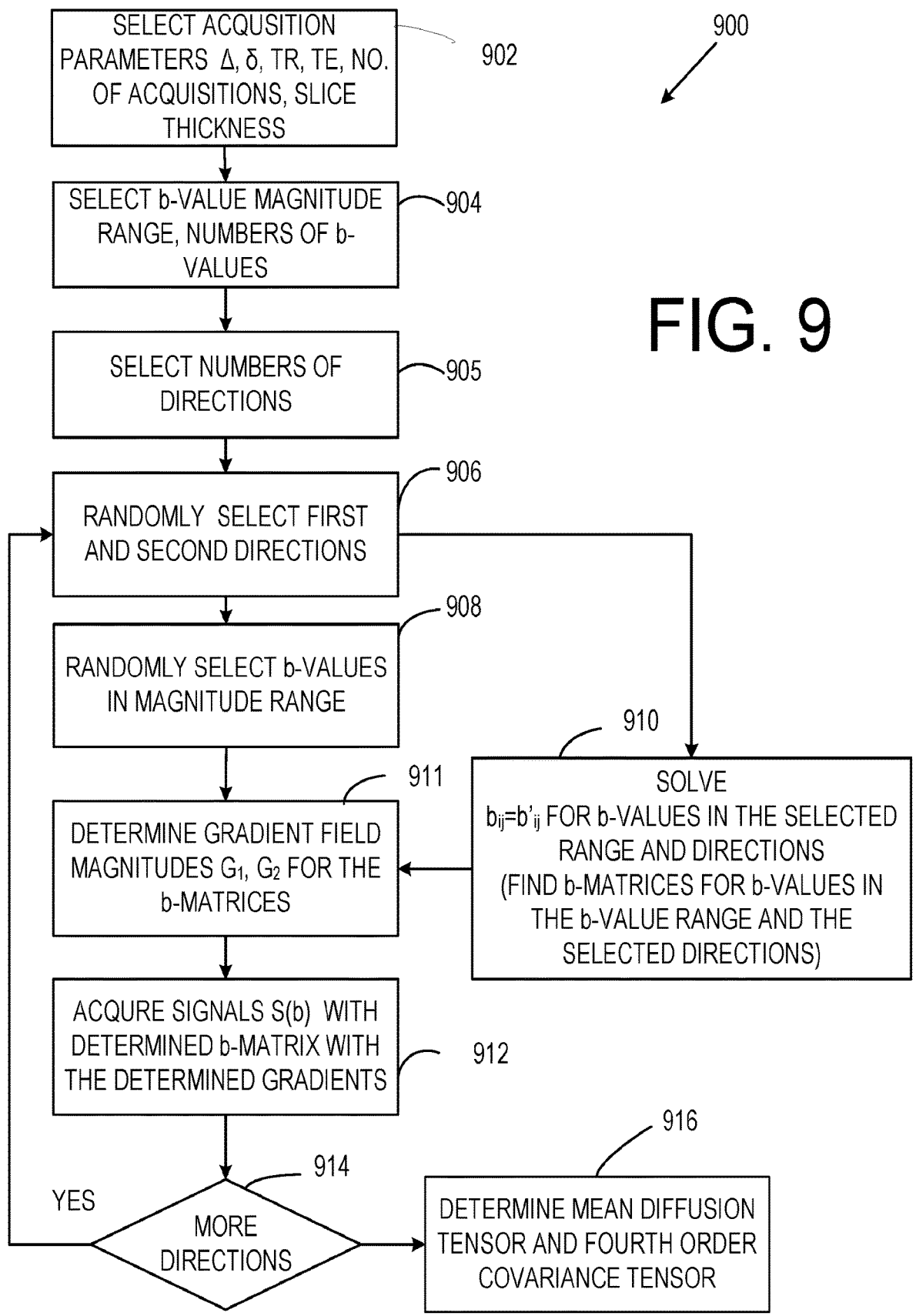
FIG. 9 illustrates a representative method of determining a second-order mean diffusion tensor and a fourth-order covariance tensor using random selection.

Methods of Determining Second-Order Mean Diffusion Tensor and Fourth-Order Covariance Referring to FIG. 9, a representative method 900 of determining one or both of a mean diffusion tensor and an associated fourth-order covariance tensor includes selecting signal acquisition parameters such as Δ, δ, TR, TE, slice thickness, and numbers of acquisitions at 902. At 904, a range of b-magnitudes and numbers of b-magnitude values are selected. At 905, numbers of directions are directions are selected. At 906, first and second directions are randomly selected and at 908, b-values are randomly selected from, for examples a uniform distribution over the previously selected range. At 910, b-matrices for the randomly selected b-values and the first and second directions are determined using, for example Equations 1-2 above. At 911, gradient field magnitudes $G_1$, $G_2$ are determined for each of the b-matrices and at 912, signals S(b) are acquired for each of the b-matrices using $G_1$ and $G_2$. At 914, it is determined if measurements are to be using additional directions. If first and second directions are newly selected at 906 and processing continues as previously described. If measurements have been completed for all directions and b-magnitudes of interest, a second-order mean diffusion tensor and/or an associated fourth-order covariance tensor are calculated at 916. The particular order of steps in FIG. 9 is representative only, and other sequences can be used to measure signals S(b) for the selected ranges of b-magnitudes and directions. Although not shown in FIG. 9, signals for each b-matrix are typically acquired multiple times and averaged to improve signal to noise ratio.

Representative MR Measurement Apparatus

Figure 10:
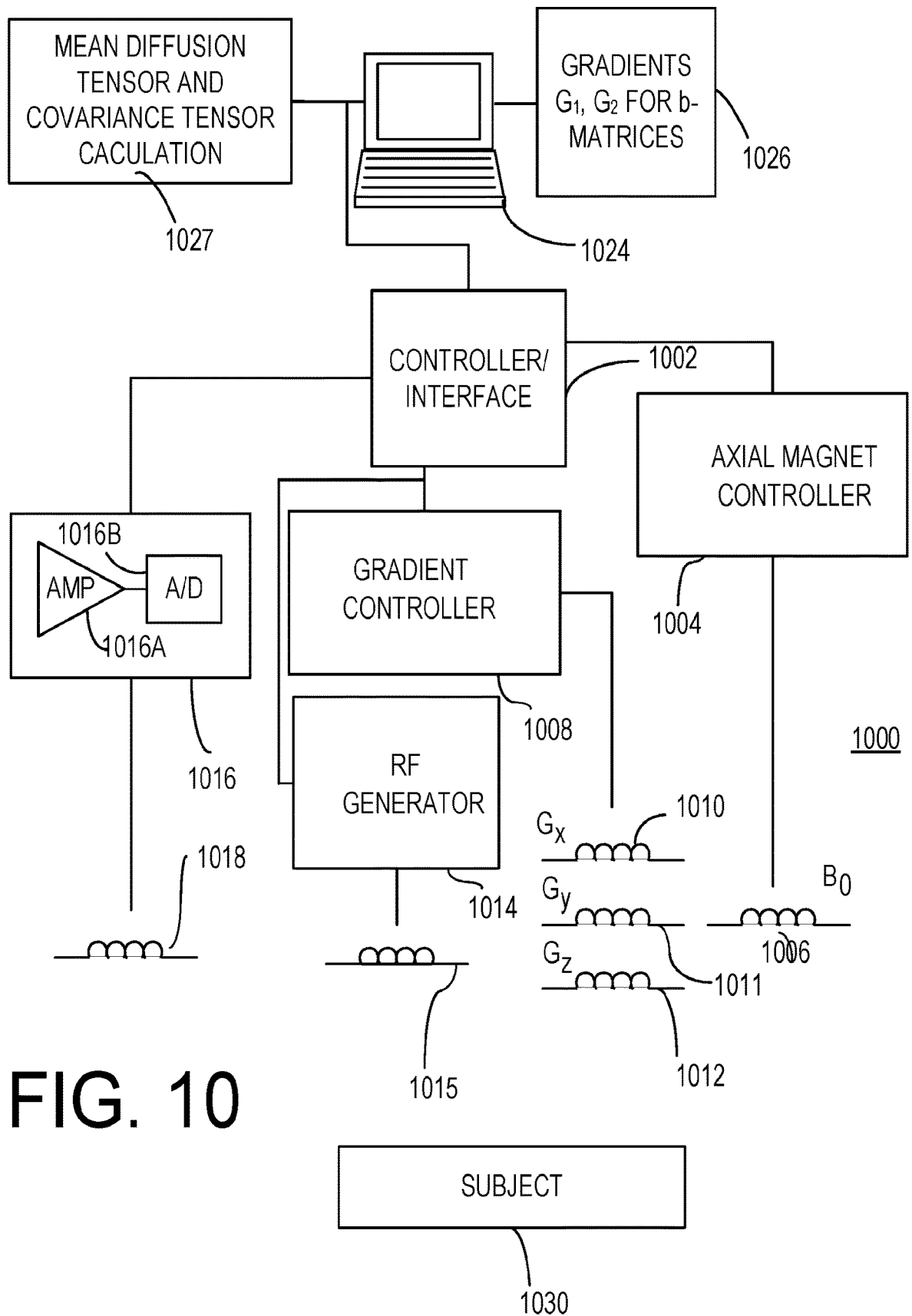
FIG. 10 illustrates a representative magnetic resonance imaging (MRI) system that includes signal processing so as to estimate a second-order mean diffusion tensor and a fourth-order covariance tensor, typically for an array of voxels and arrangeable as a sample image.

MR measurements as disclosed can be obtained using an MRI apparatus 1000 as illustrated in FIG. 10. The apparatus 1000 includes a controller/interface 1002 that can be configured to apply selected magnetic fields such as constant or pulsed field gradients to a subject 1030 or other specimen. An axial magnet controller 1004 is in communication with an axial magnet 1006 that is generally configured to produce a substantially constant magnetic field $B_0$. A gradient controller 1008 is configured to apply a constant or time-varying magnetic field gradient in one or more selected directions or in a set of directions such as shown above using magnet coils 1010-1012 to produce respective magnetic field gradient vector components $G_x$, $G_y$, $G_z$ or combinations thereof to produce the gradients $G_1$, $G_2$ that are associated with b-matrices. An RF generator 1014 is configured to deliver one or more RF pulses to a specimen using a transmitter coil 1015. An RF receiver 1016 is in communication with a receiver coil 1018 and is configured to detect or measure net magnetization of spins. Typically, the RF receiver includes an amplifier 1016A and an analog-to-digital convertor 1016B that detect and digitized received signals to obtain the signals S(b). Slice selection gradients can be applied with the same hardware used to apply the diffusion gradients. The gradient controller 1008 can be configured to produce pulses or other gradient fields along one or more axes as needed for a particular b-matrix. By selection of such gradients and other applied pulses, signals associated with a plurality of b-matrices are acquired.

For imaging, specimens are divided into volume elements (voxels) and MR signals for a plurality of gradient directions are acquired as discussed above, but signals can be acquired for one or only a few specimen voxels. In typical examples, signals are obtained for some or all voxels of interest. A computer 1024 or other processing system such as a personal computer, a workstation, a personal digital assistant, laptop computer, smart phone, or a networked computer can be provided for acquisition, control and/or analysis of specimen data. The computer 1024 generally includes a hard disk, a removable storage medium such as a floppy disk or CD-ROM, and other memory such as random access memory (RAM). Data can also be transmitted to and from a network using cloud-based processors and storage. Data could be uploaded to the Cloud or stored elsewhere. Computer-executable instructions for data acquisition or control and b-matrix computations such as random selected of directions and random selected of b-magnitudes as well as determining the associated b-matrices, mean diffusion tensors and covariance tensors scan be provided on a floppy disk or other storage medium such as a memory 1027, or delivered to the computer 1024 via a local area network, the Internet, or other network. Signal acquisition, instrument control, and signal analysis can be performed with distributed processing. For example, signal acquisition and signal analysis can be performed at different locations. Signal evaluation can be performed remotely from signal acquisition by communicating stored data to a remote processor. In general, control and data acquisition with an MRI apparatus can be provided with a local processor, or via instruction and data transmission via a network.

Representative Data Acquisition and Control Apparatus

Figure 11:
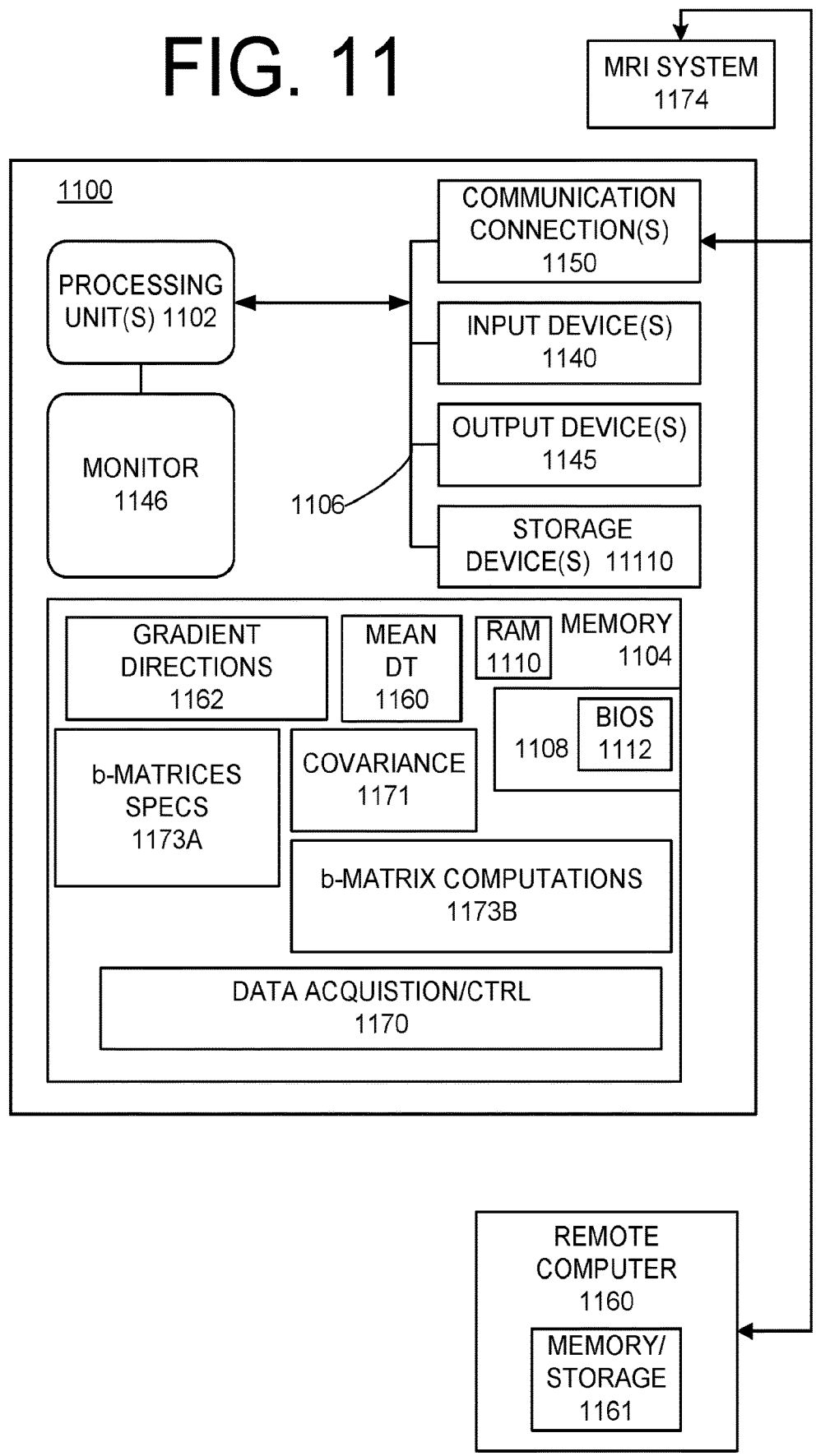
FIG. 11 illustrates a representative computing and control environment for measuring and processing signal attenuations to estimate a mean diffusion tensor and a fourth-order covariance tensor, typically for an array of voxels.

FIG. 11 and the following discussion are intended to provide a brief, general description of an exemplary computing/data acquisition environment in which the disclosed technology may be implemented. Although not required, the disclosed technology is described in the general context of computer executable instructions, such as program modules, being executed by a personal computer (PC), a mobile computing device, tablet computer, or other computational and/or control device. Generally, program modules include routines, programs, objects, components, data structures, etc., that perform particular tasks or implement particular abstract data types. Moreover, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 11, an exemplary system for implementing the disclosed technology includes a general purpose computing device in the form of an exemplary conventional PC 1100, including one or more processing units 1102, a system memory 1104, and a system bus 1106 that couples various system components including the system memory 1104 to the one or more processing units 1102. The system bus 1106 may be any of several types of bus structures including a memory bus or memory controller, a peripheral bus, and a local bus using any of a variety of bus architectures. The exemplary system memory 1104 includes read only memory (ROM) 1108 and random access memory (RAM) 1110. A basic input/output system (BIOS) 1112, containing the basic routines that help with the transfer of information between elements within the PC 1100, is stored in ROM 1108.

The exemplary PC 1100 further includes one or more storage devices 11110 such as a hard disk drive for reading from and writing to a hard disk, a magnetic disk drive for reading from or writing to a removable magnetic disk, an optical disk drive for reading from or writing to a removable optical disk (such as a CD-ROM or other optical media), and a solid state drive. Such storage devices can be connected to the system bus 1106 by a hard disk drive interface, a magnetic disk drive interface, an optical drive interface, or a solid state drive interface, respectively. The drives and their associated computer readable media provide nonvolatile storage of computer-readable instructions, data structures, program modules, and other data for the PC 1100. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 11110 including an operating system, one or more application programs, other program modules, and program data. A user may enter commands and information into the PC 1100 through one or more input devices 1140 such as a keyboard and a pointing device such as a mouse. Other input devices may include a digital camera, microphone, joystick, game pad, satellite dish, scanner, or the like. These and other input devices are often connected to the one or more processing units 1102 through a serial port interface that is coupled to the system bus 1106, but may be connected by other interfaces such as a parallel port, game port, or universal serial bus (USB). A monitor 1146 or other type of display device is also connected to the system bus 1106 via an interface, such as a video adapter. Other peripheral output devices, such as speakers and printers (not shown), may be included.

The PC 1100 may operate in a networked environment using logical connections to one or more remote computers, such as a remote computer 1160. In some examples, one or more network or communication connections 1150 are included. The remote computer 1160 may be another PC, a server, a router, a network PC, or a peer device or other common network node, and typically includes many or all of the elements described above relative to the PC 1100, although only a memory storage device 1161 has been illustrated in FIG. 11. The personal computer 1100 and/or the remote computer 1160 can be connected to a logical a local area network (LAN) and a wide area network (WAN). Such networking environments are commonplace in offices, enterprise wide computer networks, intranets, and the Internet.

When used in a LAN networking environment, the PC 1100 is connected to the LAN through a network interface. When used in a WAN networking environment, the PC 1100 typically includes a modem or other means for establishing communications over the WAN, such as the Internet. In a networked environment, program modules depicted relative to the personal computer 1100, or portions thereof, may be stored in the remote memory storage device or other locations on the LAN or WAN. The network connections shown are exemplary, and other means of establishing a communications link between the computers may be used.

The memory 1104 generally includes computer-executable instructions for selecting gradient fields $G_1$, $G_2$, averaging acquired signals, calculation of b-matrices and mean diffusion tensor and covariance. For example, memory portion 1162 can store computer-executable instructions for selecting gradient fields directions as discussed above and computer-executable instructions for b-matrix computation and random b-magnitude an direction selection can be stored at 1173B or previously computed b-matrix specification can be stored in memory portion 1173A. Computer-executable instructions for processing acquired signals (for example, determining mean diffusion tensor and covariance can be stored in a memory portions 1160, 1171. Computer-executable instructions for data acquisition and control are stored in a memory portion 1170. Acquired and processed data (e.g., images based on mean diffusion tensor images) can be displayed using computer-executable instructions stored at memory portion 1171. As noted above, data acquisition, processing, and instrument control can be provided at an MRI system 1174, or distributed at one or more processing devices using a LAN or WAN.

Reduction of Concomitant Field Effects

Figure 1B:
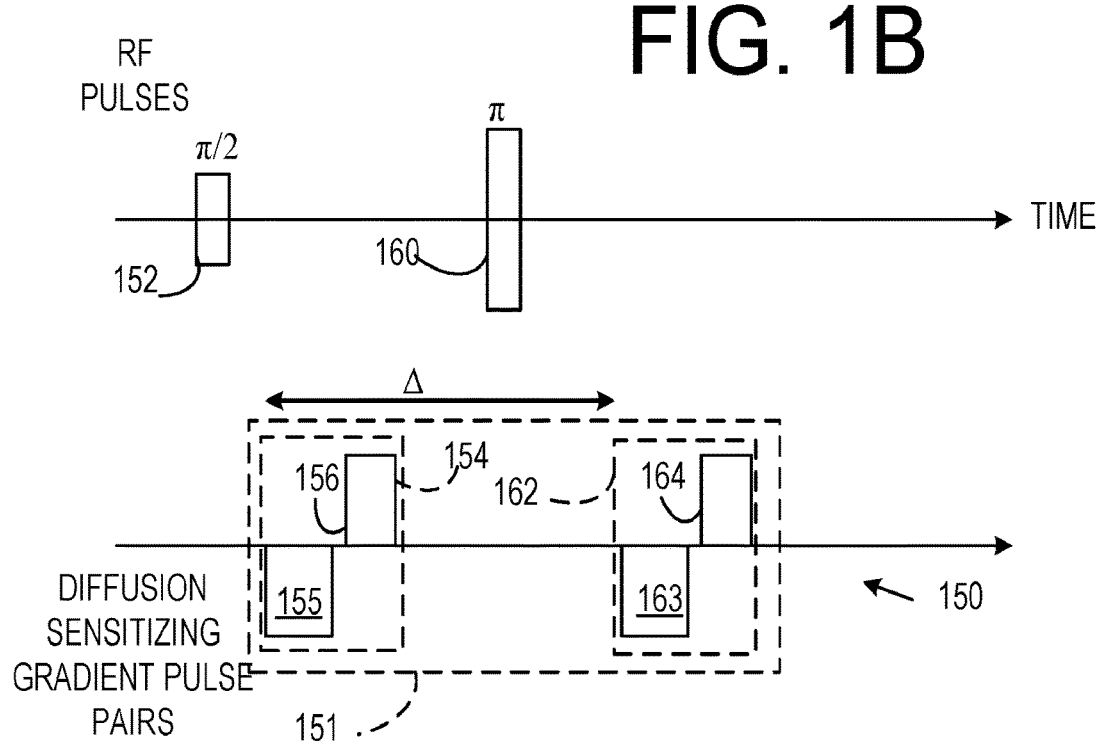
FIG. 1B illustrates an alternative dPFG EPI pulse sequence that can be used to measure the DTD.
Figure 12:
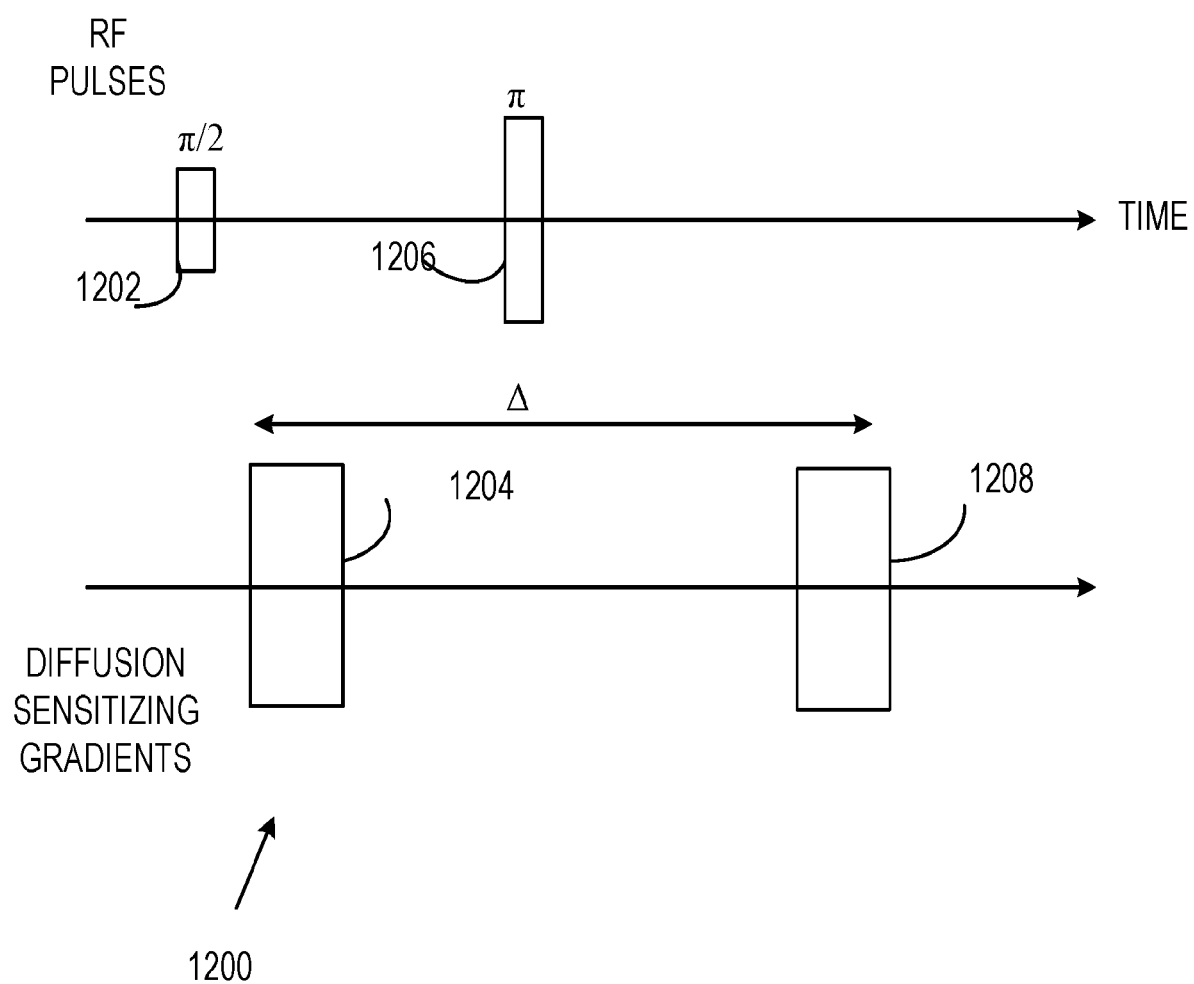
FIG. 12 illustrates portions of a pulse sequence that includes diffusion encoding gradient pulses with 180° pulse during a diffusion time $\Delta$. Slice-selective RF pulses used to generate the spin echo and imaging gradients are not shown.

The pulse sequences illustrated in FIGS. 1A-1B tend to reduce or eliminate concomitant gradient field effects. In another example illustrated in FIG. 12, a pulse sequence 1200 includes diffusion sensitizing gradient pulses 1204, 1208 that are separated by a diffusion time $\Delta$. The diffusion sensitizing gradient pulses 1204, 1208 apply diffusion sensitizing gradients along two or more directions and are symmetric about a 180° pulse 1206. Prior to the first pulse 1204, a 90° pulse 1202 is applied and the 180° pulse 1206 is applied during the diffusion time $\Delta$. The diffusion sensitizing gradient pulses 1204, 1208 can be symmetric multiple gradient pulses of arbitrary shapes and durations. In typical examples, the pulse 1204 and the pulse 1208 have the same waveform. In diffusion-based measurements, the 180° pulse allows the pulse 1208 to unwind the effects of the pulse 1204 absent diffusion. Applying symmetric multidirectional pulses such as the diffusion sensitizing gradient pulses 1204, 1208 with the intermediate 180° pulse reduces or eliminate concomitant field effects. For example, the symmetrical trapezoidal gradient pulses of different directions discussed above can be sandwiched time efficiently in a single spin echo to realize an arbitrary rank b-matrix while mitigating concomitant fields. Other symmetric gradients can be used as well.

Representative Measurements

Figure 13:
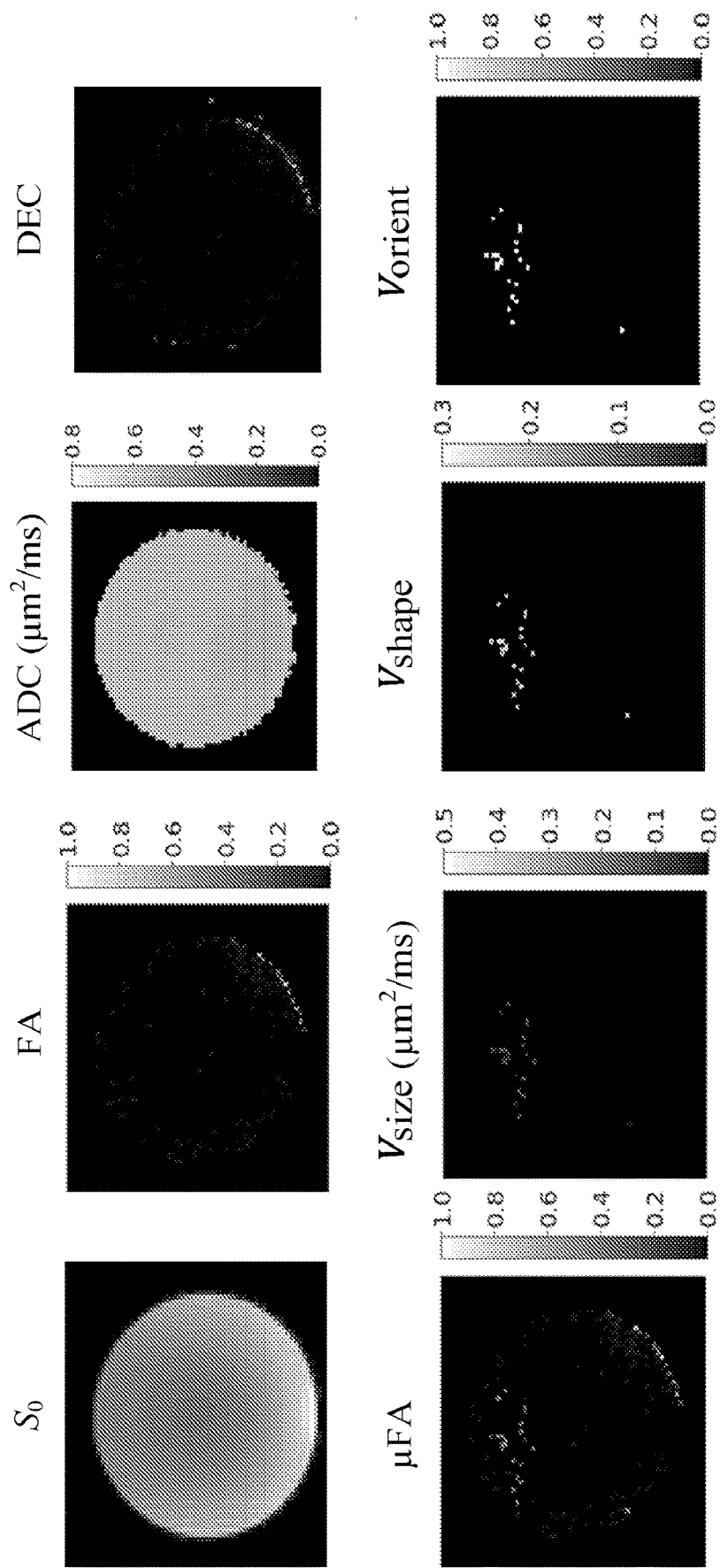
FIG. 13 illustrates representative DTD results of an isotropic polyvinylpyrrolidone (PVP) phantom.

FIG. 13 illustrates representative DTD results with an isotropic 40% polyvinylpyrrolidone (PVP) phantom acquired using the following parameters: $\delta=14$ ms, $\Delta=40$ ms, field of view=210×210 mm, TR/TE=3500/81 ms at 3 mm isotropic spatial resolution in Siemens 3T Prisma scanner. The results show an isotropic mean tensor and zero covariance tensor as expected. The images are labeled as follows. So is a non-diffusion weighted MR image, FA is a fractional anisotropy map, µFA is a microscopic FA map, ADC is a map of apparent diffusion coefficient, DEC is a direction encoded color map, $V_{size}$, $V_{shape}$, $V_{orient}$ are maps associated with size, shape and orientation heterogeneity metrics. The units for ADC and $V_{size}$ are in µm²/ms.

Figure 14:
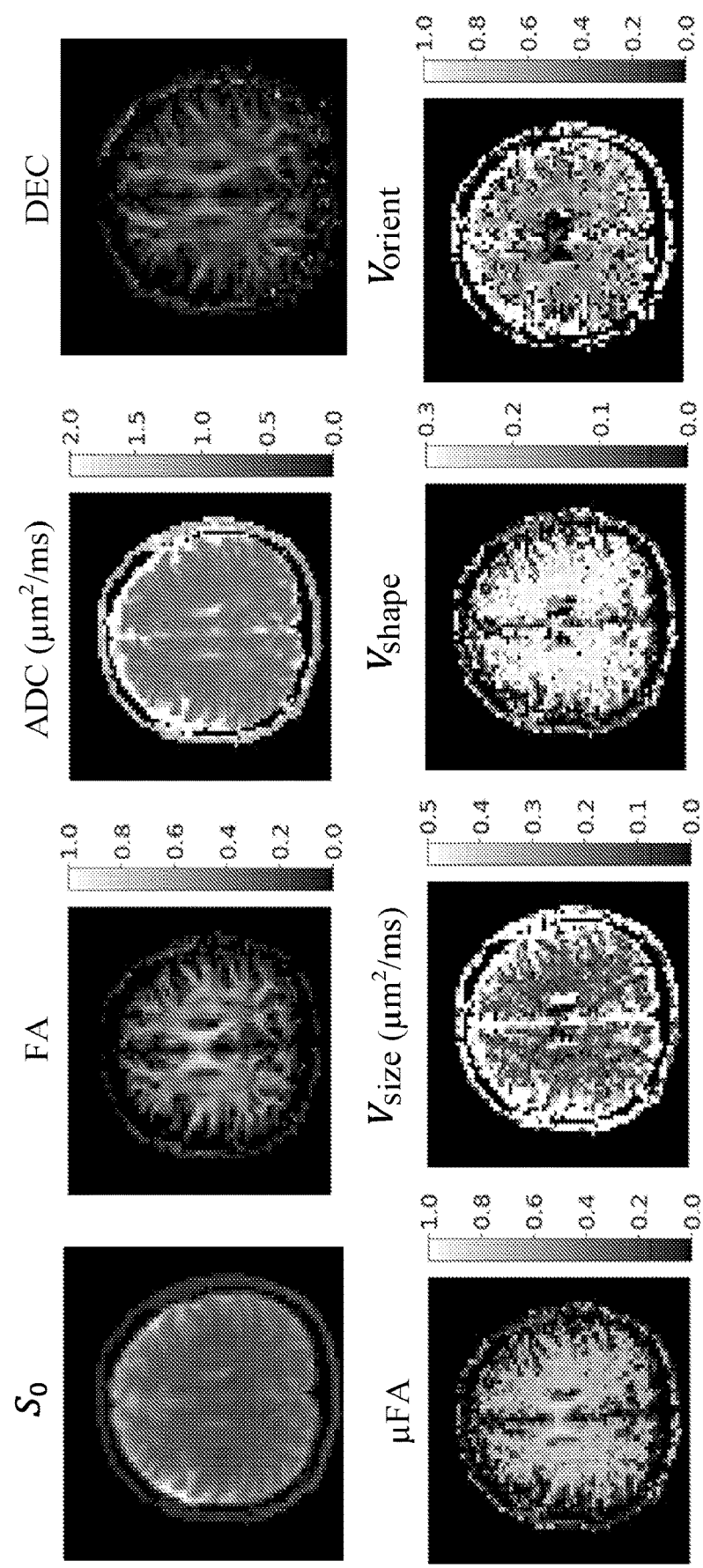
FIG. 14 illustrates representative DTD results of a live human brain acquired using the same parameters as that of FIG. 13.

FIG. 14 illustrates representative DTD results of a live human brain acquired using the same parameters as that of FIG. 13, labeled in the same manner.

Figure 15:
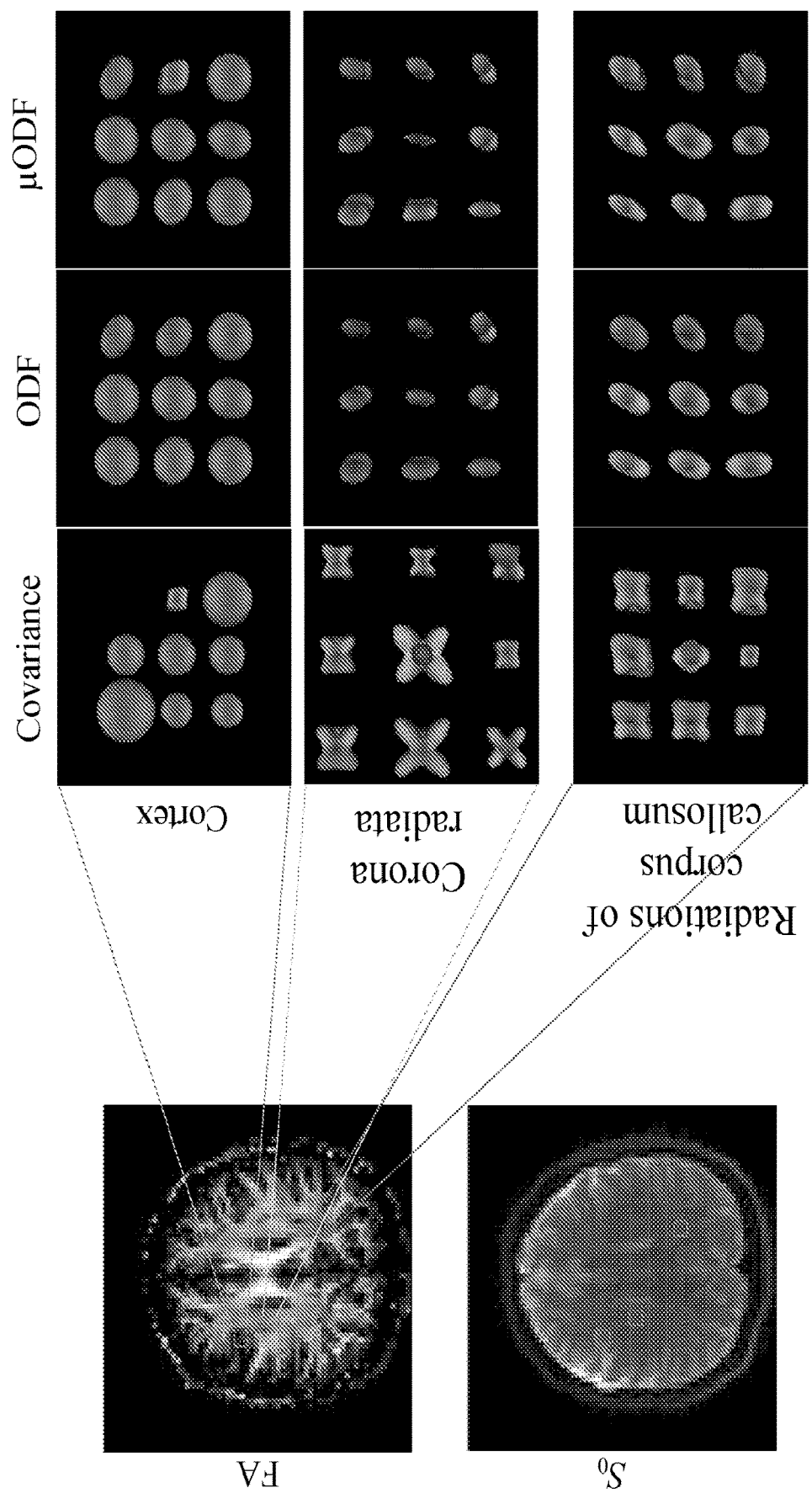
FIG. 15 illustrates glyphs based on measured DTD on live human brain showing isotropic covariance in gray matter and complex covariance structures in white matter.

FIG. 15 illustrates glyphs based on measured DTD on live human brain showing isotropic covariance in gray matter and complex covariance structures in white matter. Images associated with FA and $S_0$ are shown on the left. Glyphs are presented for three brain locations—cortex, corona radiata, and radiations of corpus callosum. For each brain location, glyphs based on covariance, an orientation distribution function (ODF) and a micro orientation distribution function (µODF) are shown.

In view of the many possible embodiments to which the principles of the disclosure may be applied, it should be recognized that illustrated embodiments are only examples and should not be considered a limitation on the scope of the disclosure. We claim all that comes within the scope and spirit of the appended claims.

Appendix A: Approaches to Measurement of MR Diffusion Tensor Distributions

Overview

The ability to characterize heterogeneous and anisotropic water diffusion processes within macroscopic MRI voxels non-invasively and in vivo is a desideratum in biology, neuroscience, and medicine. While an MRI voxel may contain approximately a microliter of tissue, our goal is to examine intravoxel diffusion processes on the order of picoliters. Here we propose a new theoretical framework and efficient experimental design to describe and measure such intravoxel structural heterogeneity and anisotropy. We assume that a constrained normal tensor-variate distribution (CNTVD) describes the variability of positive definite diffusion tensors within a voxel which extends its applicability to a wide range of b-values while preserving the richness of diffusion tensor distribution (DTD) paradigm unlike existing models. We introduce a new Monte Carlo (MC) scheme to synthesize realistic 6D DTD numerical phantoms and invert the MR signal. We show that the signal inversion is well-posed and estimate the CNTVD parameters parsimoniously by exploiting the different symmetries of the mean and covariance tensors of CNTVD. The robustness of the estimation pipeline is assessed by adding noise to calculated MR signals and compared with the ground truth. A family of invariant parameters and glyphs which characterize microscopic shape, size and orientation heterogeneity within a voxel are also presented.

Supplemental Drawings

FIG. 16 illustrates a representative experimental design for DTD estimation. (Top left) An example of the sampled rank-1 and rank-2 b-matrices (N=216) shown as ellipses generated by randomly varying the sum and ratio of eigenvalues, and orientation of eigenvectors of the b-matrix. (Top right) Histogram of trace of b-matrix showing the uniform sampling in size. (Bottom left) Histogram of the ratio of two non-zero eigenvalues ($\lambda_1 > \lambda_2$) of the sampled b-matrices showing the uniform sampling in shape. (Bottom right) Orientation dispersion of the principal eigenvector of the sampled b-matrices showing the uniform sampling in orientation. The vectors are colored to distinguish the individual b-matrices.

FIG. 17 illustrates macroscopically isotropic and microscopically heterogeneous DTDs generated from CNTVD describing gray matter. The DTD along with the mean diffusion tensor ellipsoid (inset) is shown in the top row while the structure of the 6×6 covariance matrix with non-zero elements highlighted is shown in the bottom row. (Left column) Emulsion type DTD with size heterogeneity, (Middle column) Shape heterogeneous DTD with a mixture of prolate, oblate and spherical diffusion tensors, (Right column) Fully heterogeneous DTD with randomly oriented tensors of varying shapes and sizes.

FIG. 18 illustrates macroscopically anisotropic and microscopically heterogeneous DTDs generated from CNTVD describing the white matter. The DTD along with the mean diffusion tensor ellipsoid (inset) is shown in the top row while the structure of the 6×6 covariance matrix with non-zero elements highlighted is shown in the bottom row. (Left column) Emulsion type DTD with size heterogeneity, (Middle column) DTD with random transverse eigenvalues characterizing a bundle of white matter fibers of varying diameters, (Right column) Crossing fiber DTD with 90-degree angle between the fibers.

Figure 19:
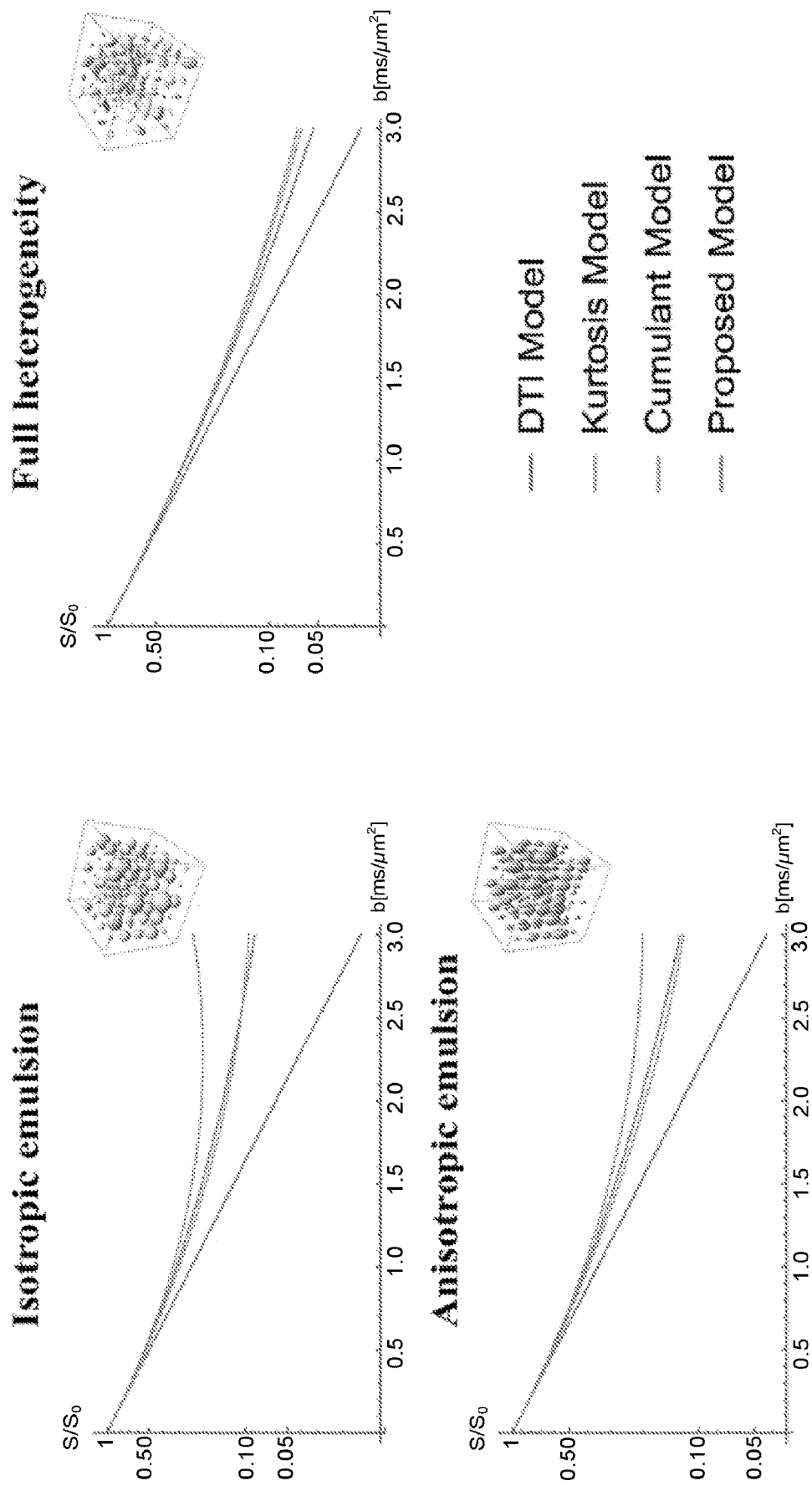
FIG. 19 shows a comparison of signal models (DTI, kurtosis, second order cumulant and proposed model) for DTDs shown in the inset generated from CNTVD.

FIG. 19 shows a comparison of signal models (DTI, kurtosis, second order cumulant and proposed model) for DTDs shown in the inset generated from CNTVD. Normalized MR signal $S/S_0$ is plotted for various b-values from rank-2 b-matrices with fixed shape and orientation.

Figure 20:
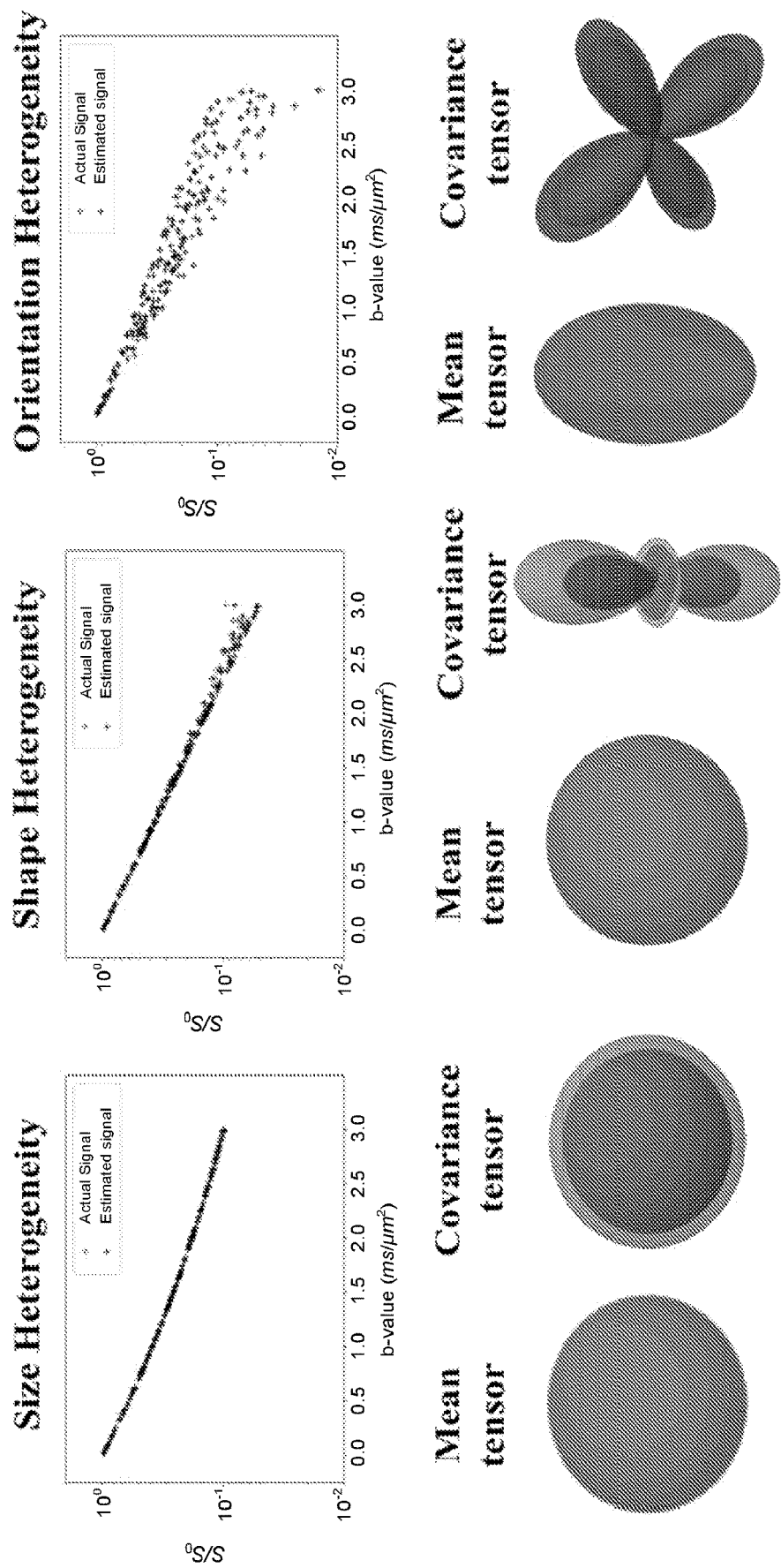
FIG. 20 illustrates estimation of mean and covariance tensors from synthetic MR signal without noise.

FIG. 20 illustrates estimation of mean and covariance tensors from synthetic MR signal without noise. The estimation is shown for three different DTDs (isotropic emulsion, shape heterogeneous and crossing fiber type DTDs) shown in FIGS. 17-18. The signal curve using the proposed model obtained from actual and estimated mean/covariance tensors is shown in the first row. The mean and covariance glyphs for actual (orange) and estimated (blue) DTD are overlaid and shown in the second row.

Figure 21:
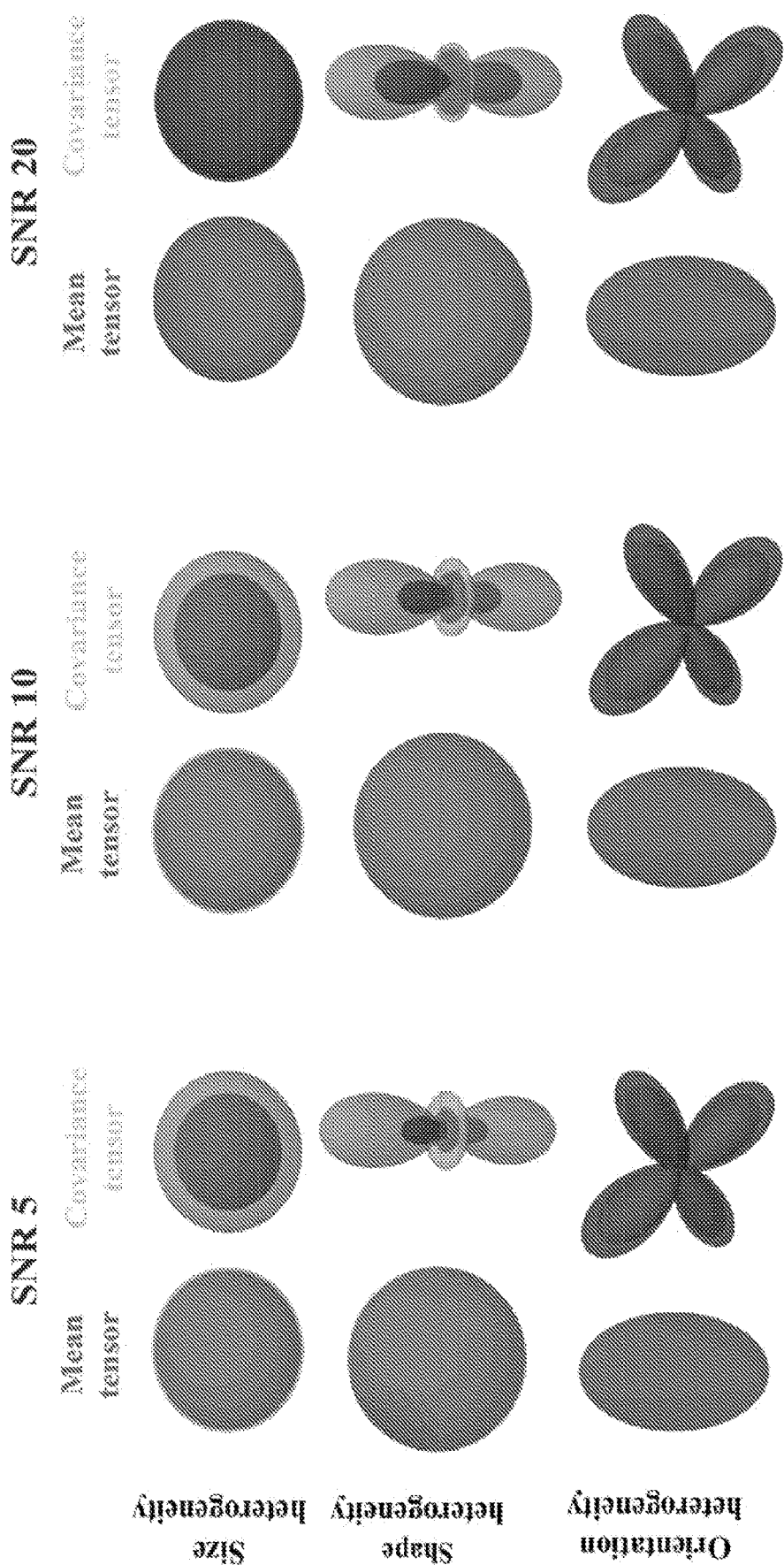
FIG. 21 illustrates estimation of mean and covariance tensors from synthetic MR signal for different DTDs with varying signal-to-noise ratio (SNR) at the largest b-value.

FIG. 21 illustrates estimation of mean and covariance tensors from synthetic MR signal for different DTDs with varying signal-to-noise ratio (SNR) at the largest b-value. The mean and covariance glyphs for actual (orange) and estimated (blue) DTD are overlaid. (First row) Isotropic emulsion, (Second row) Shape heterogeneous DTD and (Third row) Crossing fiber type DTD. The reduction in covariance estimation error with increasing SNR is clearly visible in shape and orientation heterogeneous DTD.

Figure 22:
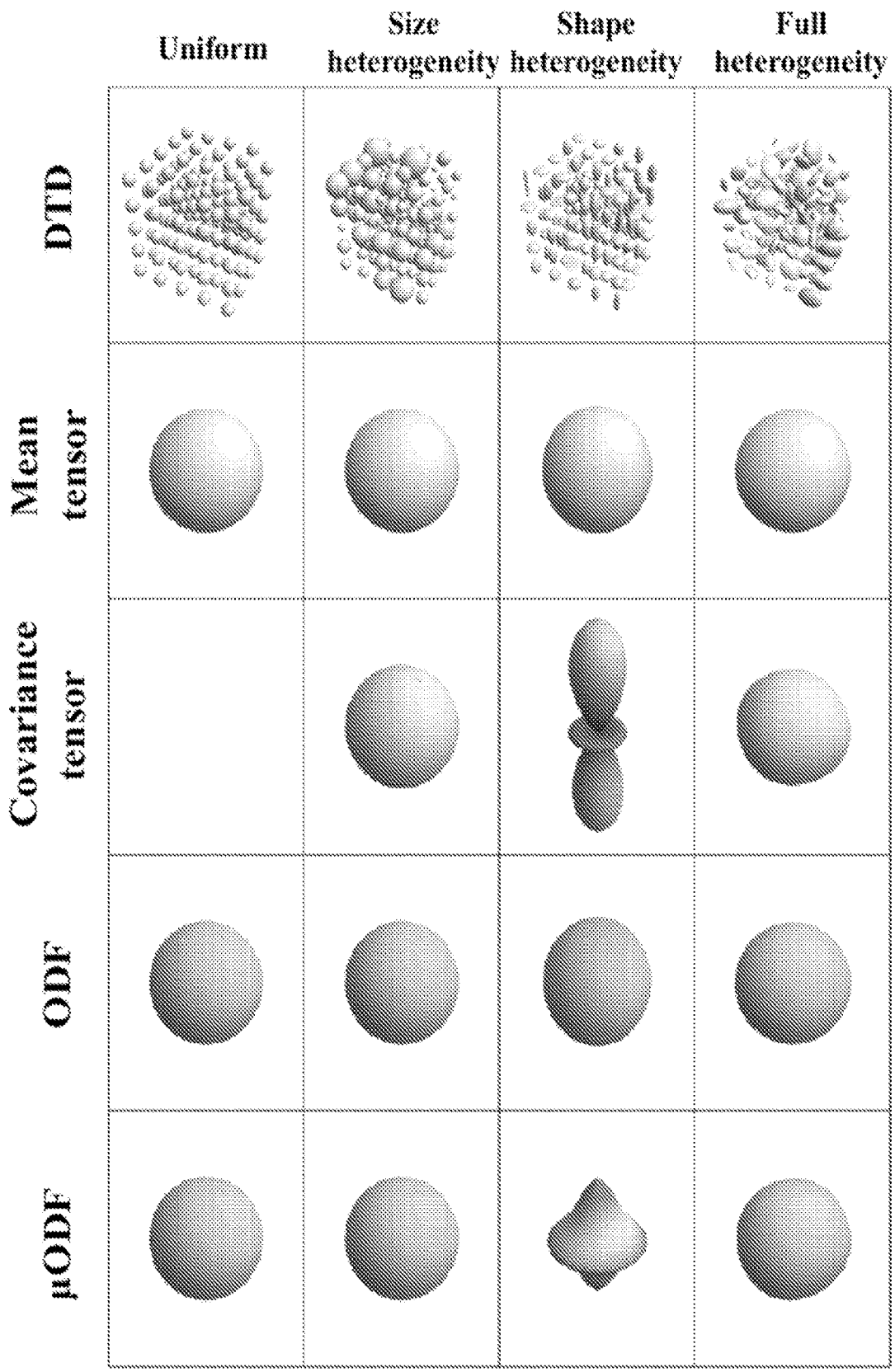
FIG. 22 illustrates glyphs describing macroscopically based on a simulation of a white matter voxel showing isotropic and microscopically heterogeneous DTDs generated from CNTVD covariance in gray matter and complex covariance structures in white matter.

FIG. 22 illustrates glyphs describing macroscopically isotropic and microscopically heterogeneous DTDs generated from CNTVD. (First row) DTDs describing uniform, size, shape and orientation/size/shape heterogeneous voxels respectively. (Second row) Second order mean tensor displayed as an isosurface for each of the DTDs. (Third row) Fourth order covariance tensor projected in 3D for each of the DTDs. (Fourth row) Macro ODF obtained from the mean diffusion tensor. (Fifth row) Micro ODF obtained by averaging the ODFs of individual micro diffusion tensors in the voxel.

Figure 23:
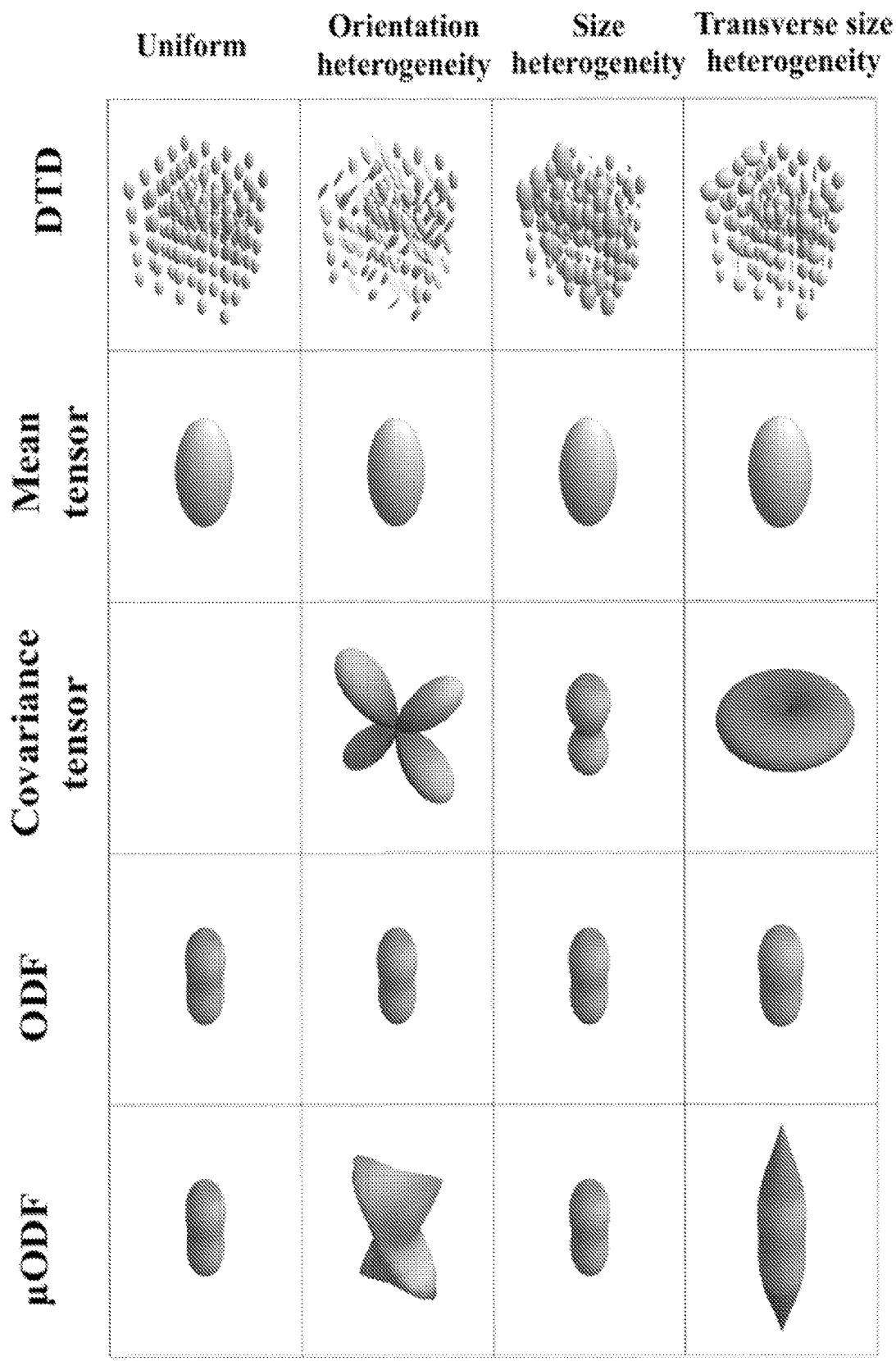
FIG. 23 illustrates glyphs describing macroscopically anisotropic and microscopically heterogeneous DTDs generated from CNTVD.

FIG. 23 illustrates glyphs describing macroscopically anisotropic and microscopically heterogeneous DTDs generated from CNTVD. (First row) DTDs describing uniform, orientation, size, and transverse size heterogeneous voxels respectively. (Second row) Second order mean tensor displayed as an iso-surface for each of the DTDs. (Third row) Fourth order covariance tensor projected in 3D for each of the DTDs. (Fourth row) Macro ODF obtained from the mean diffusion tensor. (Fifth row) Micro ODF obtained by averaging the ODFs of individual micro diffusion tensors in the voxel.

Figure 24:
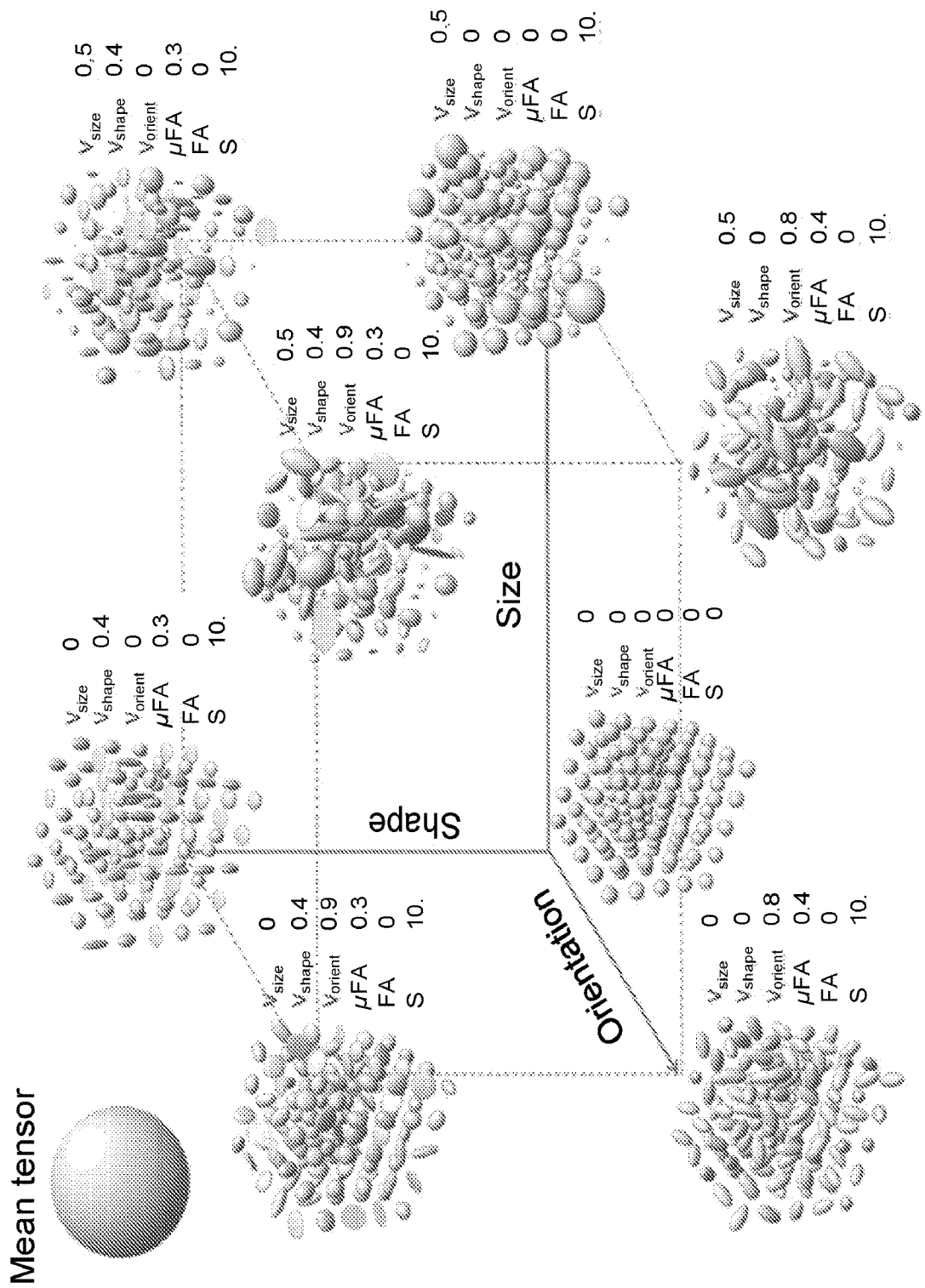
FIG. 24 illustrates various parametric stains depicting the shape, size and orientation heterogeneity for a macroscopically isotropic mean diffusion tensor shown on the upper left corner.

FIG. 24 illustrates various parametric stains depicting the shape, size and orientation heterogeneity for a macroscopically isotropic mean diffusion tensor shown on the upper left corner. The DTD and calculated values of the various stains are shown at various points in the 3D grid. Size axis refers to heterogeneity in the trace of the diffusion tensors, shape axis refers to heterogeneity in the shapes of the diffusion tensors, and the orientation axis refers to the heterogeneity in the orientation of the diffusion tensors. $V_{size}$—stain quantifying the variation in the size (i.e. trace) of the diffusion tensors, $V_{shape}$—stain quantifying the variation in the shape of diffusion tensors, $V_{orient}$—stain quantifying the orientation dispersion of diffusion tensors, μFA—microscopic fractional anisotropy, FA—fractional anisotropy, and S—overall entropy of the DTD.

FIG. 25 is a table illustrating performance of the estimation pipeline and heterogeneity stains evaluated using different signal-to-noise ratio (SNR) for three different DTDs. Size heterogeneity refers to isotropic emulsion type DTD, shape heterogeneity refers to shape heterogeneous DTD with isotropic mean diffusion tensor and orientation heterogeneity refers to the DTD with two fibers crossing at 90°. The estimation error in mean and covariance tensors are calculated using the Frobenius norm of the difference between the actual and estimated tensors divided that of the actual tensor and expressed as percentage. The error in stains (i.e. $V_{size}$, $V_{shape}$, and $V_{orient}$) were expressed as percent change from the ground truth value.

Introduction

Diffusion tensor imaging (DTI) is a widely accepted MR imaging method used by clinicians and neuroscientists to assess microstructure and organization of brain and other soft tissues. DTI consists of measuring a single (mean) diffusion tensor within each voxel of an imaging volume and allows characterization of brain tissue microstructure, architecture, organization, and anatomical connectivity. Applications have been widespread in brain and whole body clinical imaging. However, DTI only provides an estimate of a single mean diffusion tensor within each voxel, which is typically on the order of one cubic millimeter, representing a microliter of tissue. But, at microscopic, mesoscopic, and even macromolecular length scales the brain and other tissues contain a myriad of cell sizes and types, fine processes, extracellular matrix (ECM) and intracellular components with complex microstructural and architectural organizations. Histological analysis often reveal distinct anisotropic domains within the same voxel, such as multiple white matter pathways which may interdigitate, kiss, cross, merge, diverge, etc. A goal of "in vivo MRI histology" or "microstructure imaging" has been to achieve subvoxel resolution and extract useful information about various salient water pools to provide a more nuanced and comprehensive assessment of the complex microscopic tissue milieu. Such information could be invaluable in understanding of normal and abnormal development, neuropathological changes, and brain structure-function relationships, to name a few.

Disclosed herein are novel approaches to obtaining the 6D-DTD within a voxel which overcomes the limitations discussed above. We assume the DTD to be a normal tensor-variate distribution but constrained to lie on the manifold of positive semi-definite diffusion tensors (CNTVD) which mitigate the unphysical signal increase with b-value in cumulant and kurtosis models while preserving the richness of DTD paradigm unlike the matrix-variate Gamma distribution and 4D DTDs. We also propose that the CNTVD is the natural and best choice for the DTD in the absence of a priori information about tissue microstructure due to its maximum entropy property. We simplify the experimental design by showing that rank-1 and rank-2 b-matrix measurements are sufficient for estimating the mean and covariance tensors of the DTD, and introduce a compressed sensing (CS) based sampling of b-matrices for time-efficient MR acquisition. We introduce a means to synthesize realistic diffusion tensors drawn from a given DTD, and a new MC scheme which is faster and simpler compared to the conventional 2-step MC method to invert the MR signal. We also introduce a parsimonious model selection framework exploiting the symmetries of the mean and covariance tensors to robustly estimate the CNTVD parameters rather than assuming a particular symmetry. Finally we introduce a family of new DTD derived stains and glyphs which characterize various aspects of tissue microstructure such as the micro-orientation distribution function (µODF), micro-fractional anisotropy (µFA), and size, shape and orientation heterogeneity stains which are more general than that described by an isotropic covariance tensor and overcomes the limitations of previously defined metrics by independently capturing the desired heterogeneity.

Methods

MR Signal Model

The MR signal from an ensemble of diffusion tensors distributed according to p(D) is given by, $$S(b) = S_0 \int p(D) \exp(-b^T D) dD \quad (1)$$

where $S_0$ is the signal without diffusion weighing, $D=(D_{xx}, D_{yy}, D_{zz}, D_{xy}, D_{xz}, D_{yz})^T$ is a vector of the independent components of the second order symmetric diffusion tensor, and $b=(b_{xx}, b_{yy}, b_{zz}, 2b_{xy}, 2b_{xz}, 2b_{yz})^T$ is a vector of the independent components of the 3×3 symmetric diffusion weighting b-matrix. For a normal distribution of tensors constrained in the manifold of positive definite tensors, $\mathcal{M}^+$, p(D) is given by, $$p(D) = \frac{\exp\left[-\frac{1}{2}(D-\overline{D})^T \Omega^{-1}(D-\overline{D})\right] 1_{\mathcal{M}^+}(D)}{\int_{1_{\mathcal{M}^+}(D)} \exp\left[-\frac{1}{2}(D-\overline{D})^T \Omega^{-1}(D-\overline{D})\right] dD} \quad (2)$$

where $1_{\mathcal{M}^+}(D)$ is the indicator function and $\overline{D}$ is second order mean diffusion tensor expressed as a 6×1 vector, and $\Omega$ is the fourth order covariance tensor, C, expressed as a 6×6 matrix according to the following mappings, $$\overline{D} = (\overline{D}_{xx}, \overline{D}_{yy}, \overline{D}_{zz}, \overline{D}_{xy}, \overline{D}_{xz}, \overline{D}_{yz})^T \quad (3)$$

$$\Omega = \begin{pmatrix} C_{xxxx} & C_{xxyy} & C_{xxzz} & C_{xxxy} & C_{xxxz} & C_{xxyz} \\ C_{xxyy} & C_{yyyy} & C_{yyzz} & C_{yyxy} & C_{yyxz} & C_{yyyz} \\ C_{xxzz} & C_{yyzz} & C_{zzzz} & C_{zzxy} & C_{zzxz} & C_{zzyz} \\ C_{xxxy} & C_{yyxy} & C_{zzxy} & C_{xyxy} & C_{xyxz} & C_{xyyz} \\ C_{xxxz} & C_{yyxz} & C_{zzxz} & C_{xyxz} & C_{xzxz} & C_{xzyz} \\ C_{xxyz} & C_{yyyz} & C_{zzyz} & C_{xyyz} & C_{xzyz} & C_{yzyz} \end{pmatrix} \quad (4)$$

The signal equation is approximated using MC integration with samples, $D_i$, drawn from the CNTVD as shown below, $$S(b) \approx S_0 \left( \frac{\sum_{i=1}^{n} \exp(-b^T D_i) 1_{\mathcal{M}^+}(D)}{\sum_{i=1}^{n} 1_{\mathcal{M}^+}(D)} \right) \quad (5)$$

where n is the number of MC samples, set to 200,000 in our simulations. The choice of CNTVD for DTD is motivated by its resemblance to that measured in the brain tissue for trace of diffusion tensor, and a few of its properties which we prove in the supplementary material. Given that DTD is generally unknown in a voxel, we show that CNTVD is the natural choice since it is the least informative distribution (or maximum entropy) among all probability densities supported by a constraint (e.g., positive definiteness of diffusion tensors) with a given first and second moments. This maximum entropy property of CNTVD avoids adding information that are not present. It can be shown that the moments of CNTVD are unique for a given DTD which can be estimated from the MR signal generated from rank-1 and rank-2 b-matrices, which renders the data inversion problem well-posed.

For comparison, MR signal from the cumulant expansion and kurtosis model were also computed for the given mean and covariance. The kurtosis tensor, $K_{ijkl}$, subsumed by the covariance tensor, is obtained by imposing additional symmetries on the covariance tensor resulting in the following identity, $$K_{ijkl} = \frac{C_{ijkl} + C_{ikjl} + C_{iljk}}{(\overline{D}_{xx} + \overline{D}_{yy} + \overline{D}_{zz})^2} \quad (6)$$

DTD Synthesis

The individual micro-diffusion tensors (i.e., MC samples) in the signal equation (Equation (5)) are synthesized from random samples drawn from 6D normal multivariate distribution with mean and covariance that define the desired DTD. The 6D samples are reformulated into 3×3 second order tensors using the equivalence between the two formulations. A positive definiteness filter is applied on the drawn samples to satisfy the physical constraint on the diffusion tensor. In addition to obtaining the signal, the synthesized micro-diffusion tensors also demonstrate the richness of CNTVD.

Since the mean and covariance of a DTD is in general unknown a priori, it was calculated empirically from a sample of micro-diffusion tensors generated by randomly varying their eigenvalues and/or eigenvectors. For example, samples for an isotropic emulsion are generated from individual isotropic micro-diffusion tensors such that their trace follows a univariate normal distribution.

Experimental Design

It is impractical to span the entire space of positive semi-definite b-matrices of all three ranks. However, it can be shown using tensor algebra that a combination of rank-1 and rank-2 b-matrices is sufficient to span the entire space of fourth-order covariance tensors. Further data reduction is achieved using CS which has been employed in several multi-dimensional MR studies exploiting the sparsity in q-space.

A b-matrix of rank-m, $b_m$, (with $m \in \{1, 2, 3\}$) is eigen-decomposed as shown below, $$b_m = R\Lambda_m T^T \quad (7)$$

$$R = X(\alpha)Y(\beta)Z(\gamma) \quad (8)$$

$$\Lambda_m = \begin{bmatrix} \lambda_1 & 0 & 0 \\ 0 & \ddots & 0 \\ 0 & 0 & \lambda_m \end{bmatrix} \quad (9)$$

where X, Y, Z are the rotation matrices along x, y, z axes respectively, $\alpha$, $\beta$, $\gamma$ are the Euler angles, and $\lambda_i$ is the $i^{th}$ the eigenvalue of the b-matrix. A set of rank-1 and rank-2 b-matrices are generated by randomly varying their eigenvalues such that their sum follow an uniform distribution within the range of b-values of interest for uniform sampling in size, and their ratios also follow an uniform distribution for uniform sampling in shape. Uniform sampling in orientation is achieved by randomizing the Euler angles and rotation order in the overall rotation matrix, R. The resulting collection of b-matrices have varying orientation, size and shape, an example of which is shown in FIG. 16.

Parameter Estimation

For a given DTD, the MR signal is calculated for the designed b-matrices (N=216) using Equation (5). Gaussian noise is added on the real and imaginary channels of the MR signal, if necessary, before inverting the resulting signal magnitude to obtain the CNTVD parameters characterizing the DTD. The number of unknowns for the most general DTD is 28 (6 for mean, 21 for the covariance and 1 for $S_0$), which makes the signal inversion susceptible to over-fitting. A family of physically plausible nested models for the mean and covariance are then used to balance the bias and variance in the estimated parameters.

The mean tensor including $S_0$ is classified into the following four submodels: 1) 1-parameter noise model (i.e., only $S_0$), 2) 2-parameter isotropic model, 3) 5-parameter prolate/oblate models and 4) 7-parameter general anisotropic model. The equivalence between the 6×6 covariance matrix and the fourth order tensor is used to classify the covariance tensor into the following eight submodels exploiting symmetries of the fourth order tensor well known in the elasticity literature: 1) 2-parameter isotropic model, 2) 3-parameter cubic model, 3) 5-parameter hexagonal model, 4) 6/7-parameter trigonal model, 5) 6/7-parameter tetragonal model, 6) 9-parameter orthorhombic model, 7) 13-parameter monoclinic model, and 8) 21-parameter triclinic model.

The MR signal is successively fit to Equation (5) for the hierarchy of above nested models, ranging from scalar noise to DTI to the most complex 28-parameter DTD model, using a numerical optimization algorithm implemented in SciPy to estimate the unknown parameters. The Bayesian information criteria (BIC) is used for selecting models with greatest parsimony, (i.e., which provide an optimal trade-off between the goodness-of-fit and the number of free parameters). The model with the fewest parameters is selected unless the difference in its BIC with a more complex model is greater than two. The appropriate mean tensor model is first selected from the data with the covariance set to zero to account for uniform DTDs. The selected mean tensor model is then augmented with each of the eight covariance models to find the one which parsimoniously describes the data.

Microstructural Stains and Glyphs

The estimated CNTVD parameters are used to delineate several microstructural features within the voxel. The micro-diffusion tensors within the voxel are simulated by drawing samples from CNTVD with the estimated parameters. The mean tensor is visualized as an ellipsoid, while the fourth order covariance tensor is visualized as a 3D glyph by projecting the tensor onto a 3D sphere using the tensor contraction, $r_i r_j r_k r_l C_{ijkl}$, where $r_{\theta,\phi} = (\sin\theta\cos\phi, \sin\theta\sin\phi, \cos\theta)$ is the unit vector on a sphere. The radius of the glyph along a given orientation is set to the projected value of the covariance in that direction. This glyph essentially shows the variability of the mean diffusion tensor as a function of orientation. Orientations along which the radial segments are large correspond to greater uncertainty whereas orientations along which radial segments are small correspond to lesser uncertainty.

Given the mean and covariance of CNTVD, microscopic quantities such as micro-fractional anisotropy (μFA), μODF, micro-entropy (S) and μODF entropy are computed using the following relation, $$\mu f = \overline{f(D)} \approx \frac{\sum_{i=1}^{n} f(D_i) 1(D_i \in \mathcal{M}^+)}{\sum_{i=1}^{n} 1(D_i \in \mathcal{M}^+)} \quad (10)$$

where $f$ is the function of interest such as FA, ODF, overall entropy (i.e. $-\log p(D)$) or ODF entropy, $S_{ODF}(D)$, which is a measure of disorder in the orientation of diffusion tensors as shown below, $$S_{ODF}(D) = -\int_0^{2\pi}\int_0^{\pi} ODF(D, \theta, \phi)\log(ODF(D, \theta, \phi))\sin\theta d\theta d\phi \quad (11)$$

$$ODF(D, \theta, \phi) = \frac{1}{4\pi\sqrt{|D_{3\times 3}|}\left(r_{\theta,\phi}^T D_{3\times 3}^{-1} r_{\theta,\phi}\right)^{\frac{3}{2}}} \quad (12)$$

where $D_{3\times 3}$ is the diffusion tensor expressed in 3×3 matrix form, and ODF(D, $\theta$, $\phi$) is the ODF for diffusion tensor. It should be noted that the above definition of μFA differ from previous definitions which either assume powder average of diffusion tensors or have difficulty interpreting them while our definition is more general and easy to interpret. In contrast to the scalar μFA quantity, the macro- and micro-ODFs within a voxel are displayed as 3D glyphs where the radius of the glyph along a given orientation is equal to the value of the ODF along that direction. The μODF glyph shows the distinct coherent populations of diffusion tensors present within a voxel at the microscopic level.

The size heterogeneity within a voxel is expressed as the variance of mean ADC (mADC) or average trace of the individual micro diffusion tensors. Given a multivariate normal random variable, D, it is well known that the distribution of a scalar projection of D, $C^T D$, where C is a 1×6 random constant vector, has mean, $C^T \overline{D}$, and variance, $C^T \Omega C$. Using this identity, variance of mADC is obtained by choosing C equal to ⅓(1, 1, 1, 0, 0, 0). This results in the mADC variance equal to the arithmetic average of upper 3×3 block matrix appearing in $\Omega$ from which the expression for variation in size, $V_{size}$, is given below, $$V_{size} = \sqrt{\frac{1}{9}\sum_{i=1}^{3}\sum_{j=1}^{3} \Omega_{ij}} \quad (13)$$

It takes a value of zero for uniformly sized tensors and increases with increasing variability in the trace of the diffusion tensors within a DTD motif. Given the shape of an ellipsoid is uniquely determined by the ratio of its eigenvalues, the shape heterogeneity within a voxel is expressed as the root sum of the variance of eigenvalue ratios of micro-diffusion tensors, $V_{shape}$, as given below, $$V_{shape} = \sqrt{\mathrm{Var}\left(\frac{\lambda_2}{\lambda_1}\right) + \mathrm{Var}\left(\frac{\lambda_3}{\lambda_2}\right)} \quad (14)$$

where $\lambda_1 > \lambda_2 > \lambda_3$ are the individual eigenvalues of the micro-diffusion tensor and Var is the variance. It takes a value of zero for uniformly shaped tensors and increases with increasing variability in the shape of the diffusion tensors within a DTD motif. The orientation heterogeneity within a voxel is expressed as the extent of orientation dispersion of eigenvectors within a DTD motif, $V_{orient}$, $$v_{orient} = \min_{i=1,2,3} \sqrt{\frac{\beta_2^i + \beta_3^i}{2\beta_1^i}} \quad (15)$$

where $\beta_1^i > \beta_2^i > \beta_3^i$ are the eigenvalues of the mean second order dyadic tensor formed by averaging the outer products of the $i^{th}$ eigenvector of the micro-diffusion tensor with itself. It takes a value of zero for coherently oriented diffusion tensors and one for randomly oriented diffusion tensors irrespective of their size and shape. The efficacy of the proposed stains in capturing the desired heterogeneity were evaluated by discretely and continuously mixing populations of diffusion tensors of varying size, shape and orientation.

Results

A sample of microstructural templates representative of white and gray matter voxels generated using CNTVD is shown in FIGS. 17-18. These figures show the ability of CNTVD to remove the ambiguity of DTI model by assigning distinct covariance matrices corresponding to each of these DTDs even though their mean diffusion tensors are identical (also shown in the figures). The obtained covariance matrices displayed a wide range of symmetries not restricted to it's most general form with 21 independent components. The figures also show how a single covariance matrix could describe a mixture of size, shape and orientation heterogeneities that maybe present within a MRI voxel.

A gray matter voxel is modeled as macroscopically isotropic but microscopically composed of diffusion tensors of varying size, shape and orientation as shown in FIG. 17. The size and fully heterogeneous (i.e., size, shape and orientation heterogeneous) DTDs exhibited an isotropic covariance structure characterized by two constants, $\lambda$ and $\mu$, similar to the bulk and shear modulus of the isotropic elasticity tensor. The size heterogeneous DTD had $\lambda \neq 0$ and $\mu = 0$ while fully heterogeneous DTD had $\lambda \neq 0$ and $\mu \neq 0$. The shape heterogeneous DTD exhibited a hexagonal covariance structure.

A white matter voxel is modeled as macroscopically anisotropic and microscopically composed of distinct anisotropic subdomains shown in FIG. 18. The three DTDs considered are anisotropic emulsion (size heterogeneity), an axon bundle consisting of varying diameter fibers modeled by randomly varying the transverse eigenvalues together but fixing the longitudinal eigenvalue of the micro-diffusion tensors (transverse size heterogeneity), and two fibers crossing at 90 degrees (orientation heterogeneity). The crossing fiber exhibited an orthorhombic covariance structure while the other two DTDs exhibited a hexagonal structure.

The MR signal for some of the aforementioned DTDs obtained using the proposed model is compared with DTI, kurtosis models and second order cumulant approximation in FIG. 19. Since p(D) for these DTDs is the CNTVD, the proposed model is the ground truth for the MR signal. The kurtosis model and cumulant approximation in addition to the known unphysical signal increase with b-value begins to deviate from the ground truth at very low b-values well before the minimum in the signal decay curve occurs; thus cumulant approximation and kurtosis model are only valid for very low b-values where the DTI model is dominant.

The well-posedness of the signal inversion problem is demonstrated in FIG. 20 for various DTDs with clinically feasible b-values. The figure compares the actual signal with that calculated using the estimated parameters in the absence of noise. The error between the actual and estimated mean and covariance tensors are quantified using the Frobenius norm. For our demonstration we chose isotropic emulsion, shape heterogeneous, and crossing fiber type DTDs. The estimated and actual mean/covariance glyphs are overlaid for comparison. The estimation framework was able to capture all the tested mean-covariance pairs with errors less than 30% likely due to convergence criterion of the optimization algorithm and/or choice of initial parameter estimate.

The robustness of the estimation pipeline to noise in the MR signal is shown graphically in FIG. 21, and quantified in FIG. 25. Three different realistic signal-to-noise ratios (SNR at largest b-value) are tested for the same DTDs as in the previous figure, with the estimated and actual mean/covariance glyphs overlaid for comparison. The mean tensor shape and size was exactly captured for all the SNRs. The structure of the covariance was also estimated accurately for all the three SNRs. However, there were errors in the size of the glyph and heterogeneity stains which reduced with increasing SNR for all the DTDs.

The various DTDs are visualized using glyphs and microstructural stains in FIGS. 22-24. The glyphs for gray matter DTDs are shown in FIG. 22. The uniform DTD has an isotropic mean tensor, zero covariance and isotropic macro and micro ODFs as expected. Size and fully heterogeneous DTDs had the same glyphs as the uniform DTD except for the covariance, which was nonzero and isotropic. The covariance tensor glyph of shape heterogeneous DTD peaked along the longitudinal axis because of the large change in the eigenvalues that occur along that direction with eigenvectors fixed. It's macro ODF was isotropic while the μODF was top shaped distinguishing the two dominant populations of tensors in the DTD (i.e., prolate and oblate tensors).

The glyphs for white matter DTDs are shown in FIG. 23. The mean tensor was prolate shaped, and macroODF was peanut shaped for all the DTDs considered. The structure of the covariance tensor was however unique for each DTD. The covariance tensor and μODF for the crossing fibers had four lobes aligned with the two fiber populations. The covariance and μODF for emulsion type DTD had two lobes along the principal direction of the mean diffusion tensor. The covariance for the multi diameter fiber bundle was pancake shaped showing the heterogeneity in the transverse plane. The μODF was pill shaped due to hindered diffusion heterogeneity in the transverse plane compared to the longitudinal axis.

The calculated values of the proposed microstructural stains for a variety of DTDs with an isotropic mean diffusion tensor are shown graphically in FIG. 24. The μFA was greater than FA only for shape and/or orientation heterogeneous DTD hence it fails to capture the size heterogeneity and less specific. The entropy measure was overall higher for size, shape and orientation heterogeneous DTDs compared to the uniform DTD. The size heterogeneity stain, $V_{size}$, is zero for shape and orientation heterogeneous DTD but non-zero for size heterogeneous DTD. The shape heterogeneity stain, $V_{shape}$, is zero for size and orientation heterogeneous DTDs but non-zero for shape heterogeneous DTD. The orientation stain, $V_{orient}$, is zero for size and shape heterogeneous DTDs but non-zero for orientation heterogeneous DTD. Results from continuous mixing of populations of diffusion tensors also show the ability of the proposed stains to independently capture the size, shape and orientation heterogeneities present within a voxel.

Discussion

CNTVD for DTD

The various white and gray matter DTDs demonstrate the richness of CNTVD in describing a variety of realistic sub-domains that may exist in a voxel in the brain. For a given mean diffusion tensor, these simulated DTDs also show that CNTVD could capture multiple types of heterogeneity that maybe present within a MRI voxel. However, it should be noted that the DTD in a voxel is generally unknown, and CNTVD is proposed as one of the admissible candidate distributions for its biological resemblance in brain tissue along with useful properties such as well-posed signal inversion, maximum entropy and producing positive definite diffusion tensors. Despite the richness of the CNTVD, it however does not span the entire space of positive semi-definite diffusion tensors. CNTVD for example could not describe situations with only orientational heterogeneity (i.e., a powder pattern) which is known to have DTD moments greater than two. Simulations showed that CNTVD could also not capture crossing fibers with angular separations not equal to 90 degrees which require a mixture type model with multiple mean and covariance matrices. It should be noted that the presented framework could be applied to any DTD not restricted to CNTVD.

Signal Model

The signal curves show the need for large b-value data to observe the effects of intravoxel heterogeneity given DTI model successfully accounts for the signal at small b-values. The large b-values also sensitizes the signal to multiple DTD compartments such as intra- and extra-cellular environments which can be captured by expressing the proposed signal equation as a weighted sum of multiple DTDs. With the above modification, the limiting b-value for our proposed model is determined by the extent of diffusion independent signal loss such as due to MR relaxation and proton density unlike the cumulant expansion and kurtosis model.

The versatility of the proposed signal model is demonstrated by its validity at large b-values excluded by the kurtosis model and cumulant approximation, and for any p(D) not restricted to CNTVD. However, a central assumption of the model is the Gaussian diffusion of water within the tissue micro-compartments. A classic test for Gaussian diffusion is the time independence of diffusivity. The time-dependent diffusion in neural tissue is however experimentally observed only at very short diffusion times on the order of hundreds of microseconds. The change in diffusivity in gray and white matter with diffusion times beyond a few milliseconds is very small (<10% change from tens of milliseconds to two seconds). Further the breakdown of rotational invariance property of trace of the diffusion tensor, a known consequence of time-dependent diffusion, was also found to be very small (<5%) in neural tissue. The apparent time independent diffusion at long diffusion times typically probed in diffusion MRI experiments could be partly attributed to pore saturation of wide diffusion gradient pulses, water permeability of lipid membranes which hinders the diffusion rather than restricting it, and/or approach to Gaussianity due to ensemble averaging of microscopic diffusion environments within a MRI voxel. The currently available data thus seems to suggest that at time scales of 20-60 ms typically probed in standard spin echo (SE) diffusion weighted scans, the water diffusion in the brain parenchyma is approximately Gaussian.

Experimental Design

The estimation pipeline was accurate and robust to noise which is partly attributed to the model selection framework and the novel experimental design which uniformly samples b-matrices of varying size, shape and orientation. The equivalence between the covariance matrix and fourth order covariance tensor representation enabled us to exploit the symmetries of the general fourth order tensor to build a family of nested models for covariance estimation.

The importance of the choice of diffusion encoding gradient vectors in the estimation of the diffusion tensor has been well studied. It can be expected that the same holds true for DTD estimation as well especially for higher rank b-matrix measurements requiring multiple gradient pulses which increases the number of degrees of freedom. An optimal experimental design which significantly reduces the number of measurements is preferred for practical applicability of the method. Rank-2 b-matrices obtained using orthogonal gradient pairs have been used to extract microscopic heterogeneity in excised spinal cord. A t-design scheme for rank-2 b-matrix measurements has been used to estimate powder averaged DTDs in the excised brain. The two gradient vectors were made orthogonal to each other and chosen as the vertices of the icosahedron. The orthogonality constraint on the gradient vectors restricts the space of positive definite matrices explored, while sampling antipodal vectors leads to redundant b-matrices which ill-conditions the DTD signal inversion. In some cases, the space of orientation, shape and size of the b-matrices in a phantom experiment is uniformly sampled which is extremely time consuming. A multi-shell approach can be used where each shell is composed of a number of rank 1, 2 and 3 b-matrices to account for arbitrary DTDs in the brain and reduce acquisition time in-vivo.

Our experimental design using CS balances acquisition time and the space of fourth order covariance tensors spanned by the b-matrices. A continuum of b-matrices of varying shapes, sizes and orientations were chosen instead of a multi-shell acquisition to get a better definition of the MR signal dependence with b-value. Such an experimental design allows an unbiased estimation of the DTD parameters in a reasonable amount of time. The lack of an extra gradient pair for rank-3 b-matrices, which were shown to be not necessary to estimate the covariance, reduces the number of degrees of freedom to explore and possibly the echo time of the acquisition particularly in clinical MRI scanners which have long gradient ramp times. It should be noted that the number of b-matrices and the range of b-values required to estimate the DTD parameters largely depend on the sample. The sampled b-value should be large enough such that residual in the data unaccounted by the DTI model lies well above the noise floor but small enough to prevent sensitization of multiple tissue compartments. The number of b-matrices is inversely proportional to the amount of residual in the data unaccounted by the DTI model for adequate statistical power.

DTD Visualization

The presented glyphs and stains provide an unique information about the underlying micro structure as shown in the figures. The μODF glyph disentangled the coherent diffusion tensor populations present within a voxel as shown in shape heterogeneous and crossing fiber DTDs. The covariance glyph displayed the plane of maximal heterogeneity as shown in transverse size heterogeneous DTD. We show that the μFA does not fully capture the heterogeneity in the tissue thus the need for additional stains. It cannot distinguish between orientation and shape heterogeneities. Using simulations, we have also shown that our new stains independently capture the size, shape and orientation heterogeneities within the voxel overcoming some of the limitations in previous works.

The proposed stains are generic and applies to any of the eight covariance models. They could help inform about normal and abnormal micro structural changes in tissue with disease. For Gaussian diffusion, the ODF glyph purely characterizes the orientation dependence of diffusivity independent of experimental parameters such as diffusion time. Comparing the macro and micro ODF glyphs could be particularly revealing in white matter voxels. The size metric could help distinguish between layers of the cerebral cortex which are known to have different cell size distribution that gets altered in diseases such as schizophrenia and Huntington's disease. It could also reveal the cytoarchitecture in spinal cord where diameter distribution of various fiber tracts and nerve roots traversing the cord vary widely.

Conclusion

In this study, a novel paradigm to simulate and estimate DTD is presented. A new MC based signal model is introduced which is monotonically decreasing with b-value unlike previous models and designed to work for any DTD. The richness of CNTVD is shown using a set of realistic DTDs that may exist in brain gray and white matter. The data inversion is performed using a parsimonious approach to accurately estimate various mean and covariance pairs in the presence of noise in the MR signal. A family of new novel parametric stains and glyphs are shown to capture distinct features of micro structural inhomogeneity within a MRI voxel. The method is thus an important advance in the continuing quest to explore the microstructure within the MRI voxel.

Appendix B. Analytical Background

Maximum Entropy Property and Identifiability of the CNTVD

Theorem 1. For a Borel-measurable set, $\mathcal{C} \subseteq \mathbb{R}$, the constrained Gaussian distribution with density, $$p_{\mu,\Omega}(X|X \in C) = \frac{1}{Z(\mu, \Omega)} \exp\left(-\frac{1}{2}(X-\mu)\Omega(X-\mu)^T\right) 1(X \in C)$$

where $Z(\mu, \Omega)$ is the normalizing constant is the unique maximizer of the entropy $$H(p) = -\int_C p(X) \log p(X) dX$$

among all probability densities supported by $\mathcal{C}$ with given first and second moments $$\langle X_k \rangle = \mathbb{E}_{\mu,\Omega}(X_k | X \in C), \langle X_k X_\ell \rangle = \mathbb{E}_{\mu,\Omega}(X_k X_\ell | X \in C), 1 \le k, \ell \le d.$$

When $\mathcal{C}$ contains an open ball the parameters $\mu$, $\Omega$ are uniquely determined by the first and second moments.

Proof. Consider the following Lagrangian with the constraint $p(X) \ge 0$, $$\mathcal{L}(p, \lambda, v, \Xi) = \quad (1)$$
$$-\int_C p(X) \log p(X) dX + \left(1 - \int_C p(X) dX\right)\lambda + \left(\langle X \rangle - \int_C X p(X) dX\right) \cdot v$$

$$+ \text{Trace}\left[\left(\langle X^T X \rangle - \int_C X^T X p(X) dX\right)\Xi\right] \quad (2)$$

where $\lambda \in \mathbb{R}$, $v \in \mathbb{R}^d$ and $\Xi \in \mathbb{R}_{symm}^{d \times d}$ are the Lagrange multipliers. A solution of the maximization problem corresponds necessarily to a zero of the variational derivatives, $$\frac{\delta \mathcal{L}}{\delta p(X)} = -\log p(X) - 1 + \lambda + X \cdot v + X \Xi X^T = 0 \forall X \in C \quad (3)$$

which means that when the maximum entropy solution exists necessarily it has the form $$p(X) = \exp(\lambda - 1 + X \cdot v + X \Xi X^T) 1(X \in C) \quad (4)$$

with $\lambda$ corresponding to a normalizing constant and $v$, $\Xi$ such that the first and second moment constraints are satis fied. When a solution with the given moments exists, after reparametrization, the density is rewritten as $$p(X) = \frac{1}{Z(\mu, \Omega)} \exp\left(-\frac{1}{2}(X - \mu)\Omega(X - \mu)^T\right) 1(X \in C). \quad (5)$$

When the support $C$ is unbounded, necessarily $\Omega$ is positive definite on the recession cone of $C$, and when $\Omega$ is positive definite on $\mathbb{R}^d$, we obtain a constrained Gaussian distribution. When a maximum exists, the uniqueness of the maximizing parameters is shown below.

Suppose that $p_{\tilde{\mu},\tilde{\Omega}}(X)$ is another constrained Gaussian distribution with support $C$ satisfying the moment constraints and maximizing the entropy. Then since the distributions satisfy the same moment constraints, $$\nabla \log Z(\mu,\Omega) = \nabla \log Z(\tilde{\mu},\tilde{\Omega}) = (\langle X \rangle, \langle X^T X \rangle) \quad (6)$$

which implies $$0 = (\nabla \log Z(\mu, \Omega) - \nabla \log Z(\tilde{\mu}, \tilde{\Omega}))(\mu - \tilde{\mu}, \Omega - \tilde{\Omega})^\top \quad (7)$$

$$= (\mu - \tilde{\mu}, \Omega - \tilde{\Omega})\nabla^\top \nabla \log Z(\hat{\mu}, \hat{\Omega})(\mu - \tilde{\mu}, \Omega - \tilde{\Omega})^\top \quad (8)$$

with $\hat{\mu} = \alpha\mu + (1-\alpha)\tilde{\mu}$ and $\hat{\Omega} = \alpha\Omega + (1-\alpha)\tilde{\Omega}$ for some $0 \le \alpha \le 1$, and $$\nabla^\top \nabla \log Z(\hat{\mu}, \hat{\Omega}) = \frac{\nabla^\top \nabla Z(\hat{\mu}, \hat{\Omega})}{Z(\hat{\mu}, \hat{\Omega})} - \frac{\nabla^\top Z(\hat{\mu}, \hat{\Omega})\nabla Z(\hat{\mu}, \hat{\Omega})}{Z(\hat{\mu}, \hat{\Omega})^2} \quad (9)$$

$$= \begin{bmatrix} \text{Cov}_{\hat{\mu},\hat{\Omega}}(X) & \text{Cov}_{\hat{\mu},\hat{\Omega}}(X^\top X, X) \\ \text{Cov}_{\hat{\mu},\hat{\Omega}}(X, X^\top X) & \text{Cov}_{\hat{\mu},\hat{\Omega}}(X^\top X, X^\top X) \end{bmatrix} \quad (10)$$

which means that $$\text{Variance}_{\hat{\mu},\hat{\Omega}}((\mu-\tilde{\mu})X^T + X(\Omega-\tilde{\Omega})X^T) = 0. \quad (11)$$

Since $p_{\hat{\mu},\hat{\Omega}}(X) > 0$ on $C$, $$C \subseteq \{X \in \mathbb{R}^d : (\mu-\tilde{\mu})X^T + X(\Omega-\tilde{\Omega})X^T = r\} \quad (12)$$

for some $r \in \mathbb{R}$, which is a variety of dimension, $(d-1)$, when $\mu \ne \tilde{\mu}$ or $\Omega \ne \tilde{\Omega}$, contradicting the assumption of $C$ having full dimension

Relations Between the Diffusion Tensor Cumulants and the Displacement Cumulants Let $X \in \mathbb{R}^d$ be a conditionally Gaussian displacement vector, with zero conditional mean and conditional covariance 2D, while D is a random symmetric positive definite matrix (diffusion tensor) with probability density p(D). The Characteristic Function (CF) of the Gaussian conditional law of X given D is given by $$\mathbb{E}(\exp(iq \cdot X)|D) = \exp(-qDq^T) \quad (13)$$

while the unconditional CF is obtained by integrating w.r.t. p(D) the conditional CF $$\mathbb{E}(\exp(iq \cdot X)) = \int_{M_+} \exp(-qDq^\top)p(D)dD = \mathbb{E}(\exp(-\text{Trace}(QD))), \quad (14)$$

$$q \in \mathbb{R}^d,$$

and it coincides with the Laplace Transform (LT) of the diffusion tensor distribution p(D) at $Q = q^T q$.

We introduce the following notations: the order of a multi-index $\alpha = (\alpha_1, \ldots, \alpha_d) \in \mathbb{N}^d$ is denoted by $$|\alpha| = \sum_{j=1}^{d} \alpha_j \quad (15)$$

and $$q^\alpha = \prod_{j=1}^{d} q_j^{\alpha_j}$$

for $q \in \mathbb{R}^d$. The multivariate cumulants of $X = (X_1, \ldots, X_d)$ are denoted by $$\kappa_\alpha(X) = \kappa_{|\alpha|}\bigg(\underbrace{X_1, \ldots, X_1}_{\alpha_1 \text{ copies}}, \underbrace{X_2, \ldots, X_2}_{\alpha_2 \text{ copies}}, \ldots, \underbrace{X_d, \ldots, X_d}_{\alpha_d \text{ copies}}\bigg), \quad (16)$$

so that $\kappa_{e_j e_\ell}(X) = \kappa_2(X_j, X_\ell)$, $\kappa_{e_j + e_k + e_\ell e_r}(X) = \kappa_4(X_j, X_k, X_\ell, X_r)$, where $\{e_1, \ldots, e_d\}$ is the cartesian basis.

The cumulant expansion of the CF of X is given by $$\log \mathbb{E}(\exp(iq \cdot X)) = \sum_{\alpha: |\alpha| \in 2\mathbb{N} \setminus \{0\}} \frac{\kappa_\alpha(X)}{\alpha!} (-1)^{|\alpha|/2} q^\alpha \quad (17)$$

$$= \sum_{n=1}^{\infty} \frac{(-1)^n}{(2n)!} \sum_{j_1 \ldots j_{2n} = 1}^{d} \kappa_{2n}(X_{j_1}, \ldots, X_{j_{2n}}) q_{j_1} \ldots q_{j_{2n}} \quad (18)$$

where all the odd moments and cumulants vanish since the law of X is reflection symmetric, while the cumulant expansion of the LT of D is given by $$\log \mathbb{E}(\exp(\text{trace}(QD))) = \sum_{\beta: |\beta| > 0} \frac{\kappa_\beta(D)}{\beta!} (-1)^{|\beta|} 2^{|\beta|} Q^\beta \quad (19)$$

$$= \sum_{n=1}^{\infty} \frac{(-1)^n}{n!} \sum_{j_1 \ldots j_{2n} = 1}^{d} \kappa_n(D_{j_1 j_2}, \ldots, D_{j_{2n-1} j_{2n}}) Q_{j_1 j_2} \ldots Q_{j_{2n-1} j_{2n}} \quad (20)$$

where $\beta = (\beta_{ij}: 1 \le i \le j \le d) \in \mathbb{N}^{(d+1)d/2}$, and $\bar{\beta}$ is the restriction of the multi-index $\beta$ to the off-diagonal entries. By comparing these expansions for rank-1 $Q = q^T q$, we see that $$\langle X \rangle = 0, \langle X^T X \rangle = \text{Cov}(X) = 2\langle D \rangle, \quad (21)$$

$$\kappa_4(X_i, X_j, X_k, X_\ell) = 4\{\text{Cov}(D_{ij}, D_{k\ell}) + \text{Cov}(D_{ik}, D_{j\ell}) + \text{Cov}(D_{i\ell}, D_{jk})\} \quad (22)$$

$$\kappa_{2n}(X_{j_1}, \ldots, X_{j_{2n}}) = 2^n \sum_{\pi = \{\pi_1, \ldots, \pi_n\}} \kappa_n(D_{\pi_1}, \ldots, D_{\pi_n}) \quad (23)$$

where the sum in Equation (23) is over the pairings $\pi$ of $\{j_1, \ldots, j_{2n}\}$ into pairs $\pi_1, \ldots, \pi_n$, in accordance with the law of total cumulance. The even cumulants of the displacement $\kappa_\alpha(X)$ with $|\alpha|=2n$ are, up to resealing, symmetrizations of corresponding cumulants of the diffusion tensor $\kappa_\beta(D)$ with $|\beta|=n$.

By truncating the cumulant expansion Equation (20) of the LT of p(D) up to second order terms, we obtain the LT of the NTVD with mean $\langle D \rangle$ and Covariance($D_{ij}$, $D_{k\ell}$)= $C_{ijk\ell}$, which can be used to model the signal decay in a multiple pulsed gradient experiment:

$$\frac{S(Q)}{S(0)} = \mathbb{E}[\exp(-Tracc(QD))] = \exp\left(-Tracc(Q\langle D\rangle) + \frac{1}{2}\sum_{ijk\ell} C_{ijk\ell} Q_{ij} Q_{k\ell}\right) \quad (24)$$

For single pulsed gradient experiments $Q=q^T q$ has rank 1, and Equation (24) coincides with the signal decay in Diffusion Kurtosis Imaging (DKI) [?], obtained by truncating the cumulant expansion of the CF of X (Equation (17)) up to 4th order terms, $$\frac{S(q)}{S(0)} = \exp\left(-q\bar{D}q^T + \frac{1}{6}\text{Trace}(\bar{D})^2 \sum_{ijk\ell} K_{ijk\ell} q_i q_j q_k q_\ell\right), \quad (25)$$

where $$\bar{D} = \langle D \rangle \text{ and } K_{ijk\ell} = \frac{C_{ijk\ell} + C_{ikj\ell} + C_{i\ell jk}}{\text{Trace}(\langle D\rangle)^2}. \quad (26)$$

are respectively the diffusion tensor and the diffusion kurtosis tensor. Thus the NTVD signal model extends the DKI signal model from single to multiple pulsed experiments, and up to resealing, the diffusion kurtosis tensor is the symmetrization of the partially symmetric NTVD covariance tensor. Both NTVD and DKI signal models are "non-physical" and break down at high b-value, since the NTVD supports also tensors which are not positive definite, and the DKI signal decay is not the CF of a probability distribution.

Sufficiency of Rank-1 and 2 b-Matrices for Diffusion Tensor Covariance Estimation Lemma 1. The linear space $\mathcal{T}$ of partially symmetric 4th-order d-dimensional tensors with symmetries $$T_{jik\ell} = T_{ijk\ell} = T_{k\ell ij} \forall 1 \leq i,j,k, \ell \leq d$$

is spanned by tensors of the form $(u\otimes u + v\otimes v)\otimes(u\otimes u + v\otimes v)$ with $u,v \in \mathbb{R}^d$, where $\otimes$ denotes outer product, and by symmetrizing it follows that the tensors $u\otimes u\otimes u\otimes u$ with $u\in \mathbb{R}^d$ span the subspace of totally symmetric 4th-order tensors.

Proof. By the spectral decomposition, every $T\in \mathcal{T}$ is a linear combination or at most $$\frac{(d+1)d}{2}$$

4th-order tensors of the form $$\left(\sum_{k=1}^d u_k \otimes u_k\right) \otimes \left(\sum_{\ell=1}^d u_\ell \otimes u_\ell\right) = \sum_{k,\ell=1}^d u_k \otimes u_k \otimes u_\ell \otimes u_\ell \quad (27)$$

$$= \frac{1}{2}\sum_{k,\ell=1}^d (u_k \otimes u_k + u_\ell \otimes u_\ell) \otimes (u_k \otimes u_k + u_\ell \otimes u_\ell) - d\sum_{k=1}^d u_k \otimes u_k \otimes u_k \otimes u_k \quad (28)$$

with $u_k \in \mathbb{R}^d$, where $u\otimes u\otimes v\otimes v + v\otimes v\otimes u\otimes u = (u\otimes u + v\otimes v)\otimes(u\otimes u + v\otimes v) - u\otimes u\otimes u\otimes u - v\otimes v\otimes v\otimes v$ (29)

□

It can be observed that Equation (28) is a sum of outer squares of rank-1 and rank-2 b-matrices. Thus, rank-3 b-matrices are not necessary and rank-1 b-matrices are not enough to estimate the covariance of the diffusion tensor in a multiple pulsed gradient experiment.

Well-Posedness of Signal Inversion

The CNTVD is the probability distribution with given mean, $\langle D \rangle$, and covariance, $\langle D, D \rangle$, which is maximizing the entropy (relative to the volume measure) and therefore it is determined by its first and second moments. It is also shown in Theorem 1 that the mean and covariance determine uniquely the parameters $\mu$, $\Sigma$ of the CNTVD.

The diffusion tensor covariance can be shown using fourth order partially symmetric tensors spanned by tensors, $b\otimes b$, where b matrices are of rank 1 and 2. Below we show that from acquisitions with b-matrices of rank 1 and 2 we can unambiguously reconstruct the first and second moments of any diffusion tensor distribution, CNTVD included.

Consider the log-signal, $\log S(b) = \log \langle \exp(-\text{Trace}(bD))\rangle$ with a rank-1 b-matrix, $\varepsilon u^T u$, where u is an unit vector and take its derivative at $\varepsilon=0$ using the cumulant expansion (Equation (20), $$\partial_\varepsilon \log S(\varepsilon = u^T u)|_{\varepsilon=0} = \text{Trace}(\langle D\rangle u^T u) = u\langle D\rangle u^T \quad (30)$$

Since (by spectral theorem) rank-1 matrices span the symmetric matrices, it follows that rank-1 b-matrices and zero b-value are enough to determine the mean tensor and $S_0$.

Consider the log-signal, $\log S(\varepsilon b)$, with scalar $\varepsilon>0$, and non-negative matrix b, and take its second derivatives at $\varepsilon=0$ using the cumulant expansion (Equation (20)), $$\partial^2_{\varepsilon\varepsilon} \log S(\varepsilon b)|_{\varepsilon=0} = \lim_{\varepsilon\downarrow 0} \frac{\log S(2\varepsilon b) + \log S(0) - 2\log S(\varepsilon b)}{\varepsilon^2} = b:\langle D,D\rangle:b \quad (31)$$

Now because the outer products $b\otimes b$ with b of rank-1 and rank-2 span the space of fourth order covariance tensors, in principle data from rank-1 and rank-2 b-matrices are sufficient to estimate the covariance of DTD. Since the CNTVD is fully described by the mean and covariance tensors, the above proof shows that the signal inversion is well-posed using rank-1 and rank-2 b-matrices.

Model Selection Hierarchy

The diffusion weighted data is fitted with the following family of nested models for the mean tensor and covariance tensor in the decreasing order of model parsimony as shown below. The number of parameters including $S_0$ along with the structures of mean and covariance tensors for each model symmetry is listed in the table shown in FIGS. 27-29 which illustrates a hierarchy of models used to estimate the mean and covariance tensors of the DTD. The symbol $p_i$ refers to the $i^{th}$ parameter, and $\alpha$, $\beta$, $\hat{r}$, 1 in the structure of mean tensor of transverse isotropy symmetry are constant, constant, unit radial vector defined by the polar and azimuthal angles and identity matrix respectively, and $k_{mean}$ refers to the number of parameters in the chosen symmetry for the mean tensor.

Evaluation of Heterogeneity Stains

The efficacy of proposed stains in describing the desired heterogeneity were evaluated by controlled mixing of diffusion tensor ellipsoids of different size, shape and orientation. Different populations of tensors were mixed in a voxel to test if changes in the proposed heterogeneity measures correlate with changes in heterogeneity of interest, and the absolute value of the metric reflects the extent of desired heterogeneity. The following six populations (N=1000) of diffusion tensors were generated for mixing: 1) "RandomShapes"—randomly shaped diffusion tensors of same orientation and trace equal to $T_1$, 2) "RandomShapes Resized"—"RandomShapes" class of diffusion tensors with trace modified to $5T_1$, 3) "RandomShapes Rotated"—"RandomShapes" class of diffusion tensors rotated by 90° around the axis, [1, 1, 1], 4) "Sphere"—identical spherical diffusion tensors with trace equal to $T_3$, 5) "Oblate"—identical oblate diffusion tensors with trace equal to $T_4=T_3$, 6) "ProlateRand"—prolate diffusion tensors with trace equal to $T_5=T_4-4$ and are rotated randomly.

The size heterogeneity measure ($V_{size}$) is evaluated by mixing "RandomShapes" and "RandomShapes Resized" class of diffusion tensors. The shape heterogeneity measure ($V_{shape}$) is evaluated by mixing Oblate and Sphere class of diffusion tensors. The orientation heterogeneity measure ($V_{orient}$) is evaluated by mixing "RandomShapes" and "RandomShapes Rotated" class of diffusion tensors. Finally, "Oblate" and "ProlateRand" class of diffusion tensors are mixed together to evaluate the efficacy of the stains in filtering size, shape and orientation heterogeneities in the resulting mixture. The mixing fraction is gradually increased from 0 (all tensors belonging to the first group) to 1 (all tensors belonging to the second group) for controlled mixing of two groups.

Figure 26:
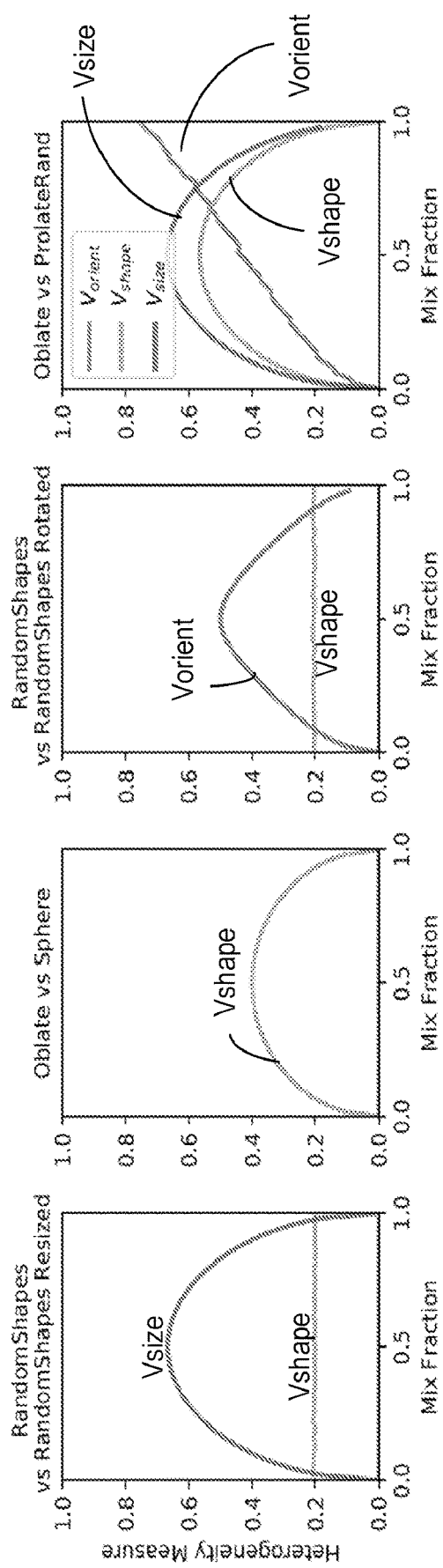
FIG. 26 illustrates the efficacy of size, shape, and orientation heterogeneity stains.

The results of the mixing is shown in FIG. 26 that illustrates the efficacy of size ($V_{size}$), shape ($V_{shape}$) and orientation ($V_{orient}$) heterogeneity stains in independently capturing the desired heterogeneity. The plot of heterogeneity measures versus the mixing fraction computed for mixture of two groups of: (First column) randomly shaped tensors of same orientation but different sizes, (Second column) oblate and spherical tensors of same size, (Third column) randomly shaped tensors of same size but rotated by 90° around the axis, [1,1,1], and (Fourth column) oblate and randomly rotated prolates of different sizes. It can be observed that in the first case ("RandomShapes" vs "RandomShapes Resized"), all the stains except the size heterogeneity stain change with mixing fraction. The trend observed in the size heterogeneity stain was also parabolic with maximum attained at mixing fraction equal to 0.5 corresponding to the mixture with maximum entropy which reflects the ability of the stain to accurately measure the extent of size mixing of diffusion tensors. The shape heterogeneity stain was uniformly high due to the randomizing of shapes of both the mixing population. The shape heterogeneity measure in the second case ("Oblate" vs "Sphere") also exhibited a parabolic trend with mixing fraction but zero value for size and orientation heterogeneity measures as expected. The orientation heterogeneity measure in the third case ("RandomShapes" and "RandomShapes Rotated") also exhibited a parabolic trend with mixing fraction while the shape measure was uniform and above zero due to the presence of shape heterogeneity in both the mixing populations. The fourth case clearly showed parabolic trends for size and shape heterogeneity measures and approximately linear trend for the orientation measure as expected in the fully heterogeneous mixture.

Additional Drawings

FIG. 26 illustrates the efficacy of size ($V_{size}$), shape ($V_{shape}$) and orientation ($V_{orient}$) heterogeneity stains.

FIGS. 27-29 contain a table illustrating a hierarchy of models used to estimate the mean and covariance tensors of the DTD.

We claim:
1. A magnetic resonance (MR) method, comprising:
determining a plurality of random diffusion weightings based on selections of diffusion gradient magnitudes and first and second directions;
applying to a sample a plurality of sets of diffusion-sensitizing gradient pulse pairs separated by a diffusion time, wherein each of the diffusion-sensitizing gradient pulse pairs is associated with a respective diffusion weighting from the plurality of random diffusion weightings;
applying a 180° RF pulse during the diffusion time between a first pulse pair and a second pulse pair of each of the sets of pulse pairs;
measuring MR signals responsive to the each of the plurality of sets of diffusion sensitizing pulse pairs; and
based on the measured MR signals, determining a second-order mean diffusion tensor associated with at least a portion of the sample.

2. The MR method of claim 1, further comprising selecting diffusion sensitizing gradients in which the first and second directions are randomly selected.

3. The MR method of claim 1, further comprising determining a fourth-order covariance tensor associated with the second-order mean diffusion tensor based on the measured MR signals.

4. The MR method of claim 1, wherein the diffusion gradient magnitudes are randomly selected b-magnitudes that are associated with diffusion weighting b-matrices.

5. The MR method of claim 4, wherein the b-magnitudes are randomly selected from a uniform distribution.

6. The MR method of claim 1, wherein the first and second directions are randomly selected over a range that includes all directions.

7. The MR method of claim 6, wherein the pulses of the diffusion sensitizing pulse pairs are trapezoidal and the random diffusion weightings are associated with respective diffusion weighting b-matrices having coefficients $b_{ij}$ given by:

$$b_{ij} = \frac{\gamma^2 \delta^2}{3} \left[ \begin{array}{c} -(G_2^{(i)}(3G_1^{(j)} + G_2^{(j)}) + G_1^{(i)}(G_1^{(j)} + 3G_2^{(j)}))\delta + \\ 3(G_1^{(i)} + G_2^{(i)})(G_1^{(j)} + G_2^{(j)})\Delta \end{array} \right],$$

wherein $b_{ij}$ is the b-value from diffusion gradient interactions between the $i^{th}$ and $j^{th}$ axis, $G_1^{(i)}$, $G_2^{(i)}$, $G_1^{(j)}$, $G_2^{(j)}$ are $i^{th}$ and $j^{th}$ components of the first and second diffusion gradient pairs of the sets of diffusion-sensitizing gradient pulse pairs, $\Delta$ is the diffusion time, $\delta$ is an effective pulse duration, $\gamma$ is a nuclear gyromagnetic ratio, and i, j are integers from 1 to 3.

8. The MR method of claim 7, wherein the components of the first and second gradient pairs are found from $b_{ij}=b'_{ij}$, wherein $$b'_{ij} = \frac{b}{2}\left(\hat{n}_1^{(i)}\hat{n}_1^{(j)} + \hat{n}_2^{(i)}\hat{n}_2^{(j)}\right)$$

and $\hat{n}_1^{(i)}$ and $\hat{n}_2^{(i)}$ are components of unit vectors $\hat{n}_1$, $\hat{n}_2$ corresponding to the first and second random directions.

9. The MR method of claim 1, further comprising applying a 90° pulse and then applying the first pulse pair of each of the sets of pulse pairs.

10. The MR method of claim 1, wherein the diffusion weightings and the first and second directions are randomly selected from respective uniform distributions.

11. The MR method of claim 1, wherein each of the sets of diffusion-sensitizing gradient pulse pairs includes a first pulse pair and a second pulse pair separated by the diffusion time and each of the first pulse pairs and the second pulse pairs includes a respective initial pulse and a final pulse.

12. The MR method of claim 11, wherein the initial pulse of the first pulse pair and the initial pulse of the second pulse pair have a common initial pulse waveform.

13. The MR method of claim 11, wherein the final pulse of the first pulse pair and the final pulse of the second pulse pair have a common final pulse waveform, wherein the common initial pulse waveform and the common final pulse waveform are different.

14. The MR method of claim 11, wherein the final pulse of the first pulse pair and the final pulse of the second pulse pair have a common final pulse waveform, wherein the common initial pulse waveform and the common final pulse waveform are the same.

15. The method of claim 1, further comprising determining at least one of a fractional anisotropy, a size heterogeneity, a shape heterogeneity, and an orientation heterogeneity of the sample based on the measured MR signals.

16. An MR apparatus, comprising:
a gradient control system operable to apply a plurality of sets of diffusion-sensitizing gradient pulse pairs separated by a diffusion time to a sample to at least one gradient coil, wherein each of the diffusion-sensitizing gradient pulse pairs is associated with a respective random diffusion weighting;
a receiver situated to receive MR signals responsive to the plurality of sets of diffusion-sensitizing gradient pulse pairs; and
a processor coupled to the receiver and operable to determine at least one of a second-order mean diffusion tensor and a fourth-order covariance tensor associated with the second-order mean diffusion tensor based on the received MR signals.

17. The MR apparatus of claim 16, wherein the processor is coupled to a processor-readable storage medium that stores processor-executable instructions for specifying the plurality of sets of diffusion-sensitizing gradient pulse pairs.

18. The MR apparatus of claim 17, wherein the processor-executable instructions for specifying the plurality of sets of diffusion-sensitizing gradient pulse pairs include processor-executable instructions for selecting first and second directions and diffusion weighting magnitudes.

19. The MR apparatus of claim 18, wherein the first and second directions and the diffusion weighting magnitudes are randomly selected.

20. The MR apparatus of claim 16, wherein the processor is coupled to a processor-readable storage medium that stores specifications of the plurality of sets of diffusion-sensitizing gradient pulse pairs.

21. The MR apparatus of claim 18, wherein the specifications of the plurality of sets of diffusion-sensitizing gradient pulse pairs include gradient field components and combinations associated with a plurality of diffusion weighting magnitudes.

22. The MR apparatus of claim 21, wherein the specifications of the plurality of sets of diffusion-sensitizing gradient pulse pairs are based on respective diffusion weighting matrices.

23. A method, comprising:
applying a first diffusion-sensitizing pulse to a specimen;
applying a 180° RF pulse after the first diffusion-sensitizing pulse during a diffusion time;
after the diffusion time has elapsed, applying a second diffusion-sensitizing pulse to the specimen; and
measuring MR signals responsive to application of the diffusion sensitizing pulses; and
based on the measured MR signals, determining a second-order mean diffusion tensor associated with at least a portion of a sample.

24. The method of claim 23, wherein the first diffusion-sensitizing pulse and the second diffusion-sensitizing pulse have a common pulse shape.

* * * * *